(12) United States Patent
Kimura

(10) Patent No.: US 11,605,102 B2
(45) Date of Patent: *Mar. 14, 2023

(54) INFORMATION PROCESSING METHOD, PROGRAM, AND TERMINAL

(71) Applicant: LINE CORPORATION, Tokyo (JP)

(72) Inventor: Kazutaka Kimura, Tokyo (JP)

(73) Assignee: LINE CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/132,336

(22) Filed: Dec. 23, 2020

(65) Prior Publication Data

US 2021/0150556 A1 May 20, 2021

Related U.S. Application Data

(63) Continuation of application No. PCT/JP2019/045440, filed on Nov. 20, 2019.

(30) Foreign Application Priority Data

Apr. 12, 2019 (JP) .............................. JP2019-076692

(51) Int. Cl.
  *G06Q 30/02* (2012.01)
  *G06Q 30/06* (2012.01)
  (Continued)

(52) U.S. Cl.
  CPC ..... *G06Q 30/0208* (2013.01); *G06Q 30/0265* (2013.01); *G06Q 30/0645* (2013.01); *G06Q 50/30* (2013.01)

(58) Field of Classification Search
  CPC ........... G06Q 30/0266; G06Q 30/0264; G06Q 30/0269; G06Q 30/0284; G06Q 50/30;
  (Continued)

(56) References Cited

U.S. PATENT DOCUMENTS

2013/0006957 A1* 1/2013 Huang ................ G06F 3/04883
  707/706
2013/0217414 A1* 8/2013 Nagaraj .............. H04W 84/005
  455/456.2
(Continued)

FOREIGN PATENT DOCUMENTS

JP  2000180187 A  *  6/2000
JP  2001-283089 A  10/2001
(Continued)

OTHER PUBLICATIONS

Nigel Webster, What Are the Different Types of Outdoor Advertising?, 2018 (Year: 2018).*

(Continued)

*Primary Examiner* — Tarek Elchanti
(74) *Attorney, Agent, or Firm* — Sughrue Mion, PLLC

(57) ABSTRACT

An information processing method to be carried out by a terminal that is configured to communicate with an electronic device, is provided. The electronic device may be configured to manage information related to a vehicle. The information processing method may include: receiving vehicle usage fee information related to a vehicle usage fee for the vehicle from the electronic device, through a communication interface of the terminal, the vehicle usage fee being based on an advertisement that is displayed on a display device of the vehicle; and displaying a first display that is based on the vehicle usage fee information, in a display area of the terminal.

18 Claims, 44 Drawing Sheets

(51) Int. Cl.
*G06Q 50/30* (2012.01)
*G06Q 30/0208* (2023.01)
*G06Q 30/0251* (2023.01)
*G06Q 30/0645* (2023.01)

(58) Field of Classification Search
CPC .... G06Q 10/02; G06Q 20/02; G06Q 30/0645; G06Q 2240/00; G06Q 30/02; G01C 21/3667; G01C 21/3697
USPC .......... 705/1.1; 455/456.2; 707/706
See application file for complete search history.

(56) References Cited

U.S. PATENT DOCUMENTS

| | | |
|---|---|---|
| 2018/0357668 A1 | 12/2018 | Kanemoto et al. |
| 2018/0374014 A1 | 12/2018 | Matsui et al. |
| 2019/0005544 A1* | 1/2019 | Hong ................. G06Q 30/0265 |

FOREIGN PATENT DOCUMENTS

| | | | |
|---|---|---|---|
| JP | 2002-163550 A | | 6/2002 |
| JP | 2003-006507 A | | 1/2003 |
| JP | 2005173836 A | * | 6/2005 |
| JP | 2013-080350 A | | 5/2013 |
| JP | 2014-73831 A | | 4/2014 |
| JP | 2016-12298 A | | 1/2016 |
| JP | 2017-525062 A | | 8/2017 |
| JP | 2017525062 A | * | 8/2017 |
| JP | 2018-010587 A | | 1/2018 |
| JP | 2018105870 A | * | 7/2018 |
| JP | 2019-003273 A | | 1/2019 |
| WO | 2007/109541 A2 | | 9/2007 |
| WO | 2015/179447 A1 | | 11/2015 |
| WO | 2017/098803 A1 | | 6/2017 |

OTHER PUBLICATIONS

"DeNA announces "0 Yen Taxi"—Advertisers to pay fare", Dec. 5, 2018, 6 pages.
International Search Report dated Dec. 24, 2019 issued by the International Searching Authority in International Application No. PCT/JP2019/045440 [PCT/ISA/210].
Written Opinion dated Dec. 24, 2019 issued by the International Searching Authority in International Application No. PCT/JP2019/045440 [PCT/ISA/237].
Translation of the Written Opinion dated Dec. 24, 2019 issued by the International Searching Authority in International Application No. PCT/JP2019/045440.
Office Action dated Oct. 13, 2020 by the Japanese Patent Office in Japanese Application No. 2019-076693.
Office Action dated Oct. 5, 2021 by the Japanese Patent Office in Japanese Application No. 2019-076693.
Office Action dated Apr. 13, 2021 by the Japanese Patent Office in Japanese Application No. 2019-076693.
Office Action dated Aug. 4, 2021 by the U.S. Patent and Trademark Office in U.S. Appl. No. 17/132,373.
Office Action dated Mar. 11, 2022 by the U.S. Patent and Trademark Office in U.S. Appl. No. 17/132,373.
Office Action dated Aug. 11, 2022 by the U.S. Patent and Trademark Office in U.S. Appl. No. 17/132,373.
Written Opinion dated Feb. 25, 2020 by the International Searching Authority in Application No. PCT/JP2019/045747.
International Search Report dated Feb. 25, 2020 by the International Searching Authority in Application No. PCT/JP2019/045747.

* cited by examiner

FIG. 2A

ADVERTISEMENT DISCOUNT DATA

| ADVERTISEMENT ID | A0001 |
|---|---|
| ADVERTISEMENT TITLE | ○× FITNESS GYM |
| DISCOUNT AMOUNT | ¥500 |
| ADVERTISEMENT CONTENT | video001.mp4 |

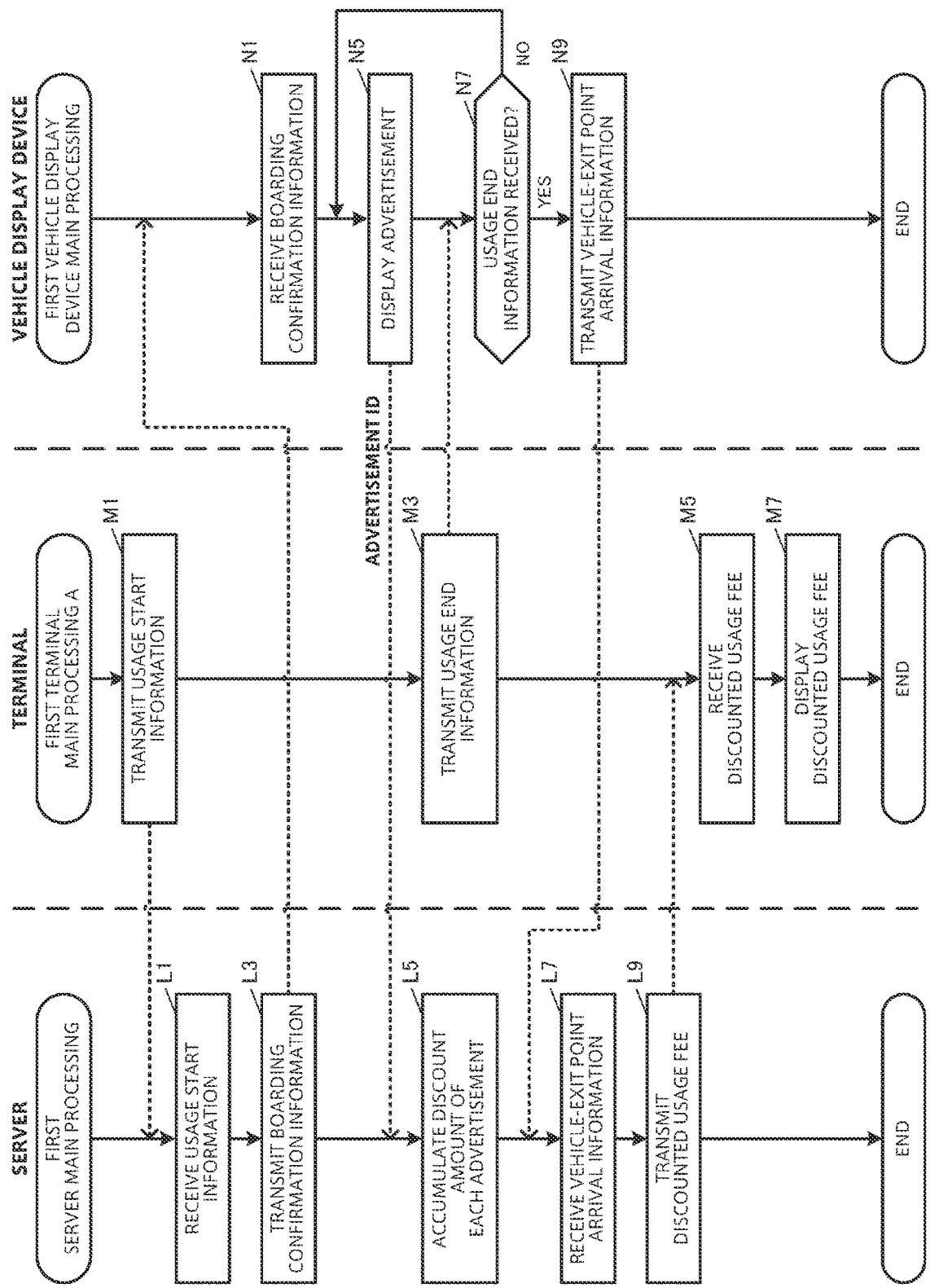

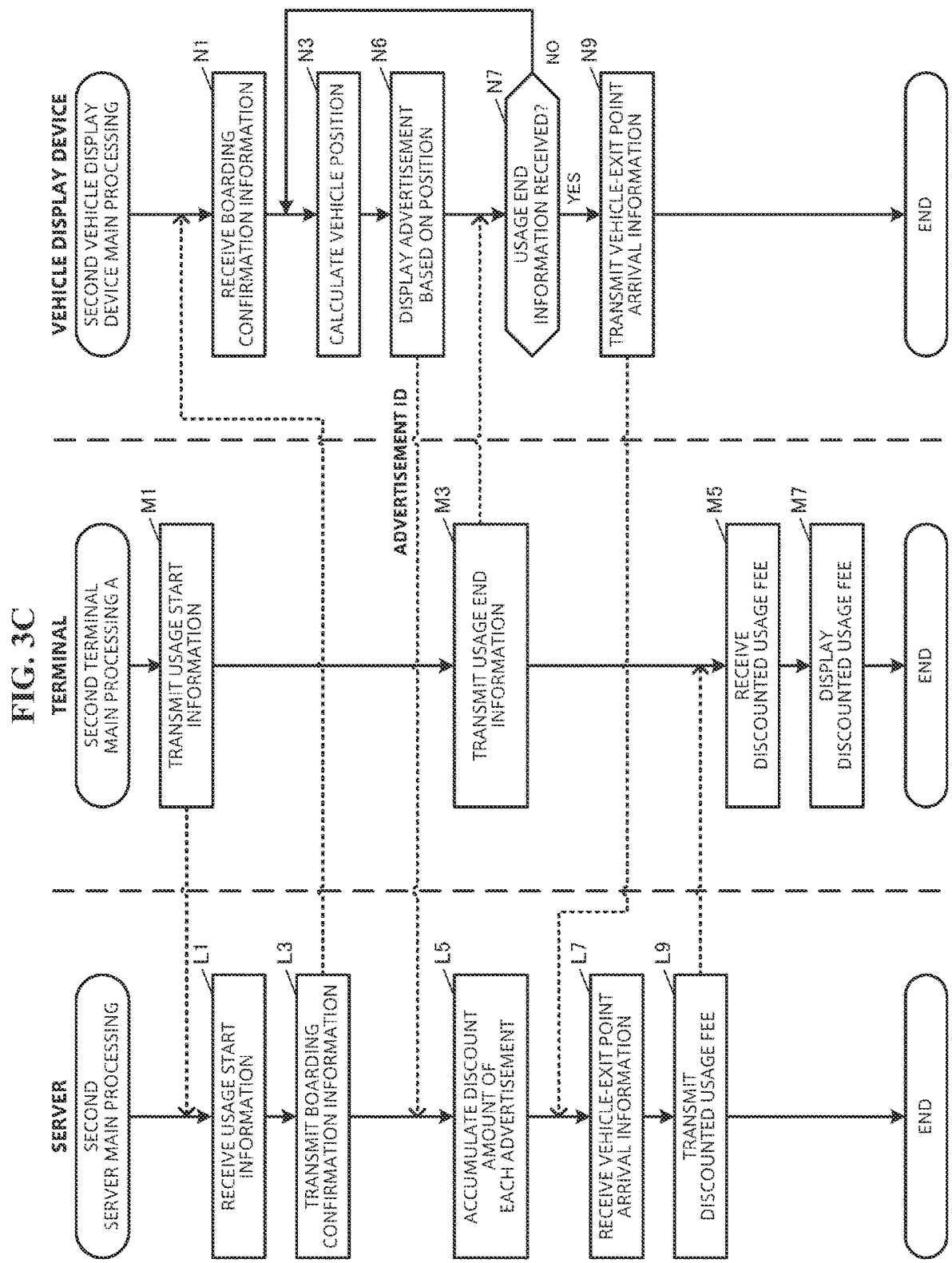

FIG. 6C

| USER NAME | USER ID | SEX | AGE | PLACE OF RESIDENCE | OTHER REGISTRATION INFORMATION |
|---|---|---|---|---|---|
| A.A | U0146 | FEMALE | 34 | SHINJUKU-KU, TOKYO, JAPAN | [ ... ] |
| B.B | U0059 | MALE | 22 | YOKOHAMA-SHI, KANAGAWA, JAPAN | [ ... ] |
| C.C | U0803 | MALE | 46 | SHENZHEN, GUANGDONG, PEOPLE'S REPUBLIC OF CHINA | [ ... ] |
| D.D | U1002 | FEMALE | 27 | BARCELONA, CATALONIA, SPAIN | [ ... ] |
| E.E | U0209 | FEMALE | 51 | KITAKYUSHU-SHI, FUKUOKA, JAPAN | [ ... ] |
| ... | ... | ... | ... | ... | ... |

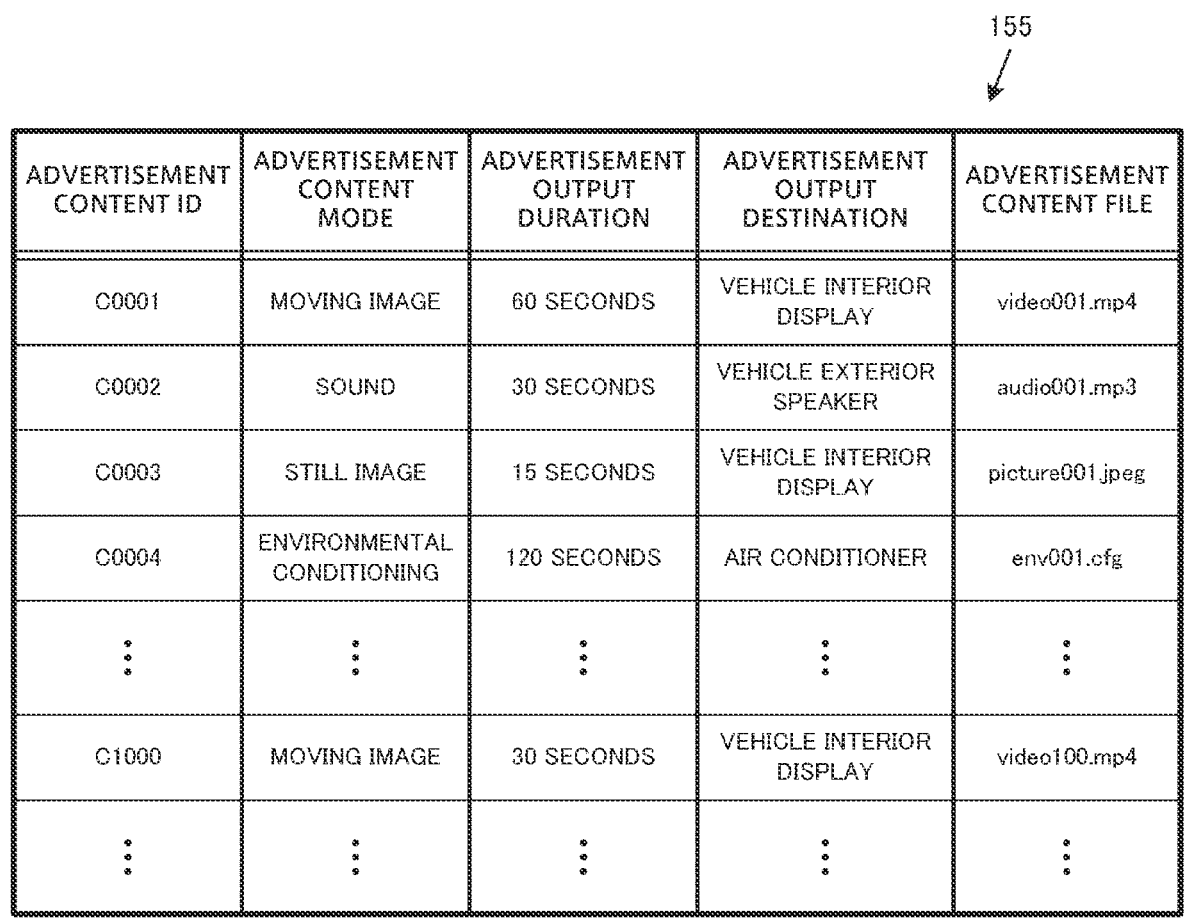

| ADVERTISEMENT CONTENT ID | ADVERTISEMENT CONTENT MODE | ADVERTISEMENT OUTPUT DURATION | ADVERTISEMENT OUTPUT DESTINATION | ADVERTISEMENT CONTENT FILE |
|---|---|---|---|---|
| C0001 | MOVING IMAGE | 60 SECONDS | VEHICLE INTERIOR DISPLAY | video001.mp4 |
| C0002 | SOUND | 30 SECONDS | VEHICLE EXTERIOR SPEAKER | audio001.mp3 |
| C0003 | STILL IMAGE | 15 SECONDS | VEHICLE INTERIOR DISPLAY | picture001.jpeg |
| C0004 | ENVIRONMENTAL CONDITIONING | 120 SECONDS | AIR CONDITIONER | env001.cfg |
| ⋮ | ⋮ | ⋮ | ⋮ | ⋮ |
| C1000 | MOVING IMAGE | 30 SECONDS | VEHICLE INTERIOR DISPLAY | video100.mp4 |
| ⋮ | ⋮ | ⋮ | ⋮ | ⋮ |

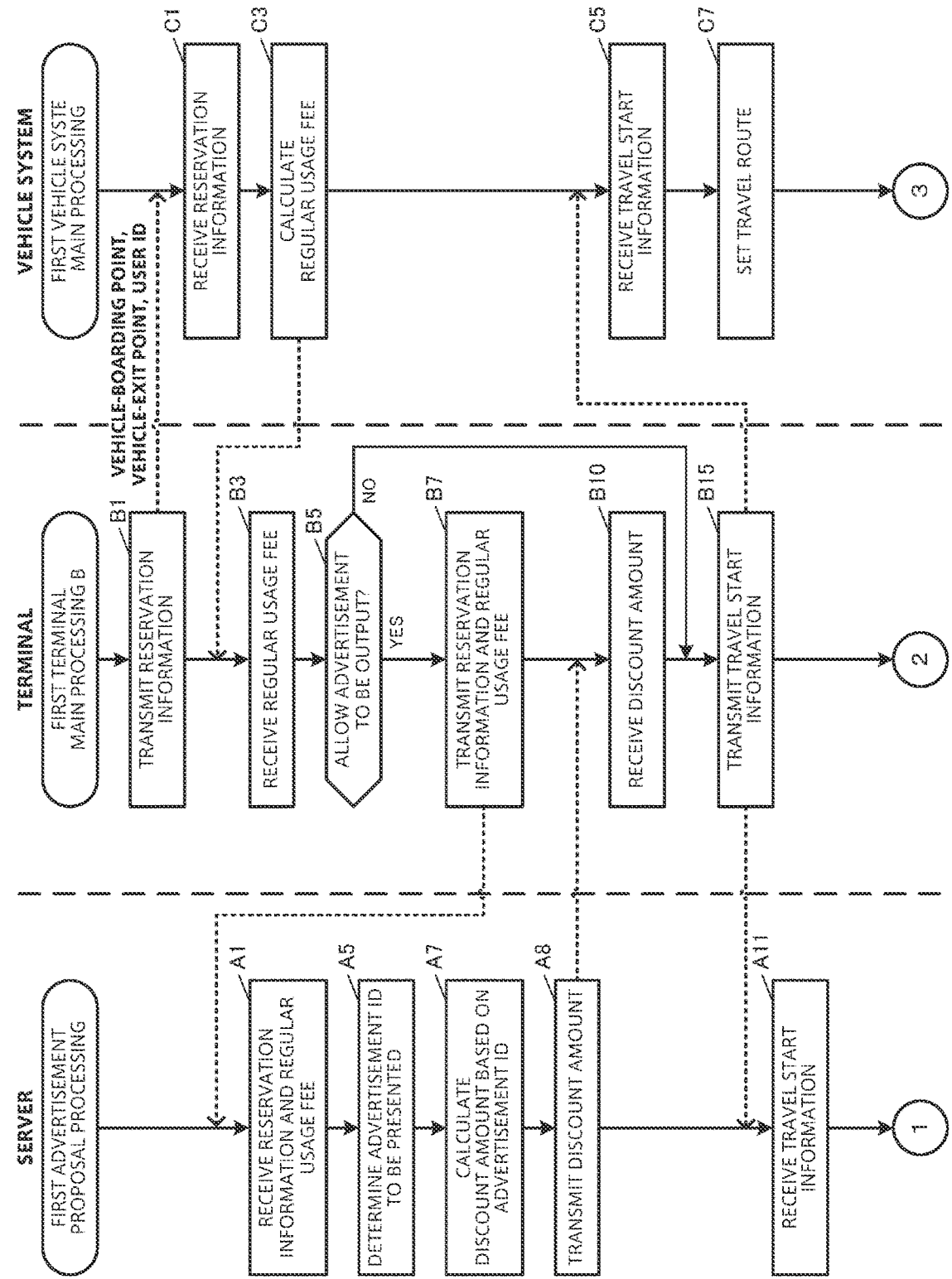

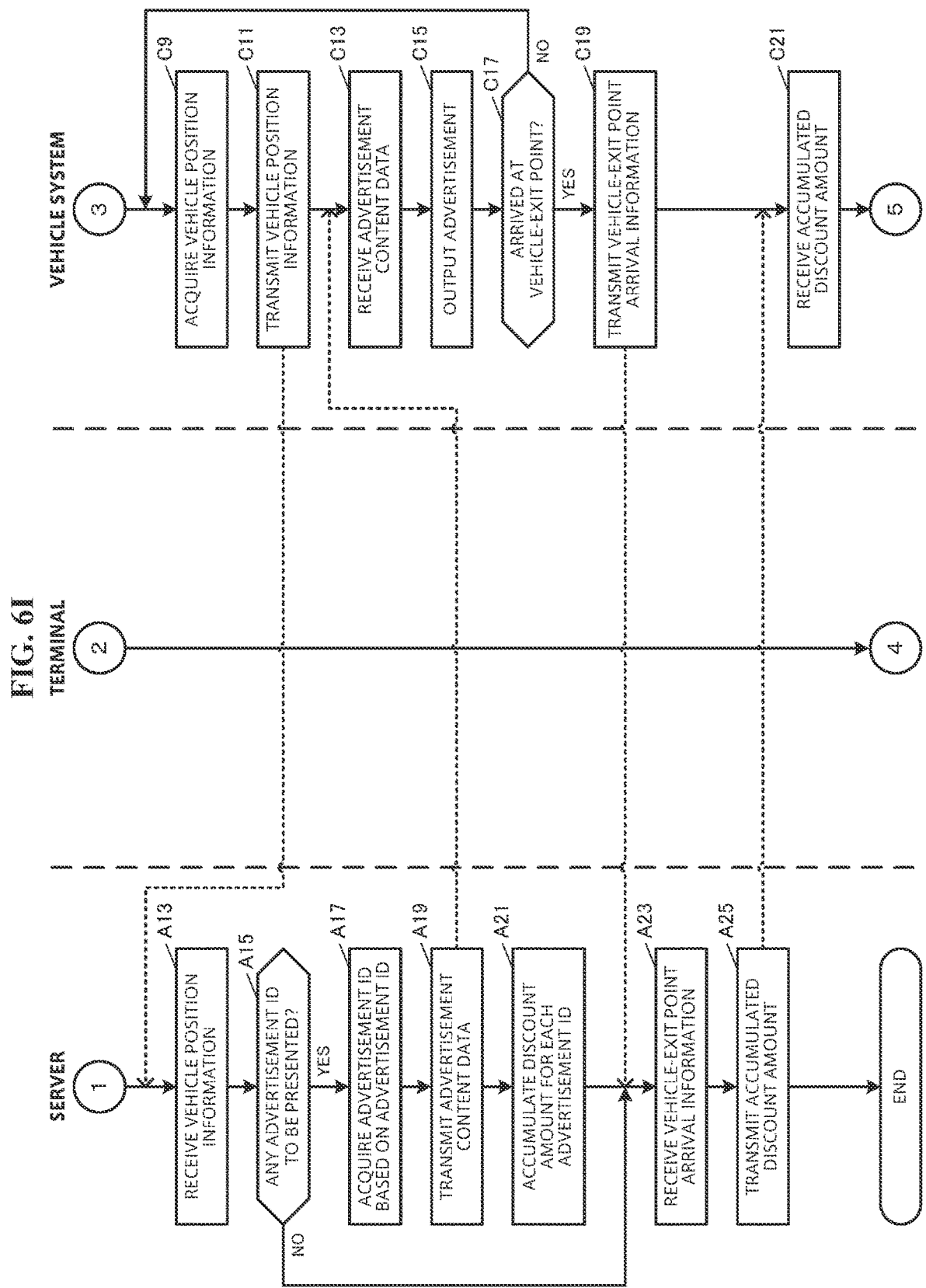

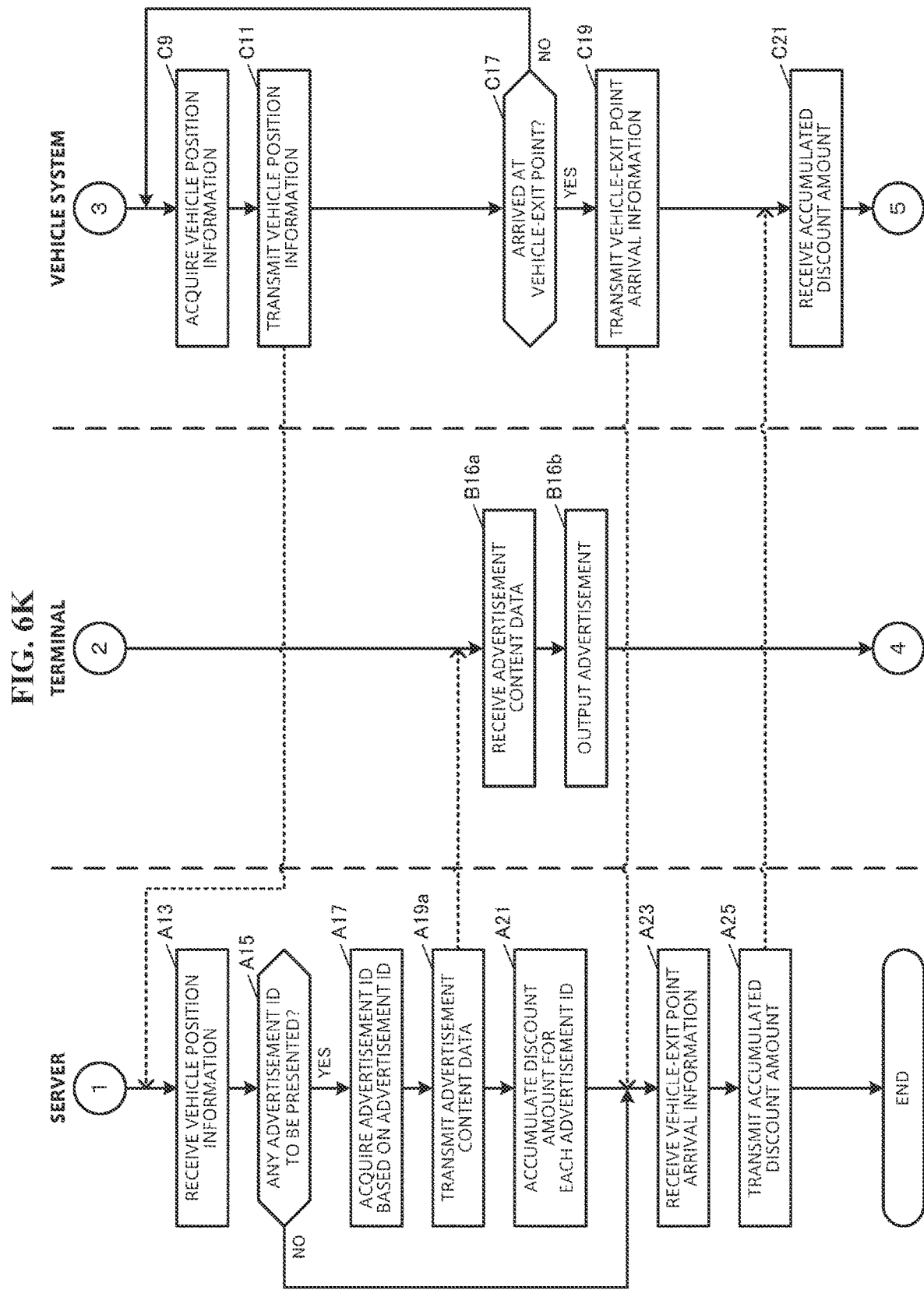

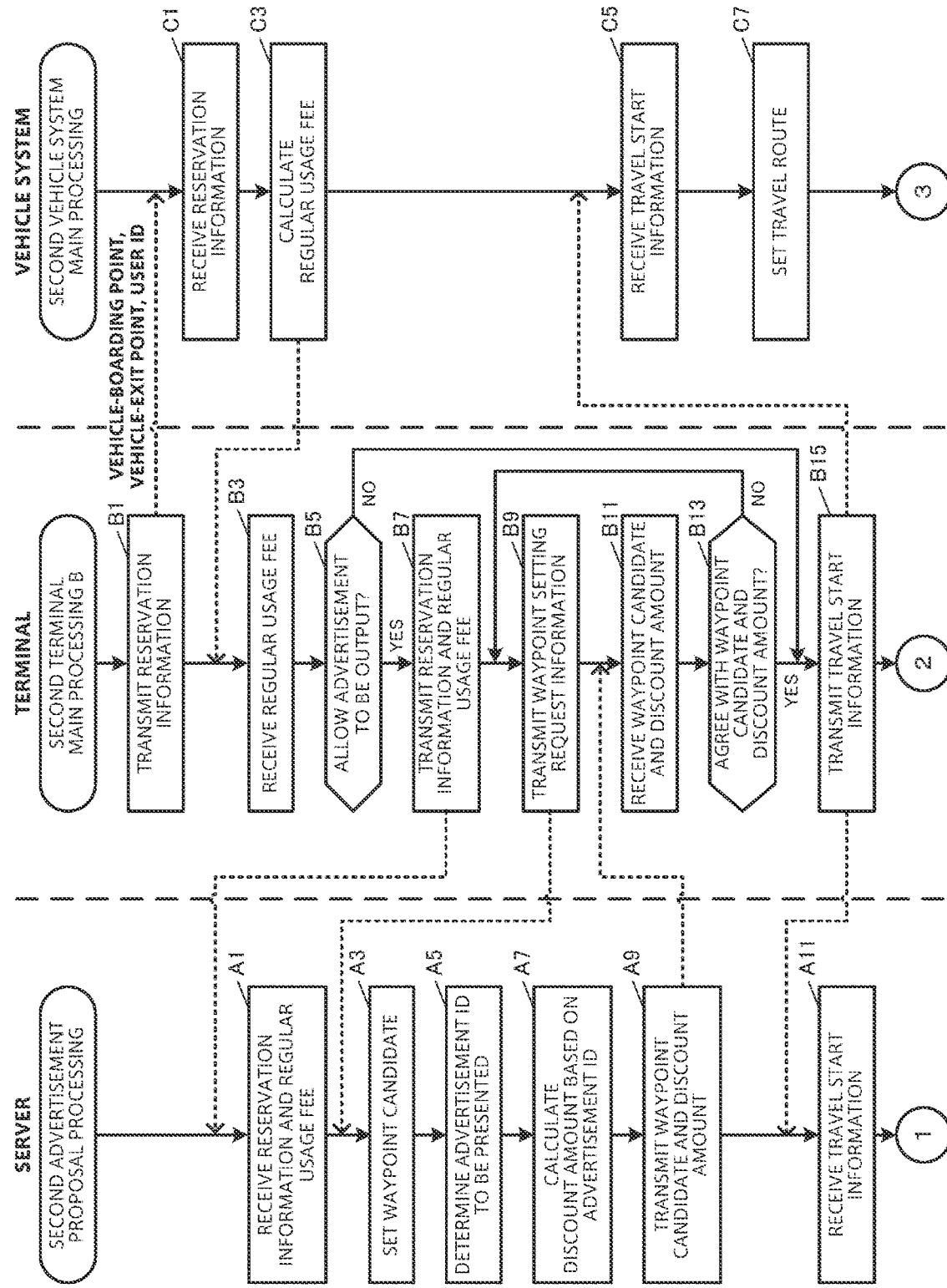

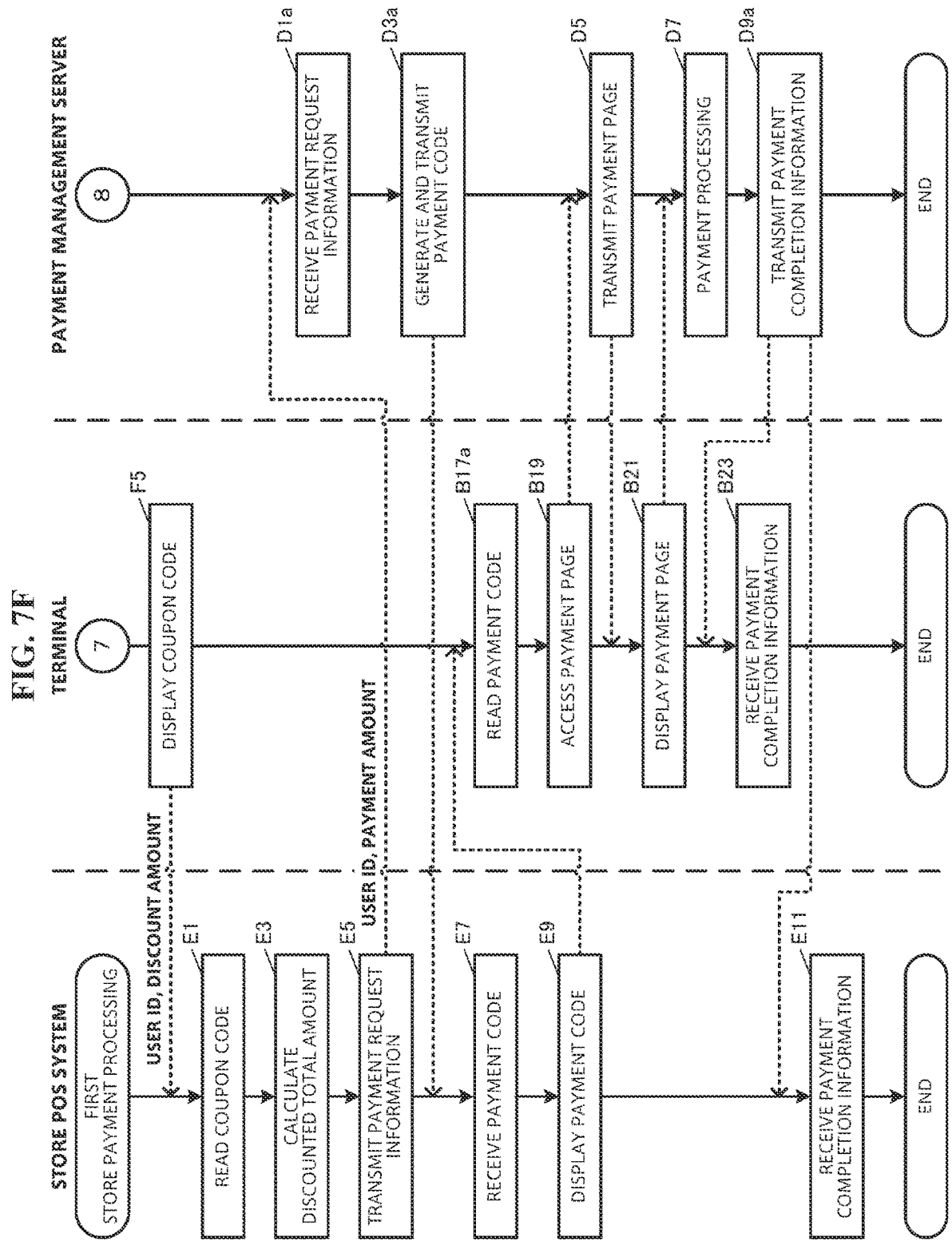

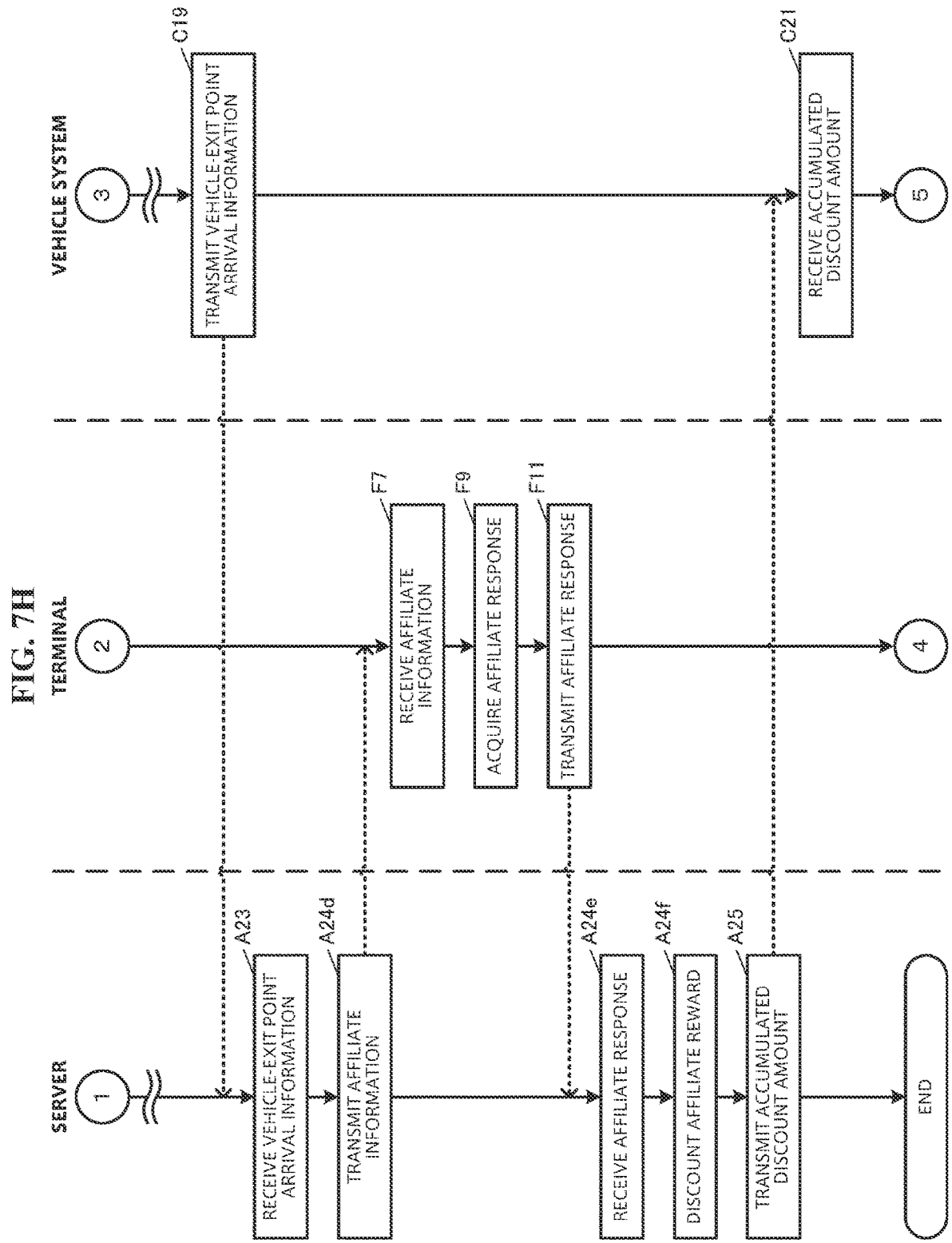

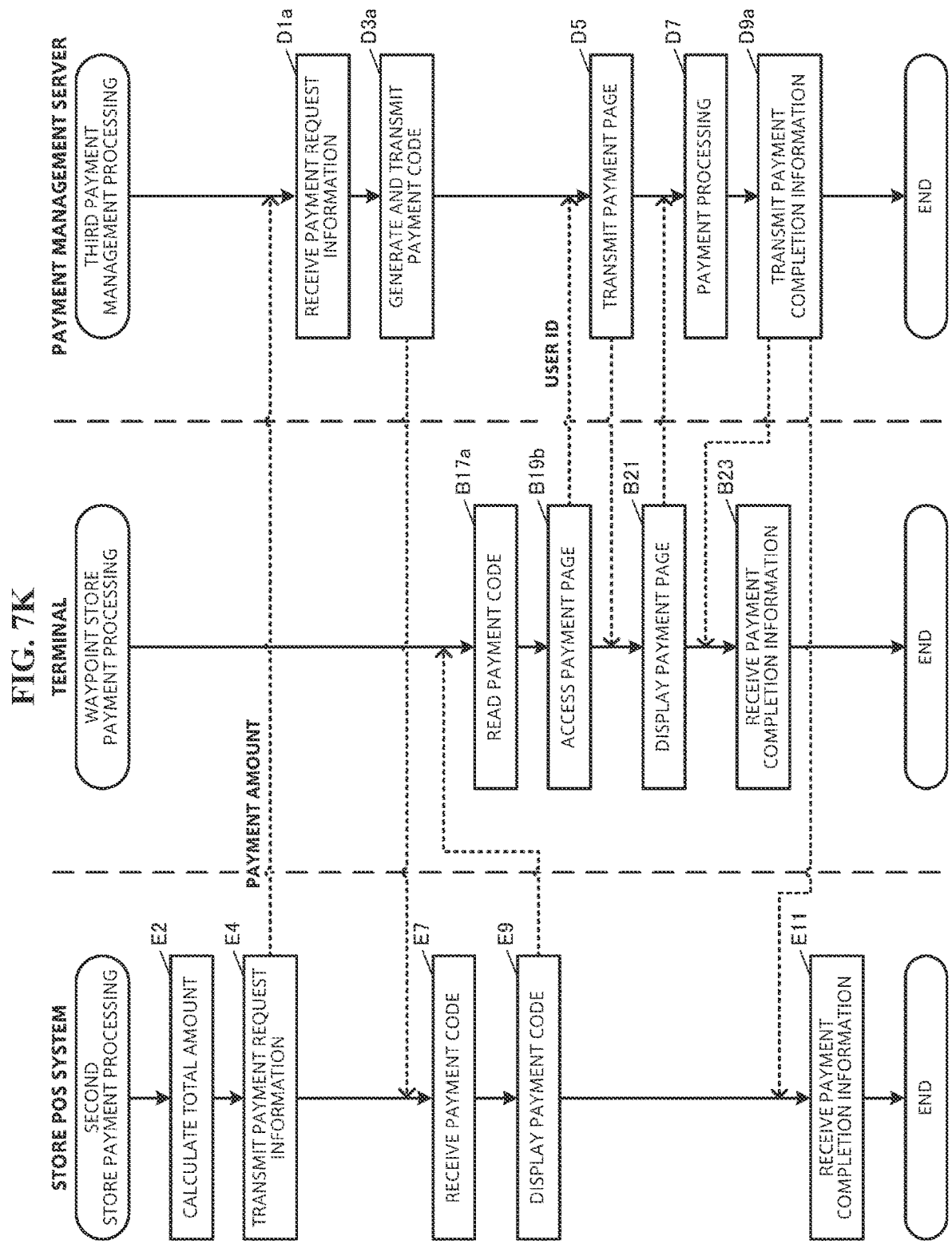

| USER CLASSIFICATION ID | TARGET SEX | TARGET AGE RANGE | TARGET PLACE OF RESIDENCE | OTHER TARGET INFORMATION |
|---|---|---|---|---|
| S0001 | MALE | 20 ~ 29 | IN JAPAN | [ ... ] |
| S0002 | MALE | 30 ~ 49 | OUTSIDE JAPAN | [ ... ] |
| S0003 | FEMALE | 20 ~ 29 | IN JAPAN | [ ... ] |
| S0004 | FEMALE | 30 ~ 49 | IN JAPAN | [ ... ] |
| S0005 | MALE AND FEMALE | 0 ~ 19 | OUTSIDE JAPAN | ... |
| ... | ... | ... | ... | ... |

FIG. 8C

ADVANCED ADVERTISEMENT MANAGEMENT DATA (156A)

| ADVERTISEMENT ID | A0001 |
|---|---|
| ADVERTISEMENT TITLE | ○× FITNESS GYM |
| ADVERTISEMENT AREA | LATITUDE xxxxx NORTH, LONGITUDE yyyyy EAST, RADIUS z METER |

ADVERTISEMENT INFORMATION TABLE

| TARGET USER CLASSIFICATION ID | ADVERTISEMENT AREA RELEVANT FLAG | ADVERTISEMENT UNIT PRICE | DISTRIBUTION ADVERTISEMENT CONTENT ID |
|---|---|---|---|
| S0001 | ○ | ¥700 | C0001,C0004 |
| S0001 | × | ¥300 | C0003 |
| S0002 | ○ | ¥900 | C0001,C0004 |
| S0002 | × | ¥500 | C0003 |
| S0003 or S0004 | ○ | ¥200 | C0002 |
| ... | ... | ... | ... |
| N/A | ○ | ¥100 | C1000 |
| ... | ... | ... | ... |

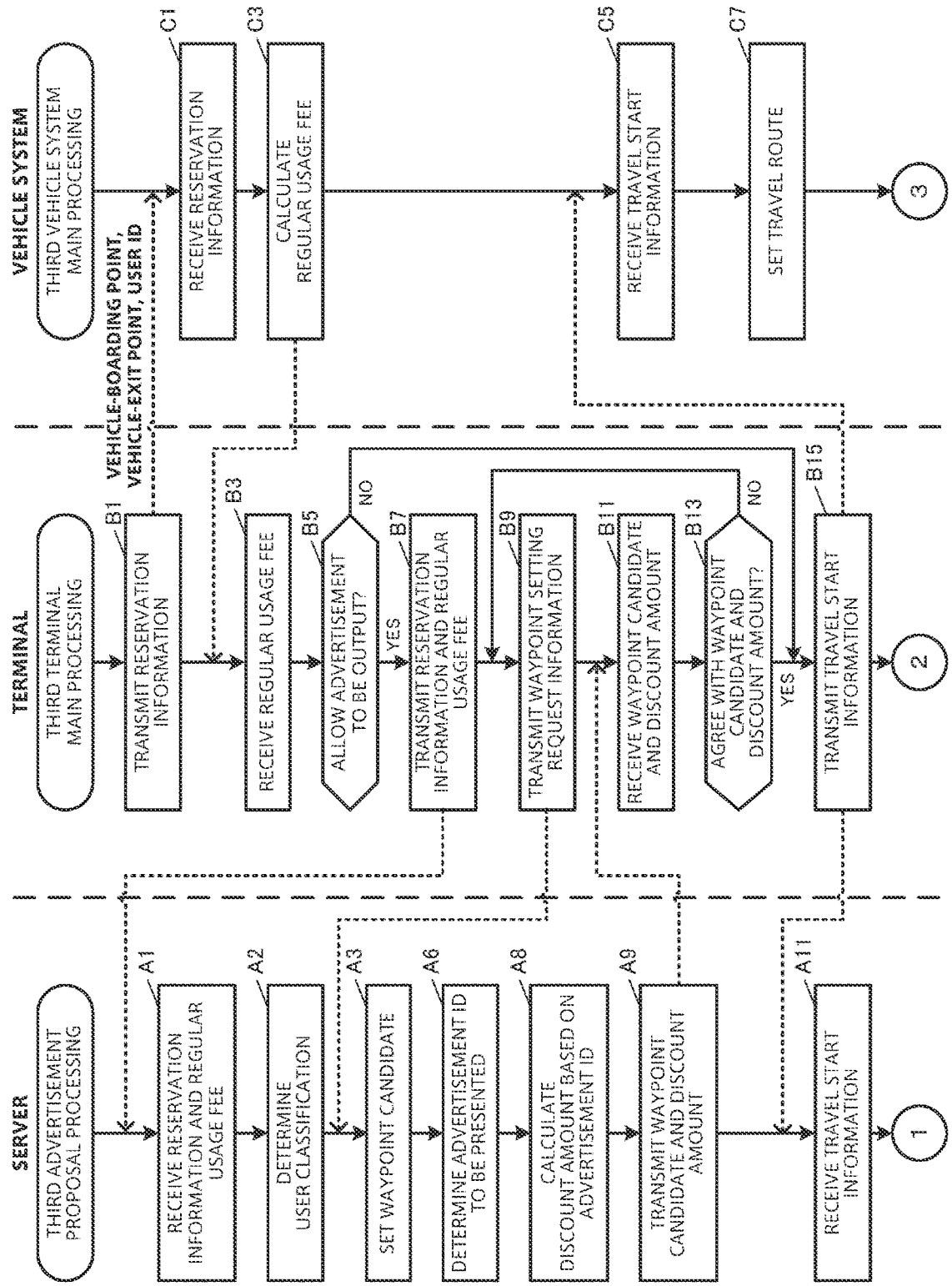

FIG. 8E

ADVANCED ADVERTISEMENT MANAGEMENT DATA

| ADVERTISEMENT ID | A0001 |
|---|---|
| ADVERTISEMENT TITLE | ○× FITNESS GYM |
| ADVERTISEMENT AREA | LATITUDE xxxxx NORTH, LONGITUDE yyyyy EAST, RADIUS z METER |

ADVERTISEMENT INFORMATION TABLE

| TARGET USER CLASSIFICATION ID | ADVERTISEMENT AREA RELEVANT FLAG | ADVERTISEMENT OUTPUT TIME SLOT | ADVERTISEMENT UNIT PRICE | DISTRIBUTION ADVERTISEMENT CONTENT ID |
|---|---|---|---|---|
| S0001 | ○ | 7:00~17:00 | ¥600 | C0001 |
| S0001 | ○ | 17:00~21:00 | ¥1,000 | C0001,C0002 |
| S0001 | ○ | 21:00~7:00 | ¥400 | C0003 |
| S0001 | × | 7:00~21:00 | ¥300 | C0001 |
| S0001 | × | 21:00~7:00 | ¥200 | C0003 |
| ... | ... | ... | ... | ... |
| N/A | ○ | 0:00~24:00 | ¥100 | C1000 |
| ... | ... | ... | ... | ... |

FIG. 8F

ADVANCED ADVERTISEMENT MANAGEMENT DATA (156C)

| ADVERTISEMENT ID | A0028 |
|---|---|
| ADVERTISEMENT TITLE | O × HOTEL |
| ADVERTISEMENT AREA | LATITUDE aaaaa NORTH, LONGITUDE eeeee EAST, RADIUS h METER |

ADVERTISEMENT INFORMATION TABLE

| TARGET USER CLASSIFICATION ID | ADVERTISEMENT AREA RELEVANT FLAG | ADVERTISEMENT OUTPUT TIME SLOT | ADVERTISEMENT UNIT PRICE | DISCOUNT COEFFICIENT | DISTRIBUTION ADVERTISEMENT CONTENT ID |
|---|---|---|---|---|---|
| S0001 | ○ | 1:00~17:00 | ¥300 | 0.5 | C0051 |
| S0001 | ○ | 17:00~23:00 | ¥800 | 0.5 | C0052 |
| S0001 | ○ | 23:00~1:00 | ¥800 | 0.8 | C0052 |
| S0001 | × | 1:00~17:00 | ¥200 | 0.1 | C0051 |
| S0001 | × | 17:00~1:00 | ¥400 | 0.1 | C0052 |
| ... | ... | ... | ... | ... | ... |
| N/A | ○ | 0:00~24:00 | ¥100 | 0.5 | C0051 |
| ... | ... | ... | ... | ... | ... |

FIG. 8G

ADVANCED ADVERTISEMENT MANAGEMENT DATA — 156D

| ADVERTISEMENT ID | A0001 |
|---|---|
| ADVERTISEMENT TITLE | O× FITNESS GYM |
| ADVERTISEMENT AREA | LATITUDE xxxxx NORTH, LONGITUDE yyyyy EAST, RADIUS z METER |

ADVERTISEMENT INFORMATION TABLE

| TARGET USER CLASSIFICATION ID | ADVERTISEMENT AREA RELEVANT FLAG | VEHICLE INTERIOR ADVERTISEMENT OUTPUT FLAG | VEHICLE EXTERIOR ADVERTISEMENT OUTPUT FLAG | ADVERTISEMENT UNIT PRICE | DISTRIBUTION ADVERTISEMENT CONTENT ID |
|---|---|---|---|---|---|
| S0001 | ○ | ○ | × | ¥300 | C0001 |
| S0001 | × | ○ | × | ¥200 | C0001 |
| S0001 | ○ | × | ○ | ¥600 | C0002 |
| S0001 | ○ | ○ | ○ | ¥1,000 | C0001,C0002 |
| S0003,S0004 | ○ | ... | ○ | ¥200 | C0003 |
| ... | ... | ... | ... | ... | ... |
| N/A | ○ | ○ | ○ | ¥100 | C1000 |
| ... | ... | ... | ... | ... | ... |

INFORMATION PROCESSING METHOD, PROGRAM, AND TERMINAL

CROSS-REFERENCE TO RELATED APPLICATIONS

This application is a continuation of International Application No. PCT/JP2019/045440 filed on Nov. 20, 2019, which claims priority from Japanese Patent Application No. 2019-076692, filed on Apr. 12, 2019, in the Japanese Patent Office, the disclosures of which are incorporated herein by reference in their entireties.

BACKGROUND

1. Field

The present disclosure relates to an information processing method, a program, and a terminal.

2. Description of Related Art

In a mode of use of vehicles, a user may move by using a transportation means such as a taxi, a bus, a train, or a rental car, for example. Research has been conducted regarding payment of a fare for a public transportation vehicle that a user has boarded. Nonetheless, there is room for improving a method of setting and processing a usage fee for vehicles.

SUMMARY

According to an aspect of an example embodiment, there is provided an information processing method to be carried out by a terminal that is configured to communicate with an electronic device, the electronic device being configured to manage information related to a vehicle, the information processing method including: receiving vehicle usage fee information related to a vehicle usage fee for the vehicle from the electronic device, through a communication interface of the terminal, the vehicle usage fee being based on an advertisement that is displayed on a display device of the vehicle; and displaying a first display that is based on the vehicle usage fee information, in a display area of the terminal.

The information processing method may further include: applying an advertisement display setting, by a processor of the terminal, to the display device of the vehicle to display the advertisement.

The vehicle usage fee may be discounted to a discounted vehicle usage fee based on the advertisement display setting, and the first display may include the discounted vehicle usage fee.

The information processing method may further include: displaying, in the display area of the terminal, a second display related to the advertisement display setting, wherein the advertisement display setting may be created or applied based on a user of the terminal inputting information to the second display.

The second display may include a first setting for displaying the advertisement on the display device of the vehicle, and a second setting for not displaying the advertisement on the display device of the vehicle.

The information processing method may further include: displaying first route information related to a first route through which the vehicle is to travel, and second route information related to a second route through which the vehicle is to travel, in at least the display area of the terminal; and transmitting, by the communication interface, either the first route information or the second route information selected based on an input from a user of the terminal, to the electronic device.

The information processing method may further include: displaying, in the display area of the terminal, a first advertisement related to the first route information or a second advertisement related to the second route information.

The advertisement displayed on the display device of the vehicle may be selected based on either the first route information or the second route information selected based on the input from the user of the terminal.

The first route information and the second route information may be displayed in the display area of the terminal based on user information related to the user of the terminal.

The information processing method may further include: performing, by a processor of the terminal, a travel-related processing operation that is related to traveling, by the vehicle, to a location related to the advertisement displayed on the display device of the vehicle; and receiving, through the communication interface of the terminal, vehicle usage fee information related to the vehicle usage fee that is based on the travel-related processing operation, from the electronic device.

The vehicle usage fee may be discounted to a discounted vehicle usage fee based on the travel-related processing operation, and the first display may include the discounted vehicle usage fee.

The information processing method may further include: performing, by the processor, a payment-related processing operation that is related to a first payment for a product or a service provided by a store at the location related to the advertisement, to which the vehicle has traveled based on the travel-related processing operation, wherein the display area of the vehicle may display a payment amount of the first payment that is based on the payment-related processing operation.

The information processing method may further include: performing, by the processor, a payment-related processing operation that is related to a payment for a product or a service provided by a store at the location related to the advertisement, to which the vehicle has traveled based on the travel-related processing operation; and receiving, by the communication interface of the terminal, coupon information related to the store based on the payment-related processing operation.

The information processing method may further include: acquiring, by a processor of the terminal, an input related to the advertisement displayed on the display device of the vehicle, wherein the vehicle usage fee may be discounted to a discounted vehicle usage fee based on the input related to the advertisement, and the first display may include the discounted vehicle usage fee.

The information processing method may further include: acquiring, by a processor of the terminal, selection of a route that includes a waypoint at which the vehicle is to stop off and which is different from a destination of the vehicle, from among a plurality of routes that are available for the vehicle to arrive at the destination, wherein the vehicle usage fee may be discounted to a discounted vehicle usage fee based on the selection of the route, and the first display may be the discounted vehicle usage fee.

The information processing method may further include: performing, by the processor, a payment-related processing operation related to a second payment for a product or a service provided at a store related to the waypoint, wherein the display area of the vehicle may display a payment amount of the second payment based on the selection of the route.

The electronic device may be provided in the vehicle.

The electronic device may include the display device.

According to an aspect of another example embodiment, there is provided a non-transitory computer readable storage medium storing program instructions that are executable by a processor of a terminal to perform information processing method, the terminal being configured to communicate with an electronic device, the electronic device being configured to manage information related to a vehicle, the information processing method including: receiving vehicle usage fee information related to a vehicle usage fee for the vehicle from the electronic device, through a communication interface of the terminal, the vehicle usage fee being based on display of an advertisement on a display device of the vehicle; and displaying a first display that is based on the vehicle usage fee information, in a display area of the terminal.

According to an aspect of another example embodiment, there is provided a terminal configured to communicate with an electronic device that is configured to manage information related to a vehicle, the terminal including: a communication interface configured to communicate with the electronic device; a memory configured to store one or more computer-readable instructions; and one or more processors configured to execute the one or more computer-readable instructions to: control the communication interface to receive vehicle usage fee information related to a vehicle usage fee for the vehicle from the electronic device, the vehicle usage fee being based on display of an advertisement on a display device of the vehicle; and display a first display that is based on the vehicle usage fee information.

BRIEF DESCRIPTION OF DRAWINGS

The above and other aspects, features, and advantages of certain embodiments of the present disclosure will be more apparent from the following description taken in conjunction with the accompanying drawings, in which:

FIG. 2A is a diagram showing an example of an advertisement discount database according to a first example.

FIG. 2B is a flowchart showing an example of the flow of processing that is performed by devices according to the first example.

FIG. 3C is a flowchart showing an example of the flow of processing that is performed by devices according to the second example.

FIG. 6C is a diagram showing an example of user registration data according to the third example.

FIG. 6D is a diagram showing an example of advertisement content data according to the third example.

FIG. 6H is a flowchart showing an example of the flow of processing that is performed by devices according to the third example.

FIG. 6I is a flowchart showing an example of the flow of processing that is performed by devices according to the third example.

FIG. 6K is a flowchart showing an example of the flow of processing that is performed by devices according to the third example.

FIG. 7A is a flowchart showing an example of the flow of processing that is performed by devices according to a fourth example.

FIG. 7F is a flowchart showing an example of the flow of processing that is performed by devices according to the fourth modification.

FIG. 7H is a flowchart showing an example of the flow of processing that is performed by devices according to the fourth modification.

FIG. 7K is a flowchart showing an example of the flow of processing that is performed by devices according to the fourth modification.

FIG. 8B is a diagram showing an example of user classification data according to the fifth example.

FIG. 8C is a diagram showing an example of an advanced advertisement management database according to the fifth example.

FIG. 8D is a flowchart showing an example of the flow of processing that is performed by devices according to the fifth example.

FIG. 8E is a diagram showing an example of the advanced advertisement management database according to a fifth modification.

FIG. 8F is a diagram showing an example of the advanced advertisement management database according to the fifth modification.

FIG. 8G is a diagram showing an example of the advanced advertisement management database according to the fifth modification.

DETAILED DESCRIPTION

Figure 1:
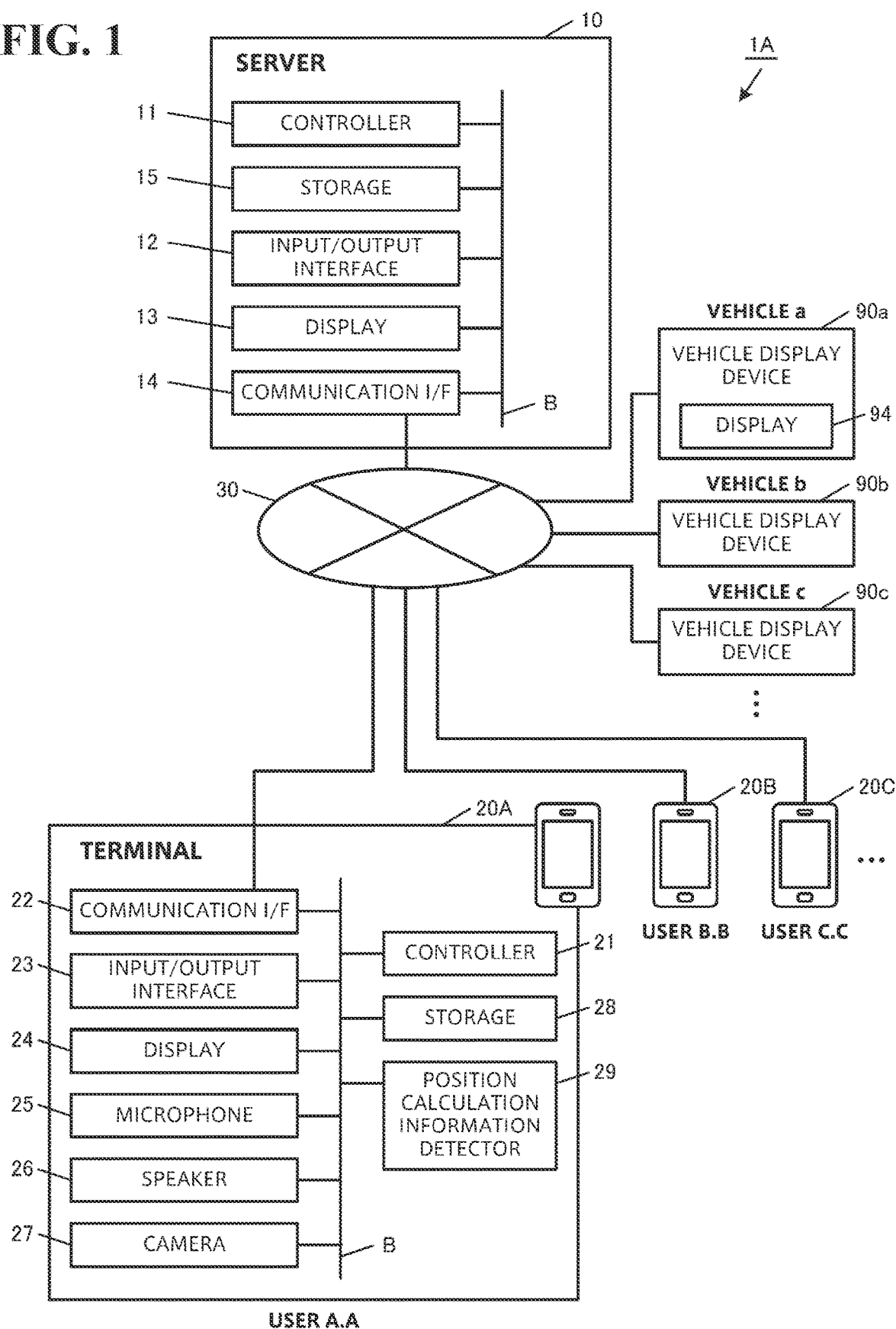
FIG. 1 is a diagram showing an example of a configuration of a communication system in an aspect of an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

System Configuration

FIG. 1 is a diagram showing an example of a configuration of a communication system 1A according to an embodiment of the present disclosure.

In a non-limiting example of the communication system 1A, a server 10, terminals 20 (a terminal 20A, a terminal 20B, a terminal 20C, and so on), and vehicle display devices 90 (a vehicle display device 90a, a vehicle display device 90b, a vehicle display device 90c, and so on) are connected to each other via a network 30.

The server 10 (a non-limiting example of an electronic device, a server, an information processing device, or an information management device) may calculate a usage fee for a vehicle that is provided with a vehicle display device 90, based on an advertisement displayed on the vehicle display device 90.

Each terminal 20 (a non-limiting example of a terminal or an information processing device) may receive and display the usage fee calculated by the server 10.

The network 30 serves to connect one or more servers 10, one or more vehicle display devices 90, and one or more terminals 20 to each other. That is to say, the network 30 is a communication network that provides a connection path to enable the aforementioned devices to transmit and receive data to and from each other once the devices have connected to each other.

The number of devices of each type connected to the network 30 is not limited.

One or more sections of the network 30 may be a wired network or a wireless network. Non-limiting examples of the network 30 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of a public switched telephone network (PSTN), a mobile phone network, an integrated service digital network (ISDN), a radio LAN, long term evolution (LTE), code division multiple access (CDMA), Bluetooth (registered trademark), satellite communication, and so on, and a combination of two or more of these networks. The network 30 may include one or more networks 30.

Each of the terminals 20 (the terminal 20A, the terminal 20B, the terminal 20C, and so on) (non-limiting examples of a terminal or an information processing device) may be any type of terminal as long as it is an information processing terminal that is capable of realizing the functions described in each embodiment. Non-limiting examples of the terminals 20 include a smartphone, a mobile phone (a feature phone), a computer (non-limiting examples of which include a desktop, a laptop, and a tablet), a media computer platform (non-limiting examples of which include cable and satellite set-top boxes and a digital video recorder), a handheld computer device (non-limiting examples of which include a personal digital assistant (PDA) and an email client), a wearable terminal (an eyeglasses-type device, a watch-type device, or the like), and other types of computers and communication platforms. The terminals 20 may also be referred to as information processing terminals.

The terminal 20A, the terminal 20B, and the terminal 20C may have substantially the same configuration, and therefore the following describes a terminal 20. Also, when necessary, a terminal that is used by a user X is referred to as a terminal 20X, and user information that is associated with the user X or the terminal 20X in a predetermined service is referred to as user information X. Note that user information is information regarding a user associated with an account that is used by the user in a predetermined service. Non-limiting examples of the user information include information that is input by the user or is assigned by a predetermined service, and is associated with the user, such as the user's name, the user's age, the user's sex, the user's address, the user's hobbies/preferences, and the user's identifier, and the user information may optionally be any one of, or a combination of two or more of, these pieces of information.

The server 10 (a non-limiting example of a server, an information processing device, or an information management device) may provide a predetermined service to either one or both of the vehicle display device 90 and the terminal 20. The server 10 may be any type of device as long as it is an information processing device that is capable of realizing the functions described in each embodiment. Non-limiting examples of the server 10 include a server device, a computer (non-limiting examples of which include a desktop, a laptop, and a tablet), a media computer platform (non-limiting examples of which include cable and satellite set-top boxes and a digital video recorder), a handheld computer device (non-limiting examples of which include a PDA and an email client), and other types of computers and communication platforms. The server 10 may also be referred to as an information processing device.

Each of the vehicle display devices 90 (non-limiting examples of electronic devices) is configured to display an advertisement on a display unit (e.g., a display) 94. The vehicle display devices 90 may also be referred to as vehicle devices.

The vehicle display device 90*a*, the vehicle display device 90*b*, and the vehicle display device 90*c* may have substantially the same configuration, and therefore the following describes the configuration of a vehicle display device 90.

Non-limiting examples of the vehicle display device 90 include a server device, a computer (non-limiting examples of which include a desktop, a laptop, and a tablet), a media computer platform (non-limiting examples of which include cable and satellite set-top boxes and a digital video recorder), a handheld computer device (non-limiting examples of which include a PDA and an email client), other types of computers and communication platforms, and so on. The vehicle display device 90 may be referred to as an information processing device, an information management device, or an electronic device.

In a non-limiting example, the vehicle display device 90 is used in the state of being provided in (mounted in) a vehicle used as a means of transportation, in a vehicle rental service that is carried out as a business by a business operator that is affiliated with a business operator that operates the server 10.

The present embodiment describes a non-limiting example in which a rental vehicle in a rental car business is an example of a vehicle and the vehicle display device 90 is used in the state of being mounted in such a rental vehicle.

Hardware (HW) Configuration of Each Device

The following describes the HW configuration of each device included in the communication system 1A.

(1) HW Configuration of Terminal

FIG. 1 shows an example of the HW configuration of the terminal 20.

The terminal 20 includes a controller (e.g., a central processing unit (CPU), or one or more processors) 21, a storage (or memory) 28, a communication interface (I/F) 22, an input/output interface 23, a display 24, a microphone 25, a speaker 26, a camera 27, and a position calculation information detector 29. In a non-limiting example, the HW constituent elements of the terminal 20 are connected to each other via a bus B. Note that the HW configuration of the terminal 20 does not necessarily have to include all of the constituent elements. In a non-limiting example, the terminal 20 may optionally be configured such that one or more of the plurality of constituent elements such as the microphone 25 and the camera 27 are removable.

The communication I/F 22 transmits and receives various kinds of data via the network 30. Communication may be carried out in a wired or wireless manner, and any communication protocol may be employed as long as it realizes mutual communication. The communication I/F 22 may perform performing communication with various devices such as the server 10 via the network 30. The communication I/F 22 transmits various kinds of data to various devices such as the server 10 according to instructions from the controller 21. Also, the communication I/F 22 receives various kinds of data transmitted from various devices such as the server 10, and conveys the data to the controller 21. The communication I/F 22 may simply be referred to as a communication interface. When the communication I/F 22 is constituted by a physically structured circuit, the communication I/F 22 may also be referred to as a communication circuit.

The input/output interface 23 includes a device that inputs various operations to the terminal 20, and a device that outputs the results of processing performed by the terminal 20. The input/output interface 23 may optionally be constituted by an input device and an output unit that are integrated into a single unit, or an input device and an output unit that are separate from each other.

The input device is realized using any one of various kinds of devices that are capable of accepting input from a user and conveying information regarding the input to the controller 21, or a combination of such devices. Non-limiting examples of the input device include a touch panel, a touch display, hardware keys such as a keyboard, a pointing device such as a mouse, a camera (input of operations using moving images), and a microphone (input of operations using sound).

The output unit is realized using any one of various kinds of devices that are capable of outputting the results of processing performed by the controller 21, or a combination of such devices. Non-limiting examples of the output unit include a touch panel, a touch display, a speaker (audio output), a lens (non-limiting examples of which include 3D (three-dimensional) output and hologram output), a printer, and so on.

The display 24 is realized using any one of various kinds of devices that are capable of performing display based on display data written into a frame buffer, or a combination of such devices. Non-limiting examples of the display 24 include a touch panel, a touch display, a monitor (non-limiting examples of which include a liquid crystal display and an organic electroluminescence display (OELD)), a head mounted display (HMD), a head up display (HUD), and devices that are capable of displaying images, text information, and the like using projection mapping or holograms, or in the air (may optionally be a vacuum). Note that the display 24 may optionally be capable of displaying display data in 3D.

If the input/output interface 23 is a touch panel, the input/output interface 23 and the display 24 may have substantially the same size and shape, and be arranged so as to face each other.

The position-calculation-information detector 29 is a functional unit that detects (measures) information that is necessary for the controller 21 to calculate (measure) a position or location of the terminal 20 that includes the controller 21. In a non-limiting example, the position calculation information detector 29 may also be referred to as a position calculation sensor.

Non-limiting examples of the position calculation information detector 29 include a satellite positioning sensor (a satellite positioning unit) that is a sensor or a unit for calculating the position of the terminal 20 using a satellite positioning system such as a Global Positioning System (GPS), an inertial measurement sensor (e.g., Inertial Measurement Unit (IMU)) that is a sensor or a unit for calculating the position of the terminal 20 using an inertial navigation system, and so on.

In a non-limiting example, the satellite positioning sensor includes a Radio Frequency (RF) receiving circuit that converts RF signals, which include a positioning satellite signal emitted from a positioning satellite and received by an antenna, into digital signals, a baseband processing circuit that captures the positioning satellite signal by performing correlation operation processing or the like on a digital signal output from the RF receiving circuit and outputs information such as satellite orbit data and time data that are taken out of the positioning satellite signal, as position calculation information, and so on.

The inertial measurement sensor includes an inertial sensor that is a sensor for detecting information necessary to calculate the position of the terminal 20 through an inertial navigation operation. In a non-limiting example, the inertial sensor includes a three-axis acceleration sensor and a three-axis gyroscope sensor, and outputs acceleration detected by the acceleration sensor and an angular velocity detected by the gyroscope sensor, as position calculation information.

The position calculation information detector 29 may optionally include an arithmetic unit and a processing device such as a CPU and a digital signal processor (DSP) so that the position of the terminal 20 can be calculated (measured) and output by the position calculation information detector 29 based on the detected position calculation information.

The controller 21 includes a physically structured circuit for executing functions that are realized using codes or commands that are included in a program, and in a non-limiting example, the controller 21 is realized using a data processing device that is built into hardware. Therefore, the controller 21 may optionally be referred to as a control circuit.

Non-limiting examples of the controller 21 include a central processing unit (CPU), a microprocessor, a processor core, a multiprocessor, an Application-Specific Integrated Circuit (ASIC), and a Field Programmable Gate Array (FPGA).

The storage may store various programs and various kinds of data that are necessary for the terminal 20 to operate. Non-limiting examples of the storage 28 include various kinds of storage media such as a Hard Disk Drive (HDD), a Solid State Drive (SSD), a flash memory, a Random Access Memory RAM), and a Read Only Memory (ROM).

The terminal 20 stores a program P in the storage 28, and the controller 21 executes the program P to perform processing as the units that are included in the controller 21. That is to say, the program P stored in the storage 28 enables the terminal 20 to realize the functions to be performed by the controller 21. The program P may optionally be referred to as a program module.

The microphone 25 is used to input acoustic data. The speaker 26 is used to output acoustic data. The camera 27 is used to acquire moving image data. The camera 27 may optionally be configured to be capable of detecting three-dimensional information by using invisible light such as infrared light.

(2) HW Configuration of Server

FIG. 1 shows an example of the HW configuration of the server 10.

The server 10 includes a controller 11, a storage (or memory) 15, a communication interface (I/F) 14, an input/output interface 12, and a display 13. In a non-limiting example, the HW constituent elements of the server 10 are connected to each other via the bus B. Note that the HW of the server 10 does not necessarily have to include all of the constituent elements in the HW configuration of the server 10. In a non-limiting example, the HW of the server 10 may optionally be configured such that the display 13 is removable.

The controller 11 includes a physically structured circuit for executing functions that are realized using codes or commands that are included in a program, and in a non-limiting example, the controller 11 is realized using a data processing device that is built into hardware.

The controller 11 is typically a central processing unit (CPU), and may optionally be a microprocessor, a processor core, a multiprocessor, an Application-Specific Integrated Circuit (ASIC), or a Field Programmable Gate Array (FPGA). In the present disclosure, the controller 11 is not limited to these examples.

The storage 15 may store various programs and various kinds of data that are necessary for the sever 10 to operate. The storage 15 is realized using various storage media such as an HDD, an SSD, and a flash memory. However, in the present disclosure, the storage 15 is not limited to these examples.

The communication I/F 14 transmits and receives various kinds of data via the network 30. Communication may be carried out in a wired or wireless manner, and any communication protocol may be employed as long as it realizes mutual communication. The communication I/F 14 may perform communication with various devices such as the terminal 20 via the network 30. The communication I/F 14 transmits various kinds of data to various devices such as the terminal 20 according to instructions from the controller 11. Also, the communication I/F 14 receives various kinds of data transmitted from various devices such as the terminal 20, and conveys the data to the controller 11. The communication I/F 14 may simply be referred to as a communication interface. When the communication I/F 14 is constituted by a physically structured circuit, the communication I/F 14 may also be referred to as a communication circuit.

The input/output interface 12 is realized using a device that inputs various operations to the server 10. The input/output interface 12 is realized using any one of various kinds of devices that are capable of accepting input from a user and conveying information regarding the input to the controller 11, or a combination of such devices. The input/output interface 12 is typically realized using hardware keys such as a keyboard, and a pointing device such as a mouse. Note that, in a non-limiting example, the input/output interface 12 may optionally include a touch panel, a camera (input of operations using moving images), or a microphone (input of operations using voice). However, in the present disclosure, the input/output interface 12 is not limited to these examples.

The display 13 may be a monitor (non-limiting examples of which include a liquid crystal display and an organic electroluminescence display (OELD)). Note that the display 13 may optionally be a head mounted display (HMD) or the like. Note that the display 13 may optionally be capable of displaying display data in 3D. In the present disclosure, the display 13 is not limited to these examples.

(3) HW Configuration of Vehicle Display Device 90

FIG. 1 shows an example of the HW configuration of the vehicle display device 90.

In a non-limiting example, the vehicle display device 90 includes a display 94, and a controller (e.g., CPU, or one or more processors), a speaker, a communication I/F (e.g., communication interface), and a storage.

Note that the HW of the vehicle display device 90 does not necessarily have to include all of the constituent elements in the configuration of the vehicle display device 90. In a non-limiting example, the HW of the vehicle display device 90 may optionally be configured such that the speaker is removable.

Note that other pieces of HW, components, and so on for realizing the above-described constituent elements and functional units included in the vehicle display device 90 may be formed in the same manner as in the terminal 20, for example. Therefore, redundant descriptions thereof will be omitted.

Note that the vehicle display device 90 may optionally be a terminal (an on-board terminal) or a device (an on-board device) mounted in the vehicle. Also, the vehicle display device 90 may be an integrated device, or constituted by separate devices in which the constituent elements are separate from each other.

(5) Others

The server 10 stores the program P in the storage 15, and the controller 11 executes the program P to perform processing as the units that are included in the controller 11. That is to say, the program P stored in the storage 15 enables the sever 10 to realize the functions to be performed by the controller 11. The program P may optionally be referred to as a program module.

The same applies to other devices.

Embodiments of the present disclosure will be described assuming that the embodiments are realized as a result of the CPU(s) of the server 10 and/or the terminal 20 executing the program P.

The same applies to other devices.

Note that the controller 11 of the server 10 and/or the controller 21 of the terminal 20 may optionally realize each kind of processing by using not only the CPU(s) including a control circuit, but also a logic circuit (hardware) or a dedicated circuit that is formed on an integrated circuit (an integrated circuit (IC) chip or a large scale integration (LSI)) or the like. Also, these circuits may optionally be realized using one or more integrated circuits, and a plurality of kinds of processing described in the embodiments may optionally be realized using a single integrated circuit. LSI may be referred to as VLSI, super LSI, ultra LSI, or the like depending on the degree of integration. Therefore, the controller 11 may optionally be referred to as a control circuit.

The same applies to other devices.

The program P (non-limiting examples of which include a software program, a computer program, and a program module) in the embodiments of the present disclosure may optionally be provided in the state of being stored in a computer-readable storage medium. The program P can be stored in a "non-transitory tangible medium". Also, the program P may optionally be a program for realizing some of the functions described in the embodiments of the present disclosure. Furthermore, the program P may optionally be a so-called differential file (differential program) that can realize the functions of the embodiments of the present disclosure in combination with a program P that is already recorded on a storage medium.

The storage medium may include one or more semiconductor-based or other integrated circuits (ICs, non-limiting examples of which include field programmable gate arrays (FPGAs) and application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM drives, secure digital cards, drives, any other appropriate storage media, and an appropriate combination of two or more of these examples. Where appropriate, the storage medium may be a volatile storage medium, a non-volatile storage medium, or a combination of volatile and non-volatile storage media. Note that the storage medium is not limited to these examples, and may be any device or medium as long as it is capable of storing the program P. Also, the storage medium may optionally be referred to as a memory.

The server 10 and/or the terminal 20 can realize the functions of the plurality of functional units described in the embodiments by reading out the program P stored in the storage medium and executing the program P thus read out.

The same applies to other devices.

Also, the program P according to the present disclosure may optionally be provided to the server 10 and/or the terminal 20 via any transmission medium (a communication network, broadcast waves, etc.) that is capable of transmitting the program. In a non-limiting example, the server 10 and/or the terminal 20 realize(s) the functions of the functional units described in the embodiments by executing the program P downloaded via the Internet or the like.

The same applies to other devices.

The embodiments of the present disclosure may also be realized in the form of a data signal in which the program P is embodied through electronic transmission.

At least a portion of the processing performed by the server 10 and/or the terminal 20 may optionally be realized by a cloud computing system formed with one or more computers.

At least a portion of the processing performed by the terminal 20 may optionally be performed by the server 10. In such a case, at least a portion of the processing performed by the functional units of the controller 21 of the terminal 20 may optionally be performed by the server 10.

At least a portion of the processing performed by the server 10 may optionally be performed by the terminal 20. In such a case, at least a portion of the processing performed by the functional units of the controller 11 of the server 10 may optionally be performed by the terminal 20.

The same applies to other devices.

In the embodiments of the present disclosure, configurations for determination are not essential unless explicitly mentioned otherwise. Predetermined processing may optionally be activated in a case where a determination condition is satisfied, or predetermined processing may optionally be activated in a case where a determination condition is not satisfied.

In a non-limiting example, the program according to the present disclosure is implemented using a script language such as ActionScript or JavaScript (registered trademark), a compiler language such as Objective-C or Java (registered trademark), a markup language such as HTML5, or the like.

First Example

First, a first example, which is one aspect of the present embodiment, will be described.

In the first example, which is a non-limiting example, the vehicle display device 90 displays an advertisement on the display 94 while the user of the terminal 20 is using a rental car. Accordingly, the server 10 discounts a usage fee for the rental car (hereinafter, referred to as a "rental car usage fee") based on the display of the advertisement on the vehicle display device 90. Thus, the discounted usage fee is displayed on the display 24 of the terminal 20. The rental car usage fee may also be referred to as a rental cost of renting the rental car, or a rental fee or a fee for using the rental car. In another example embodiment, the vehicle display device 90 may display an advertisement on the display 94 while the user of the terminal 20 is using a ride sharing service (e.g., a ride sharing service), and the server 10 may discount off a fare for the ride sharing service based on a length of the advertisement being displayed on the vehicle display device 90.

In the present specification, in a non-limiting example, an "advertisement" is content that provides information to target people, which are, for example, people boarding a vehicle (for example, a driver driving a vehicle, a passenger of the vehicle, and a passenger boarding the vehicle with these people) and people other than the people boarding the vehicle (for example, a person located outside the vehicle), through their senses such as sight, hearing, and smell, in order to, for example, lure the target people, draw (attract) the target people's interest and curiosity, and motivate target people to act on an urge (content that affects the target people's senses). Such content may provide information directly to the target people, or indirectly to the target people through suggestion or the like. The target people may be one person or a plurality of people.

In a non-limiting example, information indicated by an advertisement may include information regarding a product/a service, information regarding the location of a store, a facility, or the like, information regarding a network service such as e-commerce, information regarding an event, an exhibition, or the like, information used to specify the location of a resource, such as a Uniform Resource Identifier (URI) (for example, a Uniform Resource Locator (URL)), code information (or a code image) into which these pieces of information are encoded, and information composed of a combination of these pieces of information.

Also, these pieces of information may include more detailed information. For example, in a non-limiting example, information regarding a product may include information regarding the name, content, price, selling place, selling method, selling time, and discount, of the product.

In the example described below, by displaying an advertisement that contains information regarding a product or a store, on a display device installed in a vehicle, for example, it may be possible to motivate people riding in the vehicle to travel to the store using the vehicle to purchase the product, upon seeing the advertisement.

Also, in the example described below, by displaying an advertisement that contains information regarding a product or a store, on a display device installed so as to face outward of the vehicle, it is possible to advertise the product or the store to people located outside the vehicle.

In a non-limiting example, the vehicle display device 90 may also be installed on an interior front surface of the vehicle in the form of a car navigation system or the like, or configured and installed as a device that is integrated with a car navigation system or as a part of the car navigation system. The display 94 may also be configured as a head up display on the interior front surface of the vehicle. Such a configuration makes it possible for a user, who is the driver of a rental car, to see an advertisement while the car is stopped at a red light, or while the user is taking a rest after stopping the car, for example. In addition, a user riding in the rental car as a passenger (a user other than the driver) can see an advertisement at any time in the vehicle.

However, in terms of safety, it may be undesirable that the user serving as the driver sees an advertisement in the car. Therefore, it is possible to regard a user who is a passenger in a rental car as the main target to which an advertisement is to be provided, and in a non-limiting example, the vehicle display device 90 may be configured to be located forward of a passenger seat (for example, on the dashboard or an upper part thereof) or forward of a rear seat (for example, the back side of the driver's seat or the back side of the passenger seat).

Note that the descriptions in the first example are applicable to any of the other examples.

Functional Configuration (1) Functional Configuration of Server

In a non-limiting example, the server 10 includes a server main processor and a discount processor as functions realized by the controller 11.

The server main processor has the function of performing server main processing that is processing for controlling the server 10 overall according to a server main processing program stored in the storage 15.

The discount processor calculates an amount to be discounted from the rental car usage fee (hereinafter, simply referred to as a "discount amount") based on an advertisement that is displayed on the vehicle display device 90, according to a discount processing program stored in the storage 15, and transmits the discounted usage fee to the terminal 20.

Although the "discount amount" will be described below, a "discount rate" may optionally be used instead of the discount amount.

In a non-limiting example, the storage 15 of the server 10 stores, as a program, a server main processing program that is to be read out and executed by the controller 11 to realize server main processing. Also, the server main processing program includes a usage fee discount program that is to be read out and executed by the controller 11 to realize usage fee discount processing, as a subroutine program.

Usage fee discount processing will be described later in detail with reference to a flowchart.

In a non-limiting example, the storage 15 stores therein an advertisement discount database as data.

The advertisement discount database is a database in which pieces of data for calculating a discount amount based on an advertisement displayed on the vehicle display device 90 are cumulatively stored, and FIG. 2A shows an example of the data structure thereof.

The advertisement discount database contains pieces of advertisement discount data generated for each advertisement.

In a non-limiting example, each piece of advertisement discount data contains an advertisement ID, an advertisement title, a discount amount, and advertisement content.

The advertisement ID is an ID that functions as identification information for identifying a solicited advertisement.

In a non-limiting example, the advertisement title contains either one or both of the name of the advertiser that publishes the advertisement corresponding to the advertisement ID and the title of the advertisement content.

The discount amount is the amount to be discounted from a usage fee, resulting from the advertisement being displayed.

The advertisement content is stored in and read from machine-readable or computer-readable media related to the advertisement to be displayed on the display 94 of the vehicle display device 90.

For example, FIG. 2A shows an example in which, when the display 94 of the vehicle display device 90 in a rental car (or a rideshare service car) displays an advertisement "video001.mp4" related to "○× FITNESS GYM" identified by an advertisement ID "A0001" while the rental car (or the rideshare service car) is being used, a discount amount "500 yen" is reduced from the rental car usage fee (or from a trip fare or a rideshare service fee).

(2) Functional Configuration of Terminal

The terminal 20 includes a terminal main processor and a rental car usage application processor as functions realized by the controller 21.

The terminal main processor has the function of performing terminal main processing that is processing for controlling the terminal 20 overall according to a terminal main processing program stored in the storage 28. In a non-limiting example, when the terminal 20 is a mobile phone, the terminal main processor performs control to make a call with another mobile phone, a fixed-line phone, or the like via the communication I/F 22, performs control to access various websites via the communication I/F 22, performs control to display various kinds of information on the display 24, performs processing to analyze various kinds of acoustic data input from the microphone 25, performs processing to analyze a still image or a moving image captured by the camera 27, or performs, for example, processing to acquire positional information regarding the terminal 20 based on the result of detection performed by the position calculation information detector 29.

The rental car usage application processor has the function of communicating with the server 10 and/or the vehicle display device 90 and performing processing that is related to the start and end of usage of the rental car and processing that is related to the display of a rental car usage fee.

(3) Functional Configuration of Vehicle Display Device

The vehicle display device 90 includes a vehicle display device main processor and an advertisement display processor as functions realized by the controller.

The vehicle display device main processor may perform vehicle display device main processing to control overall operations of the vehicle display device 90 according to a vehicle display device main processing program stored in the storage.

The advertisement display processor may display an advertisement on the display 94 according to an advertisement display processing program stored in the storage, and may transmit an advertisement ID that is based on the displayed advertisement to the server 10.

In a non-limiting example, the storage of the vehicle display device 90 stores, as a program, a vehicle display device main processing program that is to be read out and executed by the controller to realize the vehicle display device main processor.

Also, the vehicle display device main processing program includes an advertisement display processing program that is to be read out and executed by the controller to realize advertisement display processing, as a subroutine program. Advertisement display processing will be described later in detail with reference to a flowchart.

In a non-limiting example, the storage of the vehicle display device 90 stores therein an advertisement discount database as data. In a non-limiting example, the advertisement discount database can be the same as the advertisement discount database stored in the storage 15 of the server 10 (see FIG. 2A), and therefore a description thereof will be omitted.

Processing

FIG. 2B is a flowchart showing an example of the flow of processing that is performed by the devices according to the present example.

The portions of the figure respectively show first server main processing, which is an example of server main processing that is performed by the server main processor of the server 10, first terminal main processing A, which is an example of terminal main processing that is performed by the terminal main processor of the terminal 20, and first vehicle display device main processing that is performed by the vehicle display device main processor of the vehicle display device 90.

Each step in each kind of processing is indicated by a combination of an uppercase letter and a number, and the term "step" is omitted in this description.

Also, the flowchart described below merely illustrates processing in the present example. In the flowchart described below, some of the steps may be omitted, and an additional step may be inserted.

Also, the processing performed by the terminal 20 described below may be processing in which all of the steps are carried out by the rental car usage application installed on the terminal 20, or processing in which some of the steps are carried out by the rental car usage application. In addition, the processing does not necessarily have to be processing that is performed by the application installed on the terminal 20.

First, upon the user of the terminal 20 boarding a rental car, the terminal 20 transmits usage start information to the server 10 via the communication I/F 22 (operation M1). Note that, in a non-limiting example, a user operation performed on the input/output interface 23 may be accepted and transmitted, or a usage start code displayed on the display 94 of the vehicle display device 90 may be read by using the camera 27 or a code reader of the terminal 20 and transmitted as usage start information.

The server 10 receives usage start information from the terminal 20 via the communication I/F 14 (operation L1). The time at which the usage start information is received from the terminal 20 is stored in the storage 15 of the server 10. The server 10 transmits boarding confirmation information to the vehicle display device 90 via the communication I/F 14 (operation L3).

Upon receiving the boarding confirmation information from the server 10 (operation N1), the vehicle display device 90 displays advertisement content (e.g., an advertisement that is based on advertisement content) stored in the advertisement discount database on the display 94, and transmits an advertisement ID corresponding to the displayed advertisement content to the server 10, based on the advertisement discount database (operation N5).

Although the following describes an example in which an advertisement is displayed on the display 94 based on advertisement content that has been stored in the vehicle display device 90 in advance, the present embodiment is not limited thereto. Specifically, for example, a server that distributes advertisement content (e.g., an advertisement distribution server or an advertisement content distribution server) may optionally be formed, and the vehicle display device 90 may optionally display an advertisement that is based on advertisement content distributed from the server, on the display 94. In such a case, the server 10 may be configured to function as the aforementioned advertisement distribution server/an advertisement content distribution server.

Also, the advertisement (advertisement content) to be displayed may optionally be selected at random. Also, an advertisement with a relatively large discount amount may be displayed ahead of an advertisement with a relatively small discount amount.

Upon receiving the advertisement ID from the vehicle display device 90 via the communication I/F 14, the server 10 cumulatively stores the discount amount corresponding to the advertisement ID in a variable stored in the storage 15, based on the advertisement discount database (operation L5).

In the terminal 20, upon a user operation performed on the input/output interface 23 being received and the user terminating the use of the rental car, the terminal 20 transmits usage termination information to the vehicle display device 90 via the communication I/F 22 (operation M3).

Upon receiving usage termination information from the terminal 20 (operation N7: YES), the vehicle display device 90 transmits vehicle-exit point arrival information to the server 10 (operation N9).

If the vehicle display device 90 has not received usage termination information from the terminal 20 (operation N7: NO), the vehicle display device 90 continues displaying the advertisement content currently displayed on the display 94. Upon the advertisement content currently displayed reaching the end thereof, processing returns to operation N5 and the next (another) advertisement content is displayed on the display 94.

Upon receiving vehicle-exit point arrival information from the vehicle display device 90 via the communication I/F 14 (operation L7), the server 10, in a non-limiting example, calculates a rental car usage duration based on the reception time of the vehicle-exit point arrival information and the reception time of the usage start information in operation L1, and calculates a rental car usage fee based on the rental car usage duration.

Note that the rental car usage fee may be calculated based on the travel distance of the rental car while being used, or calculated based on the rental car usage duration and the travel distance.

The server 10 calculates a usage fee that has been discounted (hereinafter referred to as a "discounted usage fee") by subtracting the discount amount cumulatively stored in the processing in operation L5, from the rental car usage fee. The server 10 transmits the discounted usage fee to the terminal 20 via the communication I/F 14 (operation L9).

Upon receiving the discounted usage fee via the communication I/F 22 (operation M5), the terminal 20 displays the discounted usage fee on the display 24 (operation M7).

Note that payment of the usage fee may be electronically performed using the terminal 20, in a non-limiting example, or a credit card or cash may be used to perform payment, using a payment device installed at a rental car vehicle-exit point, in a non-limiting example.

Effects of First Example

In the first example, the terminal 20 (a non-limiting example of a terminal) receives a discounted usage fee for a rental car (a non-limiting example of information regarding a usage fee for a vehicle) based on the display of an advertisement on the vehicle display device 90 (a non-limiting example of an electronic device or a display device) provided in the rental vehicle. The first example shows a configuration with which the display of the discounted usage fee (a non-limiting example of a first display) is displayed in an area (a non-limiting example of a display area of a terminal) on a display screen of the display 24.

One example of the effects that can be achieved with such a configuration is that information regarding the usage fee for the vehicle can be confirmed on the terminal instead of the display device, and therefore user convenience can be improved.

Also, in the first example, the server 10 (a non-limiting example of an electronic device) acquires the advertisement ID corresponding to the advertisement displayed on the display 94 of the vehicle display device 90 (a non-limiting example of information regarding the display of an advertisement on a display device of a vehicle) from the vehicle display device 90. The first example shows a configuration with which the server 10 transmits the discounted usage fee for the rental car (a non-limiting example of information regarding a usage fee for a vehicle) to the terminal 20 via the communication I/F 14, based on the acquired advertisement ID.

One example of the effects that can be achieved with such a configuration is that, by transmitting information regarding the usage fee for a vehicle to the terminal based on information regarding the display of an advertisement on the display device of the vehicle, acquired by the electronic device, it is possible to appropriately make a notification to the user of the terminal of information regarding the usage fee for the vehicle.

First Modification (1)

Although a rental vehicle is described as a vehicle that is used as a transportation means in the first example, the present embodiment is not limited thereto.

The vehicle may optionally be a vehicle other than a rental vehicle, such as a ride sharing service car, a car sharing service car, a taxi, a bus, or a train.

Alternatively, the vehicle may optionally be a ship or an aircraft.

Furthermore, the usage fee for a vehicle is not limited to the above-described rental car usage fee, and, in a non-limiting example, the usage fee may optionally be the fare for a taxi, a ride sharing service car, or the like, or a usage fee for a car sharing service car.

First Modification (2)

In the first example, it is possible to set whether or not to display an advertisement on the display 94 of the vehicle display device 90. Specifically, for example, it is possible to realize such an operation with a configuration that enables the user to perform a setting operation on their own terminal 20, and upon a setting operation being performed, the controller 21 of the terminal 20 transmits setting information (a setting signal) directly to the vehicle display device 90, or transmits setting information (a setting signal) indirectly to the vehicle display device 90 via the server 10.

In such a case, it is possible to display, on the display 24 of the terminal 20, a setting screen that is used to apply or perform a setting by selecting a setting regarding whether or not to display an advertisement, such as a display setting "ON" for allowing display of an advertisement or a display setting "OFF" for not allowing display of an advertisement, and a display setting may be performed or applied based on input from the user of the terminal 20 to this setting screen.

Note that the aforementioned setting regarding whether or not to display an advertisement is not limited to being performed after the user of the terminal 20 boards the rental car, and may be performed before the user boards the rental car. In such a case, in a non-limiting example, it is possible to apply or perform a setting regarding whether or not to display an advertisement by transmitting setting information (a setting signal) from the terminal 20 to the vehicle display device 90 as described above when the user of the terminal 20 hires the rental car, for example.

Also, in such a case, the usage fee for the rental car may optionally be reduced whenever a setting for displaying an advertisement is applied to or performed on the vehicle display device 90.

Effects of First Modification (2)

This modification shows a configuration with which setting for displaying an advertisement is performed using the controller 21 of the terminal 20.

One example of the effects that can be achieved with such a configuration is that setting for displaying an advertisement can be performed on a terminal, and therefore user convenience can be improved.

The present modification shows a configuration with which the rental car usage fee is discounted based on the aforementioned setting for displaying an advertisement, and the discounted rental car usage fee is displayed on the terminal 20.

One example of the effects that can be achieved with such a configuration is that the usage fee is discounted based on the setting for displaying an advertisement, and therefore the financial burden on the user can be reduced. Also, the user can check the discounted usage fee on the terminal, and therefore user convenience can be improved.

Also, the present modification shows a configuration with which a setting screen that is used to create, apply, or perform an advertisement display setting is displayed on the display 24, and the display setting is performed based on information input by the user on the setting screen.

One example of the effects that can be achieved with such a configuration is that the user can use their own terminal to create, apply, and or perform a setting regarding whether or not to display an advertisement on the display device of a vehicle, and therefore user convenience can be improved.

Also, the present modification shows a configuration with which a display setting "ON" for allowing display of an advertisement on the display device and a display setting "OFF" for not allowing display of an advertisement on the display device are displayed on the above-described setting screen.

One example of the effects that can be achieved with such a configuration is that it is possible to enable the user to use their own terminal to select the setting for displaying an advertisement on the display device of a vehicle or the setting for not displaying an advertisement on the display device of the vehicle.

Second Example

In the second example, which is a non-limiting example, the vehicle display device 90 selects the advertisement to be displayed on the display 94 based on the district in which the vehicle is travelling. That is to say, the advertisement to be displayed on the display 94 changes depending on the travel route of the rental car.

The descriptions in the second example are applicable to any of the other examples.

Also note that the same constituent elements as the above-described constituent elements are assigned the same reference numerals, and redundant descriptions thereof will be omitted.

Functional Configuration (1) Functional Configuration of Server

In a non-limiting example, the storage 15 of the server 10 stores therein an extended advertisement discount database as data.

Figure 3A:
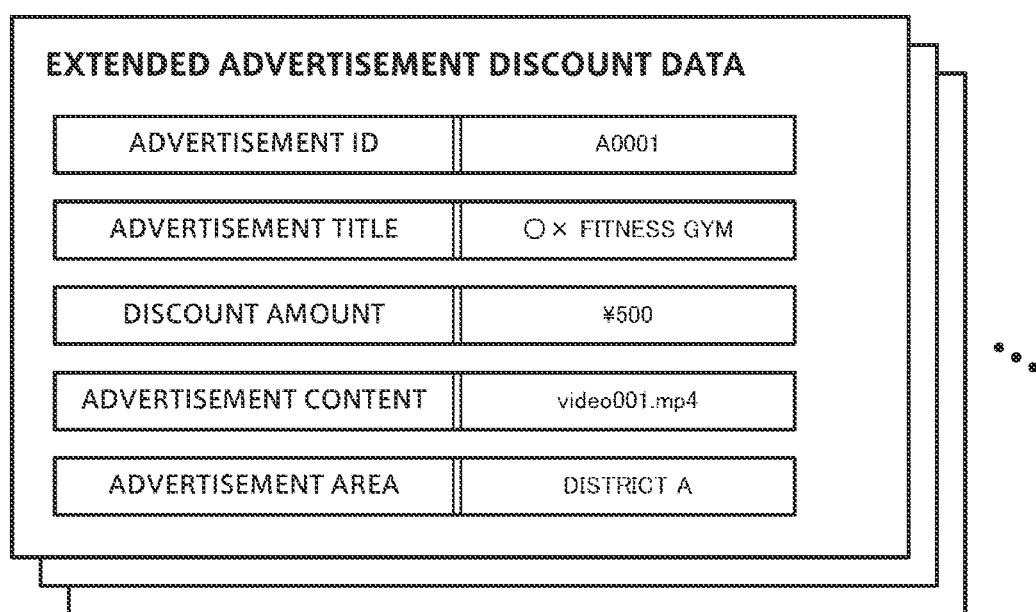
FIG. 3A is a diagram showing an example of an extended advertisement discount database according to a second example.

The extended advertisement discount database is a database in which pieces of data for calculating a discount amount based on an advertisement displayed on the vehicle display device 90 are cumulatively stored, and FIG. 3A shows an example of the data structure thereof.

The extended advertisement discount database contains pieces of extended advertisement discount data generated for each advertisement.

In a non-limiting example, each piece of extended advertisement discount data contains an advertisement ID, an advertisement title, a discount amount, advertisement content, and an advertisement area. In a non-limiting example, the advertisement ID, the advertisement title, the discount amount, and the advertisement content may be the same as those in the advertisement discount database (see FIG. 2A).

The advertisement area is a geographic coordinate area that has a certain range connected (or associated) with the advertisement ID. For example, in the example in FIG. 3B, the advertisement area is divided into three districts, namely a district A, a district B, and a district C.

Note that a method for more specifically defining the advertisement area will be described later in another example.

(2) Functional Configuration of Vehicle Display Device

In a non-limiting example, the storage of the vehicle display device 90 stores therein an extended advertisement discount database as data. In a non-limiting example, the extended advertisement discount database may be the same as the advertisement discount database stored in the storage 15 of the server 10 (see FIG. 3A), and therefore a description thereof will be omitted.

Figure 3B:
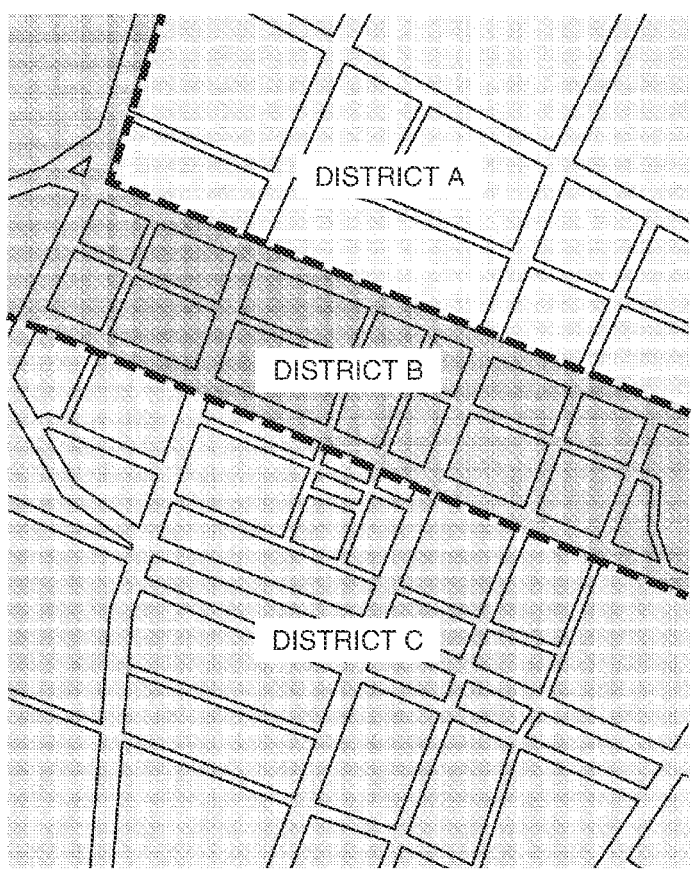
FIG. 3B is a diagram showing an example of a relationship between advertisement areas and districts according to the second example.

For example, in the example of data in FIG. 3A, the advertisement with the advertisement ID "A0001" is to be displayed on the display 94 of the vehicle display device 90 when the rental car travels in the "DISTRICT A" shown in FIG. 3B.

Processing

FIG. 3C is a flowchart showing an example of the flow of processing that is performed by the devices according to the present example. Note that the same steps as those in the above described flowchart are assigned the same reference numerals and redundant descriptions thereof will be omitted, and different steps will mainly be described.

The portions of the figure respectively show second server main processing, which is an example of server main processing that is performed by the server main processor of the server 10, second terminal main processing A, which is an example of terminal main processing that is performed by the terminal main processor of the terminal 20, and second vehicle display device main processing that is performed by the vehicle display device main processor of the vehicle display device 90.

The flowchart described below merely illustrates processing in the present example. In the flowchart described below, some of the steps may be omitted, and an additional step may be inserted.

FIG. 3C is a flowchart formed by adding, to the flowchart shown in FIG. 2B, a calculation processing step (for example, operation N3) for calculating the vehicle position and an advertisement display processing step (for example, operation N6) that is based on the calculated position, which are carried out by the vehicle display device 90.

Upon receiving boarding confirmation information from the server 10 (operation N1), the vehicle display device 90 calculates the position of the vehicle (hereinafter referred to as a "vehicle position" or "vehicle location") (operation N3). Note that, in a non-limiting example, the vehicle position may be calculated by using a satellite positioning system such as a Global Positioning System (GPS), or by using a method such as an inertial navigation calculation.

Based on the advertisement area that includes the vehicle position calculated in operation N3, the vehicle display device 90 displays the advertisement content that has the advertisement ID corresponding to the advertisement area (the advertisement that is based on the advertisement content) on the display 94 (operation N6), of the advertisement content stored in the extend advertisement discount database. Note that, in a non-limiting example, when there are a plurality of advertisement IDs corresponding to the area, advertisement content may optionally be randomly selected and displayed, or displayed in descending order of the discount amount.

Effects of Second Example

In the second example, the vehicle display device 90 provided in a rental vehicle selects the advertisement to be displayed on the display 94, based on the district in which the rental vehicle is travelling or the travel route of the rental vehicle. The second example shows a configuration with which the advertisement to be displayed on the display 94 changes depending on the travel route of the rental vehicle.

One example of the effects that can be achieved with such a configuration is that an advertisement that is based on route information regarding the route through which a vehicle can travel can be displayed on a display device of the vehicle. For example, by displaying an advertisement of a store that is present in a district in which the vehicle is located, on a display device of the vehicle, it is possible to advertise the store to users in the vehicle.

Although the above example illustrates a case in which the user drives a rental car, the present embodiment is not limited thereto. As the autonomous driving technology is developed, there are expectations regarding the operation of vehicles that are provided with an autonomous driving device will be operated. Therefore, the following describes an example of an autonomous driving rental car (an autonomous driving rental car vehicle) as an example of a vehicle that is provided with an autonomous driving device.

Note that the following description of an autonomous driving rental car is also applicable to the normal rental cars described in the first and second examples. For simplification, the details thereof will be omitted.

Third Example

In the third embodiment, which is a non-limiting example, the rental car is provided with an autonomous driving device, and the autonomous driving vehicle that can be automatically operated by the user specifying the vehicle-boarding point and the vehicle-exit point is provided with an extended vehicle display device (a vehicle system).

System Configuration

Figure 4A:
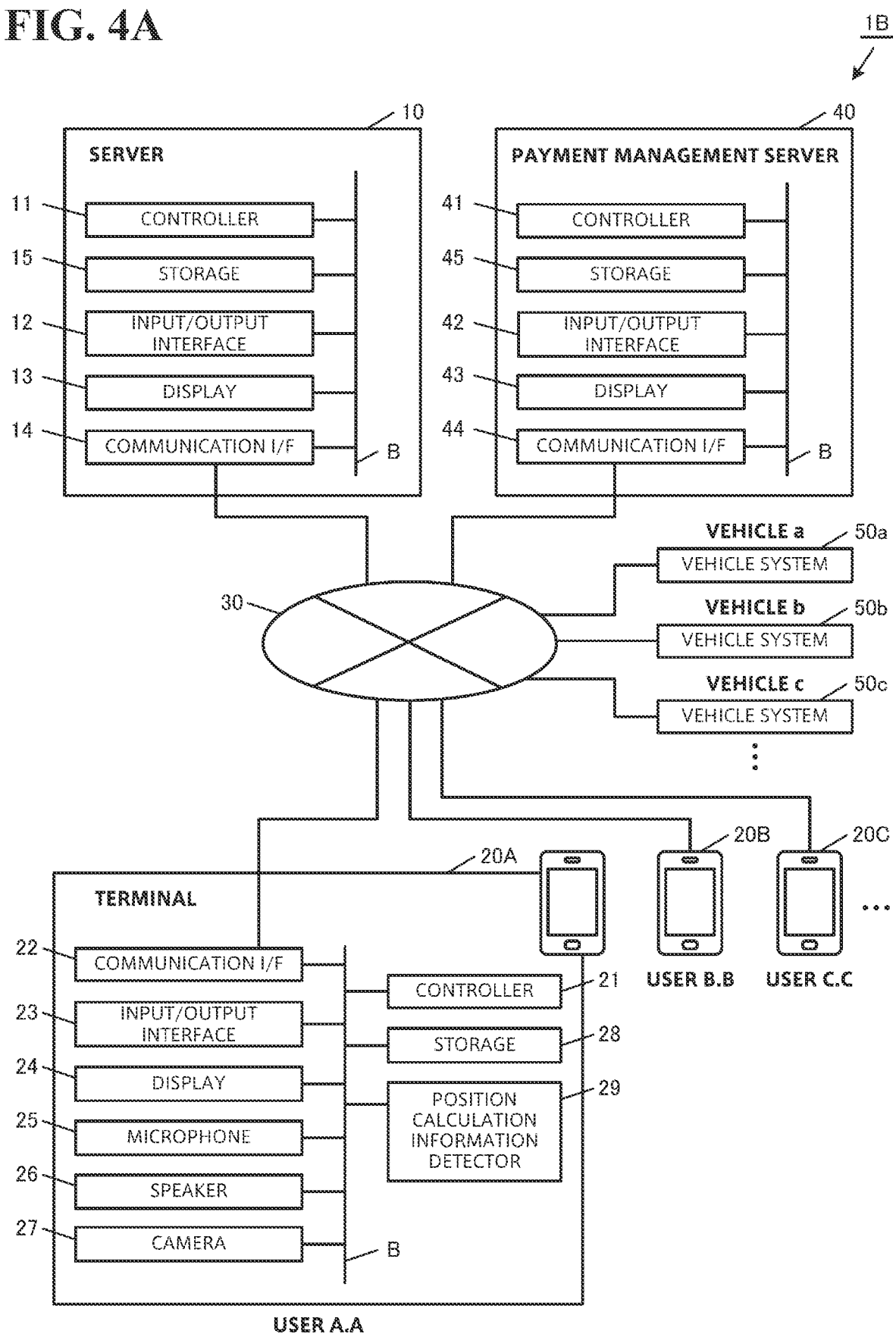
FIG. 4A is a diagram showing an example of a configuration of a communication system in an aspect of an embodiment.

FIG. 4A is a diagram showing an example of a configuration of a communication system 1B according to an embodiment of the present disclosure.

In a non-limiting example of the communication system 1B, the server 10, the terminals 20 (a terminal 20A, a terminal 20B, a terminal 20C, and so on), a payment management server 40, and vehicle systems 50 (a vehicle system 50a, a vehicle system 50b, a vehicle system 50c, and so on) are connected to each other via the network 30.

The server 10 (a non-limiting example of an electronic device, a server, an information processing device, or an information management device) may transmit advertisement information to at least one of a vehicle system 50 and a terminal 20 based on passenger information that may be acquired from at least one of the vehicle system 50 and the terminal 20 via the network 30, and calculate the usage fee based on an advertisement that is output from at least one of the vehicle system 50 and the terminal 20 based on the advertisement information.

Here, in a non-limiting example, passenger information is information that contains a vehicle-boarding point, a vehicle-exit point, a waypoint, a passenger's sex, a passenger's age, etc., or a combination of two or more of these pieces of information. Also, in a non-limiting example, advertisement information is information that contains the format of the advertisement (e.g., a moving image, a still image, sound, or the like), the time for outputting the advertisement, the output destination of the advertisement, the file describing the advertisement content, etc., or a combination of one or more of these pieces of information.

The payment management server 40 provides a service (hereinafter generally referred to as a "payment service") for realizing electronic payment (a non-limited example of payment) by communicating with either one or both of the vehicle system 50 and the terminal 20.

The network 30 serves to connect one or more servers 10, one or more payment management servers 40, one or more vehicle systems 50, and one or more terminals 20 to each other. That is to say, the network 30 is a communication network that provides a connection path to enable the aforementioned devices to transmit and receive data to and from each other once the devices have connected to each other.

Note that the number of devices of each type connected to the network 30 is not limited.

In some embodiments, it is possible to realize the method according to the present disclosure without using the terminals 20. That is to say, the terminals 20 may optionally be included in the system as constituent elements.

The server 10 (a non-limiting example of a server, an information processing device, or an information management device) may provide a predetermined service to either one or both of the vehicle system 50 and the terminal 20. The server 10 may be any type of device as long as it is an information processing device that is capable of realizing the functions described in each embodiment.

Non-limiting examples of the server 10 include a server device, a computer (non-limiting examples of which include a desktop, a laptop, and a tablet), a media computer platform (non-limiting examples of which include cable and satellite set-top boxes and a digital video recorder), a handheld computer device (non-limiting examples of which include a PDA and an email client), and other types of computers and communication platforms. The server 10 may also be referred to as an information processing device. When there is no need to distinguish between the server 10 and the payment management server 40, the server 10 and the payment management server 40 may optionally be referred to as information processing devices.

In the example described below, the server 10 may distribute advertisement information to either one or both of the vehicle system 50 and the terminal 20 based on passenger information from at least one of the vehicle systems 50 and the terminal 20, and may calculate the discount amount from the usage fee for the autonomous driving rental car (hereinafter referred to as a "usage fee discount amount" or simply a "discount amount") based on the distributed advertisement information.

The payment management server 40 is a server that is operated by the same business operator as the business operator that operates the server 10 (which may be referred to as a business operator that provides an advertisement management service or an advertisement distribution service), or a server that is operated by another business operator that is affiliated with the business operator that operates the server 10, and provides a payment service as the predetermined service. Non-limiting examples of a payment means include terminal electronic money that employs a magnetic stripe card, a contact integrated chip (IC) card, or a contactless IC card, and server-type electronic money that employs Near Field Communication (NFC) or a barcode. Regarding the payment method, legal tender or virtual currency may be used as digital currency (digital money). Alternatively, legal tender may be used as physical money.

Note that examples of digital currency may optionally include cryptocurrency (a crypto-asset). In addition, examples of virtual currency may optionally include physical money such as a coupon.

The configuration of the payment management server 40 may be the same as that of the server 10, for example, and therefore the description thereof will be omitted.

Note that the business operator that operates the server 10 may optionally provide a payment service by using the payment management server 40.

Each vehicle system 50 (a non-limiting example of an electronic device) is configured to transmit passenger information to a server 10, cause either one or both of an output device inside the vehicle and an output device outside the vehicle to output advertisement information distributed from the server 10, and communicate with the payment management server 40 and perform processing related to payment, based on a usage fee discount amount transmitted from the server 10. The vehicle systems 50 may also be referred to as vehicle devices.

Note that the vehicle system 50a, the vehicle system 50b, and the vehicle system 50c have substantially the same configuration, and therefore the following describes the configuration of a vehicle system 50.

Non-limiting examples of the vehicle system 50 include a server device, a computer (non-limiting examples of which include a desktop, a laptop, and a tablet), a media computer platform (non-limiting examples of which include cable and satellite set-top boxes and a digital video recorder), a handheld computer device (non-limiting examples of which include a PDA and an email client), other types of computers and communication platforms, and so on. The vehicle system 50 may be referred to as an information processing device, an information management device, or an electronic device.

In a non-limiting example, the vehicle system 50 may be used in the state of being mounted in (applied to) a vehicle used as a means for transport in a transportation service carried out as a business by a business operator that is affiliated with a business operator that operates the server 10.

The present example is a non-limiting example in which a rental vehicle that is provided with an autonomous driving device is described as an example of a vehicle, and the vehicle system 50 is used in the state of being mounted in the rental vehicle provided with the autonomous driving device.

Hardware (HW) Configuration of Each Device

The following describes the HW configuration of each device included in a communication system 1.

(1) HW Configuration of Terminal

FIG. 4A shows an example of a HW configuration of the terminal 20. However, in a non-limiting example, the HW configuration of the terminal 20 may be the same as that of the terminal 20 in the communication system 1A. Therefore, the description thereof will be omitted.

(2) HW Configuration of Server

FIG. 4A shows an example of a HW configuration of the server 10. However, in a non-limiting example, the HW configuration of the server 10 may be the same as that of the server 10 in the communication system 1A. Therefore, the description thereof will be omitted.

(3) HW Configuration of Payment Management Server

FIG. 4A shows an example of the HW configuration of the payment management server 40.

In a non-limiting example, the payment management server 40 includes a controller (CPU) 41, a storage (or memory) 45, a communication interface (I/F) 44, an input/output interface 42, and a display 43. In a non-limiting example, the HW constituent elements of the payment management server 40 are connected to each other via the bus B. Note that the HW of the payment management server 40 does not necessarily have to include all of the constituent elements. In a non-limiting example, the HW of the payment management server 40 may optionally be configured such that the display 43 is removable.

Note that other pieces of HW, components, and so on for realizing the above-described constituent elements and functional units included in the payment management server 40 may be formed in the same manner as in the server 10. Therefore, redundant descriptions thereof will be omitted.

(4) HW Configuration of Vehicle System

Figure 4B:
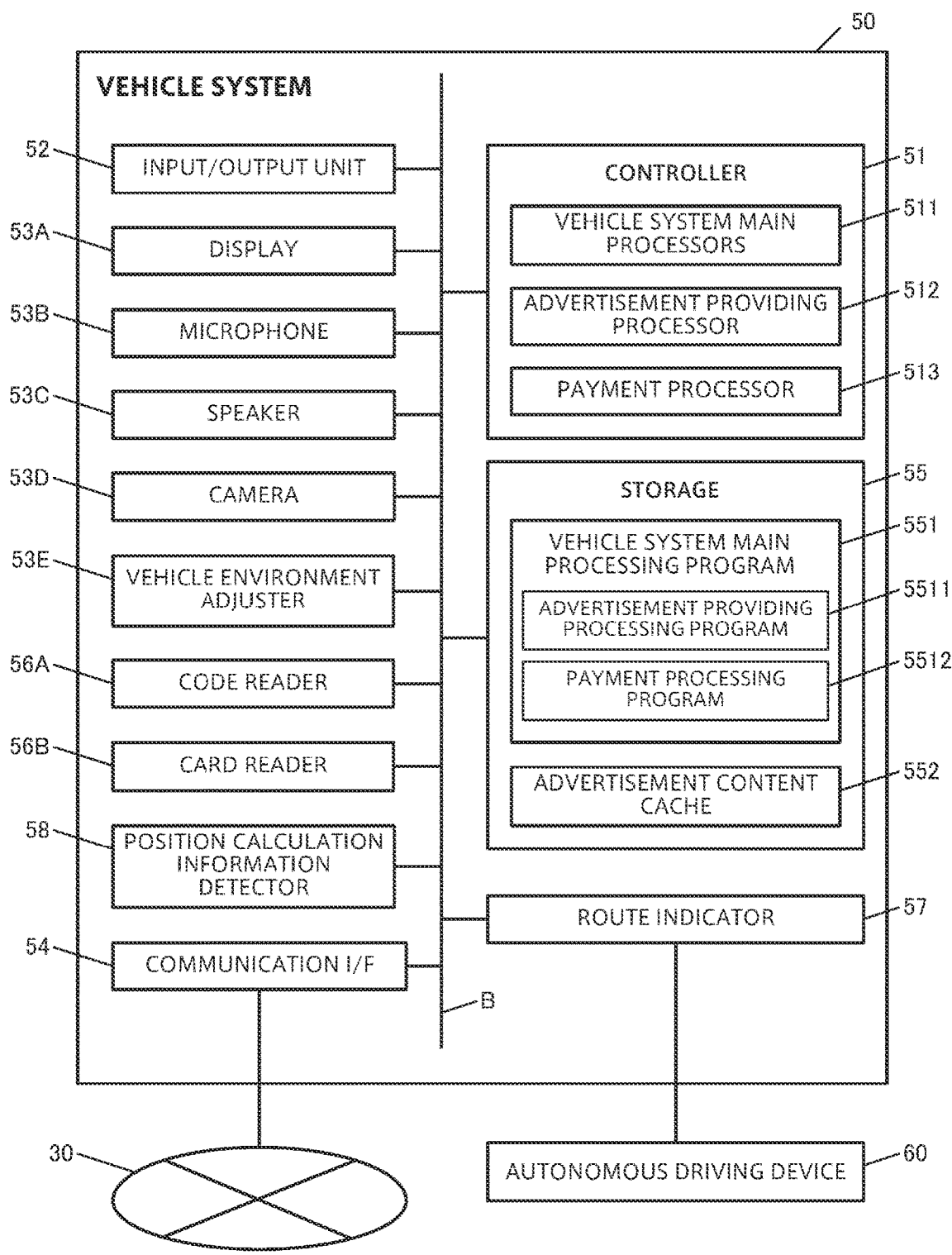
FIG. 4B is a diagram showing an example of a configuration of a vehicle system in an aspect of an embodiment.

FIG. 4B shows an example of the HW configuration of the vehicle system 50.

In a non-limiting example, the vehicle system 50 includes a controller (e.g., a CPU or a processor) 51, an input/output interface 52, a display 53A, a microphone 53B, a speaker 53C, a camera 53D, a vehicle environment adjustment unit 53E, a communication interface (I/F) 54, a storage 55, a code reader 56A, a card reader 56B, a route indicating unit 57, and a position calculation information detector 58. In a non-limiting example, the HW constituent elements of the vehicle system 50 are connected to each other via the bus B.

Note that the HW of the vehicle system 50 does not necessarily have to include all of the constituent elements in the configuration of the vehicle system 50. In a non-limiting example, the HW of the vehicle system 50 may optionally be configured such that card reader 56B is removable.

In a non-limiting example, the vehicle system 50 is communicably connected to an autonomous driving device 60 via a wired communication I/F or a wireless communication I/F in the vehicle, via the route indicating unit 57.

In a non-limiting example, the route indicating unit 57 transmits a vehicle-exit point and a waypoint to the autonomous driving device 60 according to an instruction from the controller 51, and makes the autonomous driving device 60 set them. At the waypoint, the autonomous driving device 60 may be controlled so that the vehicle passes the waypoint with passengers on board, or the autonomous driving device 60 may be controlled so that the vehicle temporarily stops to let passengers exit the vehicle, and thereafter let passengers board the vehicle, and starts again and passes the waypoint.

At the vehicle-exit point, the vehicle system 50 settles the payment of the usage fee according to the method described below, and let the passengers exit the vehicle.

Note that the waypoint does not necessarily have to be set. Also, a plurality of waypoints may optionally be set. Also, the usage fee may optionally be set for each waypoint.

In a non-limiting example, the vehicle environment adjustment unit 53E adjusts the temperature and humidity in the vehicle to certain values by changing the settings of an air conditioner according to an instruction from the controller 51. Also, in a non-limiting example, the vehicle environment adjustment unit 53E generates a certain aroma inside the vehicle, or outside the vehicle, or both of them by changing the settings of an aroma diffuser.

In a non-limiting example, the code reader 56A is a device for reading either one or both of barcodes and multidimensional codes. In the present specification, examples of the code reader 56A include a two-dimensional code reader (for example, a QR code reader) for reading a terminal display code as a two-dimensional code (for example, a QR code (registered trademark)) displayed on the display 24 of the terminal 20 and presented by the user of the terminal 20.

In a non-limiting example, the card reader 56B is a device for reading card information of either one or both of a contact type card, such as a punch card, a magnetic stripe card, or a contact type IC card, and a contactless type card using Radio Frequency Identification (RFID).

Note that other pieces of HW, components, and so on for realizing the above-described constituent elements and functional units included in the vehicle system 50 may be formed in the same manner as in the terminal 20, for example. Therefore, redundant descriptions thereof will be omitted.

Note that some or all of the constituent elements, namely the input/output interface 52, the display 53A, the microphone 53B, the speaker 53C, the camera 53D, the code reader 56A, and the card reader 56B, may be provided so as to face inward of the vehicle, outward of the vehicle, or in both directions.

Also, the position calculation information detector 58 may optionally include an arithmetic unit and a processing device such as a CPU and a digital signal processor (DSP) so that the position of the vehicle system 50 can be calculated (or measured) and output by the position calculation information detector 58 based on the detected position calculation information.

Note that the vehicle system 50 may optionally be a terminal (an on-board terminal) which is separately provided from the vehicle or a device (an on-board device) mounted in the vehicle. Also, the vehicle system 50 may be an integrated device, or constituted by separate constituent elements.

At least a portion of the processing performed by the vehicle system 50 may optionally be realized by a cloud computing system formed with one or more computers.

At least a portion of the processing performed by the vehicle system 50 may optionally be performed by the server 10. In such a case, at least a portion of the processing performed by the functional units of the controller 51 of the vehicle system 50 may optionally be performed by the server 10.

At least a portion of the processing performed by the server 10 may optionally be performed by the vehicle system 50. In such a case, at least a portion of the processing performed by the functional units of the controller 11 of the server 10 may optionally be performed by the vehicle system 50.

The same applies to other devices.

In the third example, which is a non-limiting example, the user of the terminal 20 uses a reservation application to make a reservation for the use (starting the use) of the autonomous driving rental car, from the current position (current location) of the terminal 20 or the user of the terminal 20, or any position. The usage fee is discounted as a result of the output device, provided in the vehicle on which the vehicle system 50 is mounted, outputting an advertisement based on the advertisement information distributed from the server 10 while the user is in the autonomous rental car. In the third example, when the user of the terminal 20 exits the vehicle at the vehicle-exit point, the user electronically pays the usage fee by using a payment application that is an application for electronic payment, operating in the terminal 20 of the user.

The descriptions in the third example are applicable to any of the other examples.

Functional Configuration (1) Functional Configuration of Server

Figure 6A:
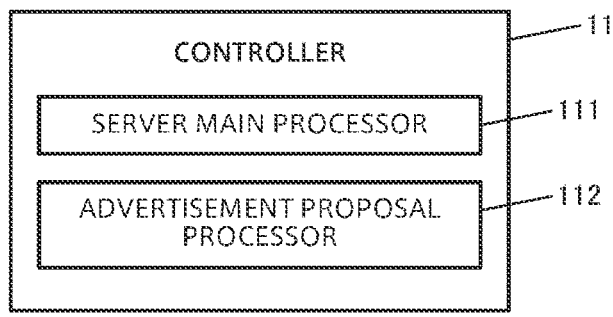
FIG. 6A is a diagram showing examples of functions realized by a controller of a server according to the third example.

FIG. 6A is a diagram showing examples of functions realized by the controller 11 of the server 10 according to the present example.

The server 10 includes a server main processor 111 and an advertisement proposal processor 112 as functions realized by the controller 11.

The server main processor 111 has the function of performing server main processing that is processing for controlling the server 10 overall according to a server main processing program 151 stored in the storage 15.

The advertisement proposal processor 112 selects the advertisement information to be transmitted from an advertisement management database 154 to the vehicle system 50, based on passenger information that is acquired through communication with the terminal 20 and/or the vehicle system 50, according to an advertisement proposal processing program 1511 stored in the storage 15. Thereafter, the advertisement proposal processor 112 performs processing to transmit advertisement content data 155 to the vehicle system 50. The advertisement proposal processor 112 calculates a discount amount according to the advertisement information transmitted to the vehicle system 50, and transmits the discount amount to the vehicle system 50.

Figure 6B:
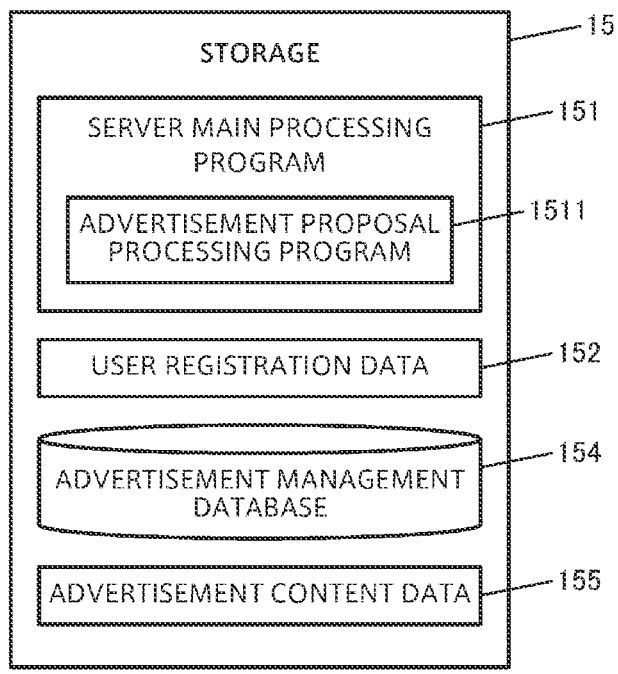
FIG. 6B is a diagram showing an example of information that is stored in a storage of a server according to the third example.

FIG. 6B is a diagram showing examples of information stored in the storage 15 of the server 10 according to the present example.

In a non-limiting example, the storage 15 stores, as a program, the server main processing program 151 that is to be read out and executed by the controller 11 to realize server main processing. Also, the server main processing program 151 includes the advertisement proposal processing program 1511 that is to be read out by the controller 11 and executed to realize advertisement proposal processing, as a subroutine program. Advertisement proposal processing will be described later in detail with reference to a flowchart.

In a non-limiting example, the storage 15 stores user registration data 152, an advertisement management database 154, and the advertisement content data 155, as data.

The user registration data 152 is registration data of the terminal 20 or the user thereof that uses the reservation application, and FIG. 6C shows an example of a data structure of the user registration data 152.

In a non-limiting example, the user registration data 152 contains a user name, a user ID, a sex, an age, the place of residence, and other registration information in association with each other.

The user name is the name of the user of the terminal 20 that uses the reservation application, and contains the name registered when the user of the terminal 20 uses the reservation application.

The user ID is an ID that serves as identification information for identifying the user of the terminal 20, and is set so as to be unique to the user that uses the reservation application. In a non-limiting example, IDs that are respectively unique to users are set and stored by the server 10 as such a user ID.

The user ID is an example of identification information (user identification information) for identifying the user of the terminal 20.

The sex, the age, and the place of residence are attribute information regarding the user of the terminal 20 that uses the reservation application, and contain information registered when the user uses the reservation application.

The age may be an age group, which is a certain age range. Also, the place of residence may be information from the country to the street address, or information representing a wider regional division, or information representing a narrower regional division.

The other registration information is other registration information regarding the user with the user name, and in a non-limiting example, a telephone number and an email address of the terminal 20, a hobby, an occupation, an annual income, and so on are included therein.

The advertisement content data 155 is registration data regarding advertisement content information that is to be distributed to the vehicle system 50, and FIG. 6D shows an example of the data structure thereof.

In a non-limiting example, the advertisement content data 155 contains an advertisement content ID, an advertisement content mode, an advertisement output duration, an advertisement output destination, and an advertisement content file in association with each other.

The advertisement content ID is an ID that serves as identification information for identifying the advertisement content to be distributed.

The advertisement content mode is the state of the advertisement information to be distributed, and, in a non-limiting example, includes a moving image, a still image, sound, and an environmental adjustment for adjusting the temperature, humidity, and aroma in the vehicle.

The advertisement output duration is the length of time for which the advertisement is output based on the distributed advertisement information.

The advertisement output destination is information regarding which output device in the vehicle system 50 is to output an advertisement based on the distributed advertisement information.

The advertisement content file is a mechanically readable media file in which advertisement information is written.

For example, in the example of data in FIG. 6D, the advertisement ID "C0001" indicates "MOVING IMAGE" as the advertisement content mode, "60 SECONDS" as the advertisement output duration, "VEHICLE INTERIOR DISPLAY" as the advertisement output destination, and "video001.mp4" as the advertisement content file. This means that, regarding the advertisement content ID "C0001", content "video001.mp4" in the form of a moving image is to be output (i.e. displayed) on the display device provided inside the vehicle for 60 seconds.

Figure 6E:
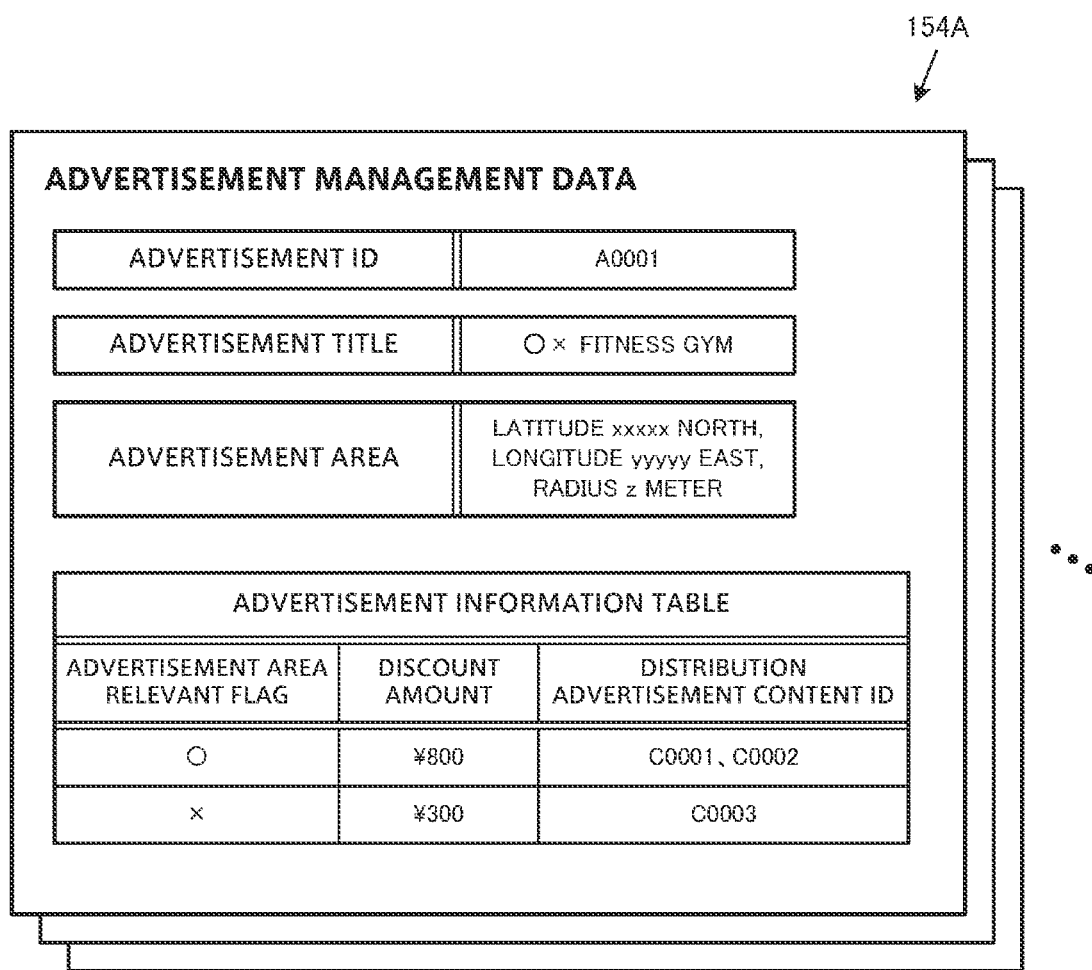
FIG. 6E is a diagram showing an example of an advertisement management database according to the third example.

The advertisement management database 154 is a database in which pieces of data for managing the advertisement content data to be distributed to the vehicle system 50 are cumulatively stored, and FIG. 6E shows an example of the data structure thereof. Here, a first advertisement management database 154A, which is an example of the advertisement management database 154, is illustrated.

The first advertisement management database 154A contains advertisement management data generated for each advertisement.

In a non-limiting example, each piece of management data contains the advertisement ID, the advertisement title, the advertisement area, and an advertisement information table.

The advertisement ID is an ID that functions as identification information for identifying a solicited advertisement. Note that one or more advertisement content IDs are associated with an advertisement ID, using the advertisement information table as described below.

In a non-limiting example, the advertisement title contains either one or both of the name of the advertiser that publishes the advertisement corresponding to the advertisement ID and the title of the advertisement content.

The advertisement area is a geographic coordinate area that has a certain range associated with an advertisement output of the advertisement that has the advertisement ID, and, in a non-limiting example, the advertisement area is represented by a latitude, a longitude, and a radius from a geographic coordinate point defined by the latitude and the longitude. Note that the advertisement area may optionally be a polygonal area represented by a combination of a plurality of latitudes and longitudes.

In a non-limiting example, the advertisement information table contains an advertisement area relevant flag, the discount amount (the usage fee discount amount), and a distribution advertisement content ID in association with each other.

The advertisement area application flag is a flag for classification that is based on the condition that the advertisement area overlaps the travel route of the autonomous driving rental car.

The discount amount (the usage fee discount amount) is the amount to be discounted from the usage fee for the autonomous driving rental car as a result of the advertisement being output.

The distribution advertisement content ID is the advertisement content ID in the advertisement content data 155 to be distributed to the vehicle system 50.

Note that the distribution advertisement content ID may contain one advertisement content ID or a plurality of advertisement content IDs.

For example, the example of data in FIG. 6E shows that, if the autonomous driving rental car that the user has boarded passes through the area with a radius of z meters centered around the point indicated by the latitude xxxxx north and the longitude yyyyy east, which is within the advertisement area related to "○x FITNESS GYM", and advertisement information defined by the advertisement content data 155 is output, the usage fee discount amount 800 yen will be accumulated. In this case, the server 10 distributes the advertisement content corresponding to the content ID "C0001" and the advertisement content corresponding to the content ID "C0002" to the vehicle system 50 according to the advertisement proposal processing program 1511.

If the autonomous driving rental car that the user has boarded does not pass through the advertisement area related to "∘x FITNESS GYM" when travelling along a route, and outputs the advertisement information defined by the advertisement content data 155, the usage fee discount amount 300 yen will be accumulated or applied. In this case, the server 10 distributes the advertisement content corresponding to the content ID "C0003" to the vehicle system 50 according to the advertisement proposal processing program 1511.

(2) Functional Configuration of Terminal

Figure 6F:
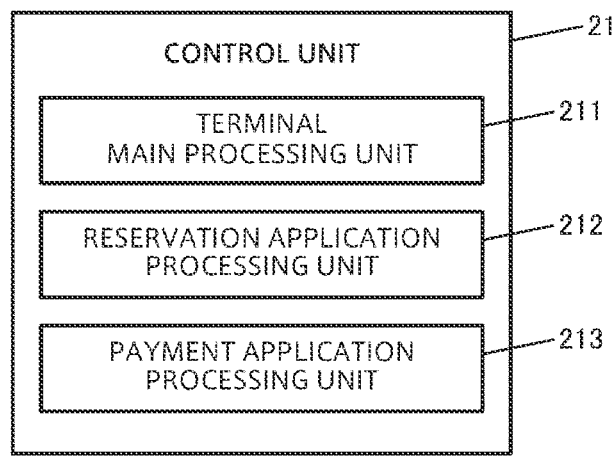
FIG. 6F is a diagram showing examples of functions realized by a controller of a terminal according to the third example.

FIG. 6F is a diagram showing examples of functions realized by the controller 21 of the terminal 20 according to the present example.

The terminal 20 includes a terminal main processor 211, a reservation application processor 212, and a payment application processor 213 as functions realized by the controller 21. The terminal main processing processor 211, the reservation application processor 212, and the payment application processor 213 may be part of a single processor, or may be implemented as a plurality of processors.

The terminal main processor 211 may perform terminal main processing that is processing for controlling the terminal 20 overall according to a terminal main processing program 281 stored in the storage 28. In a non-limiting example, when the terminal 20 is a mobile phone, the terminal main processor performs control to make a call with another mobile phone, a fixed-line phone, or the like via the communication I/F 22, performs control to access various websites via the communication I/F 22, performs control to display various kinds of information on the display 24, performs processing to analyze various kinds of acoustic data input from the microphone 25, performs processing to analyze a still image or a moving image captured by the camera 27, or performs, for example, processing to acquire positional information regarding the terminal 20 based on the result of detection performed by the position calculation information detector 29.

The reservation application processor 212 may communicate with the server 10 and transmit passenger information thereto, based on the reservation application 282 stored in the storage 28.

The payment application processor 213 may perform processing for paying the usage fee for the autonomous driving rental car through electronic payment according to a payment application 283 stored in the storage 28.

Figure 6G:
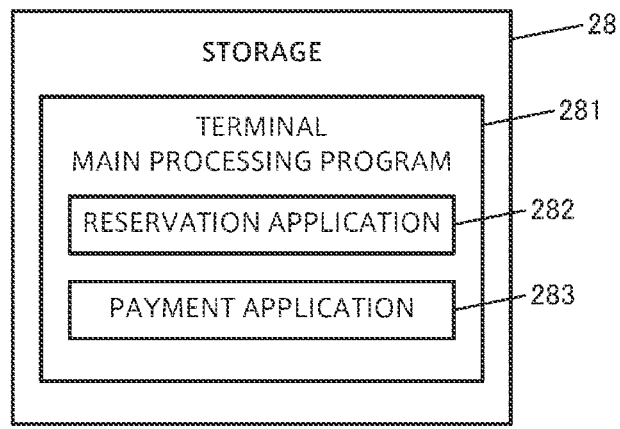
FIG. 6G is a diagram showing an example of information that is stored in a storage of a terminal according to the third example.

FIG. 6G is a diagram showing examples of information stored in the storage 28 of the terminal 20 according to the present example.

In a non-limiting example, the storage 28 stores therein the terminal main processing program 281 that is to be read out and executed by the controller 21 and to realize terminal main processing.

Also, in a non-limiting example, the storage 28 stores therein the reservation application 282 and the payment application 283 as application software that has been acquired by, for example, being downloaded in advance from either one or both of the server 10 and the payment management server 40.

Note that the reservation application 282 and the payment application 283 may be realized as a single application or separate applications.

In a non-limiting example, the reservation application 282 is read out and executed by the controller 21 to realize reservation application processing. In a non-limiting example, the payment application 283 is read out and executed by the controller 21 to realize electronic payment application processing.

(3) Functional Configuration of Payment Management Server

A description of the functional configuration of the payment management server 40 will be omitted because a common electronic payment server can be used in the present example.

(4) Functional Configuration of Vehicle System

FIG. 4B shows examples of functions realized by the controller 51 of the vehicle system 50 according to the present example.

The vehicle system 50 includes a vehicle system main processor (e.g., a vehicle system main processor), an advertisement providing processor (e.g., an advertisement providing processor) 512, and a payment processor (e.g., a payment processor) 513 as functions realized by the controller 51 or hardware components included in the controller 51. The vehicle system main processor 511, the advertisement providing processor 512, and the payment processor 513 may be part of a single processor, or may be implemented as a plurality of processors.

The vehicle system main processor 511 may perform vehicle system main processing that is processing for controlling the vehicle system 50 overall according to a vehicle system main processing program 551 stored in the storage 55.

The advertisement providing processor 512 may acquire passenger information by using at least one device from among the input/output interface 52, the microphone 53B, and the camera 53D and transmits the passenger information to the server 10 via the communication I/F 54, according to an advertisement providing processing program 5511 stored in the storage 55.

Also, the advertisement providing processor 512 may output advertisement information distributed from the server 10 or an advertisement that is based on the advertisement information by using at least one device from among the display 53A, the speaker 53C, and the vehicle environment adjustment unit 53E.

Furthermore, the advertisement providing processor 512 may output and transmit passenger information to the route indicating unit 57, and inform the autonomous driving device 60 of the travel route to the vehicle-exit point.

The payment processor 513 may calculate a regular usage fee for the rental car (hereinafter referred to as a "regular usage fee," "regular rental car usage fee," "regular rental cost") based on the passenger information and transmit the regular usage fee to the server 10 via the communication I/F 54, according to a payment processing program 5512 stored in the storage 55.

Also, when the user exits the vehicle or is about to get off the vehicle, the payment processor 513 may receive the cumulative discount amount calculated by the server 10 based on the actually output advertisement information, from the server 10, via the communication I/F 54, and calculate the ultimate discounted usage fee by subtracting the cumulative discount amount from the regular usage fee calculated as described above.

Also, the payment processor 513 may transmit the payment amount that is based on the discounted usage fee and the user ID that is based on the passenger information, to the payment management server 40, via the communication I/F 54, and perform payment in cooperation with the terminal 20.

In a non-limiting example, the storage 55 stores, as a program, the vehicle system main processing program 551 that is to be read out and executed by the controller 51 to realize a vehicle system main processor.

Also, the vehicle system main processing program 551 includes the advertisement providing processing program 5511 that is to be read out and executed by the controller 51 to realize advertisement providing processing and the payment processing program 5512 that is to be read out and executed by the controller 51 to realize payment processing, as subroutine programs. Advertisement providing processing and payment processing will be described later in detail with reference to a flowchart.

In a non-limiting example, the storage 55 stores therein an advertisement content cache 552 as data.

The advertising content cache 552 stores a subset of the advertising content data 155. Note that the advertisement content cache 552 may store the entirety of the advertisement content data 155, a certain portion of it, or does not store it at all.

Usage Method

The following describes a method for using the autonomous driving rental car (a ridesharing service car, or a shared car) by utilizing the reservation application, the advertisement providing processing program, and the payment application according to the present example, with reference to examples of display screens displayed on the display 24 of the terminal 20 and the display 53A of the vehicle system 50.

Note that the following describes the details of a case in which an advertisement is displayed on a display device provided in a vehicle, and a passenger who has boarded the autonomous driving rental car sees the advertisement displayed on the display device, and accordingly the usage fee is discounted.

FIGS. 5A to 5D are screen diagrams illustrating the above-described flow.

Figure 5A:
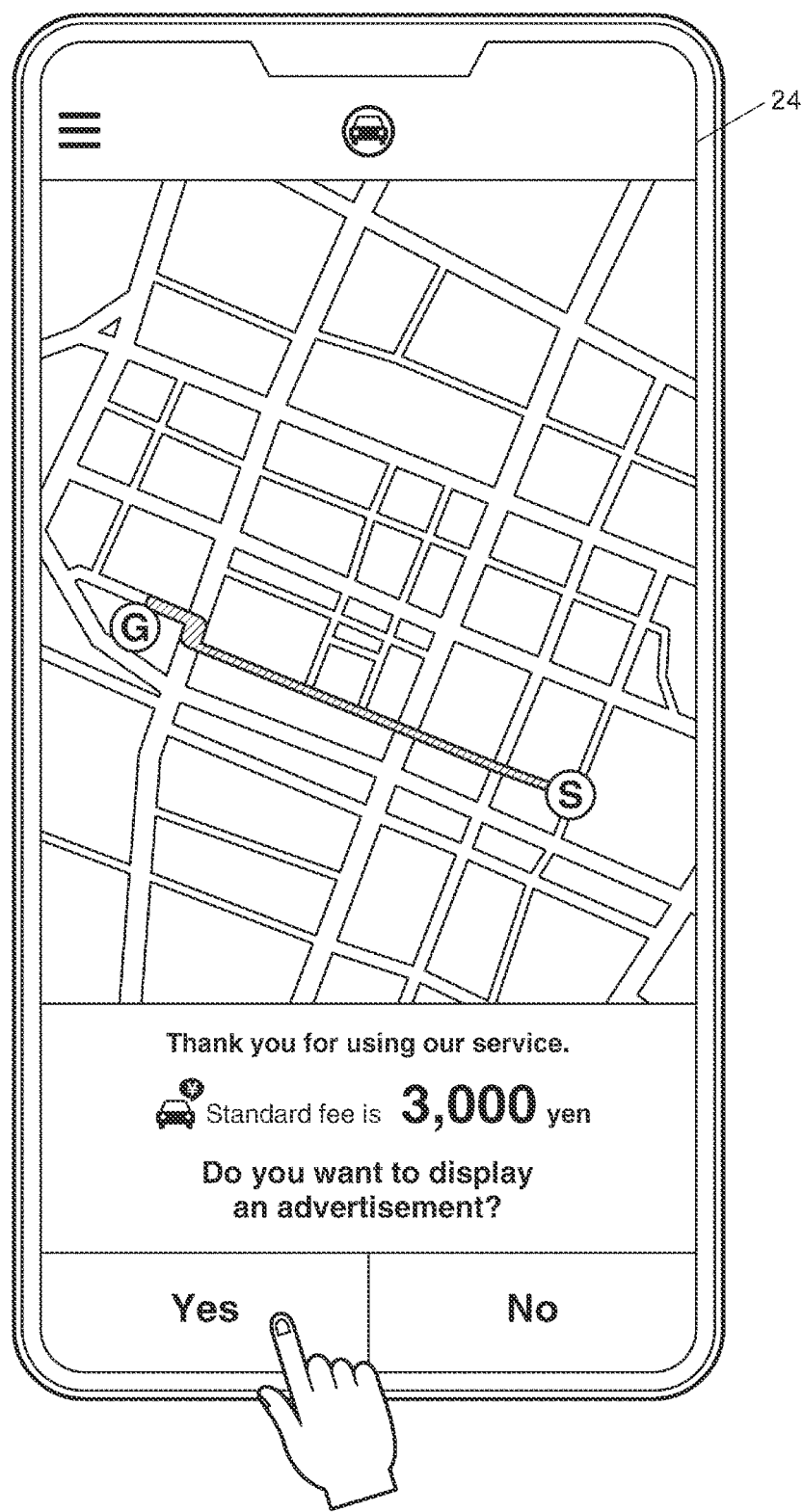
FIG. 5A is a diagram showing an example of a display screen of a terminal according to a third example.

FIG. 5A is a diagram showing an example of a reservation application screen displayed on the display 24 of the terminal 20.

The reservation application screen is a display screen that is displayed when the reservation application is started up (launched, or executed) on the terminal 20, reservation of an autonomous driving rental car is complete, and the user of the terminal 20 boards the autonomous driving rental car.

A car-shaped icon, which is a symbol mark of the reservation application, is displayed in the center of an upper portion of the display screen, and an icon for opening the main menu of the reservation application is provided at the left end of the upper portion. A simplified map of an area around the current position of the terminal 20 is displayed in a central area of the screen (hereinafter, the area in which the map is displayed is referred to as a "map area").

In the map area, the circled "S" (hereinafter referred to as a "vehicle-boarding point symbol") represents the vehicle-boarding point, and the circled "G" (hereinafter referred to as a "vehicle-exit point symbol") represents the vehicle-exit point. The hatched portion in the map area represents the shortest travel route connecting the vehicle-boarding point symbol and the vehicle-exit point symbol.

The standard fee (or the regular usage fee) for the shortest travel route when no discount is given is displayed in the frame below the map area.

Also, at the bottom of the screen, a "Yes" function icon and a "No" function icon are displayed so that the user of the terminal 20 can select and decide whether or not to output an advertisement while the autonomous driving rental car is travelling.

Figure 5B:
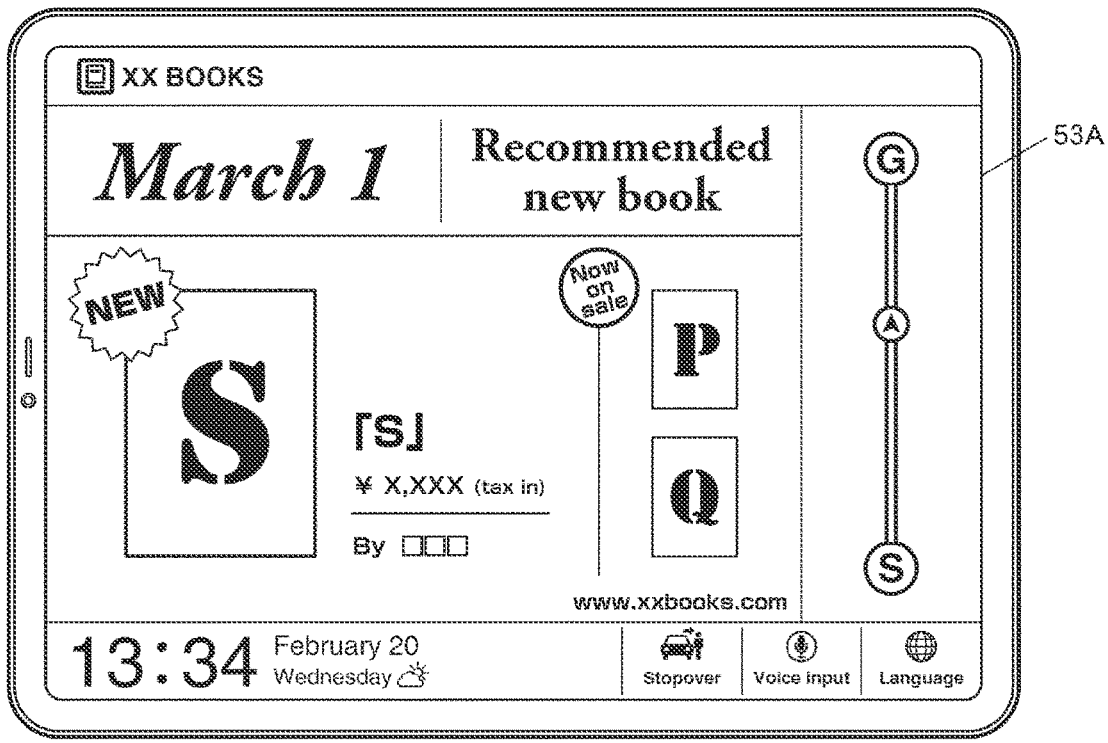
FIG. 5B is a diagram showing an example of a display screen of a terminal according to the third example.

FIG. 5B is a diagram showing an example of a screen displayed on the display 53A of the vehicle system 50 when the "Yes" function icon on the reservation application screen in FIG. 5A is touched by the user of the terminal 20.

In an upper portion of the screen, an advertisement title corresponding to the advertisement content data distributed from the server 10 is displayed (the area in which such an advertisement title is displayed is hereinafter referred to as an "advertisement title area"). On the right side of a central portion of the screen, the content of the advertisement content file that is based on the advertisement content data is displayed (the area in which the content of such advertisement content file is hereinafter referred to as a "advertisement content area"). In the advertisement content area, a circled arrow (hereinafter referred to as a "vehicle symbol") that simply indicates the current position of the rental vehicle is displayed on the route between the vehicle-boarding point symbol and the vehicle-exit point symbol. This display area is herein after referred to as an "operation status display area".

At the bottom of the screen, the current date and time and the current weather are displayed from the left. Also, on the right side thereof, a "Stopover" function icon, a "Voice input" function icon, and a "Language" function icon are displayed.

The "Stopover" function icon is used when the user exits the vehicle at a waypoint described below.

The "Voice input" function icon is used to enable voice input for operating the vehicle system 50.

The "Language" function icon is used to change the output language of the vehicle system 50.

In FIG. 5B, in the operation status display area, the vehicle symbol is moving from the vehicle-boarding point symbol to the vehicle-exit point symbol. In the advertisement content area, a guide advertisement for a new publication is displayed, which is advertisement content that is to be displayed when the vehicle is located outside the advertisement area related to "XX BOOKS".

Figure 5C:
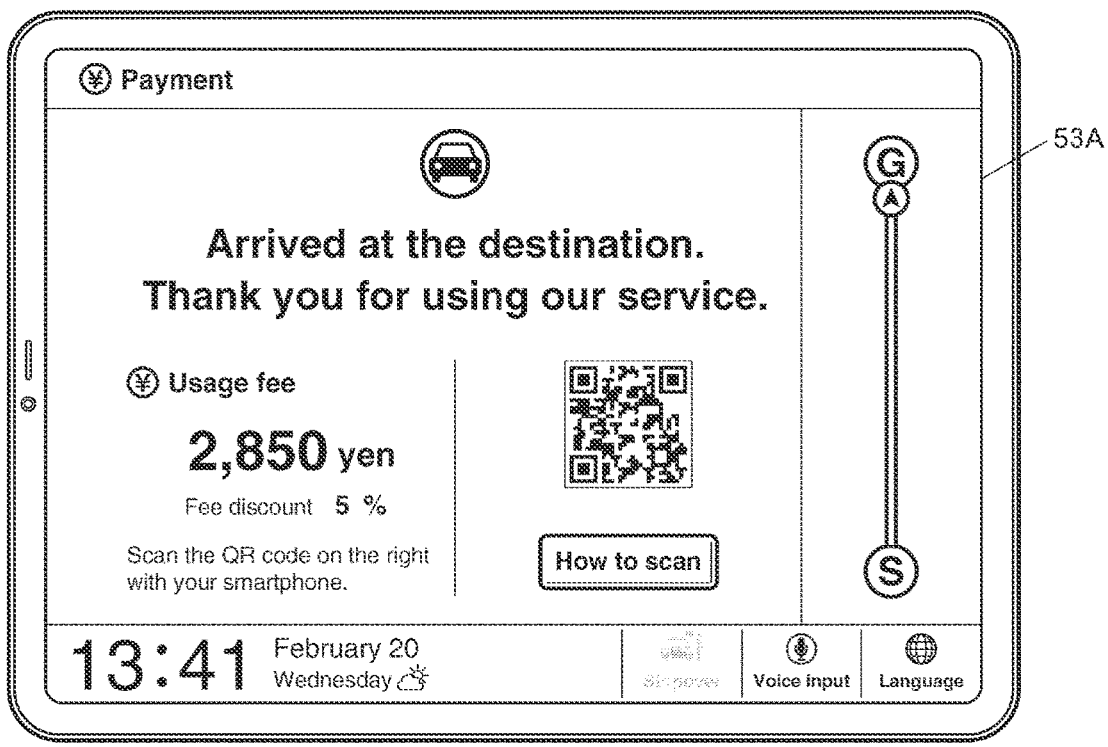
FIG. 5C is a diagram showing an example of a display screen of a terminal according to the third example.

FIG. 5C is a display screen that has transitioned from FIG. 5B as the vehicle has moved. In FIG. 5C, in the operation status display area, the vehicle symbol has reached the vehicle-exit point symbol. This means that the rental vehicle has arrived at the vehicle-exit point. In this case, in the advertisement content area, information that notifies the user of the terminal 20 of the fact that the vehicle has arrived at the vehicle-exit point, the discounted usage fee that is based on the fact that an advertisement has been output while the user was in the rental vehicle, and a payment code that is used to pay the usage fee, are displayed. In this example, a QR code (registered trademark), which is a type of two-dimensional code, is displayed as a payment code.

Figure 5D:
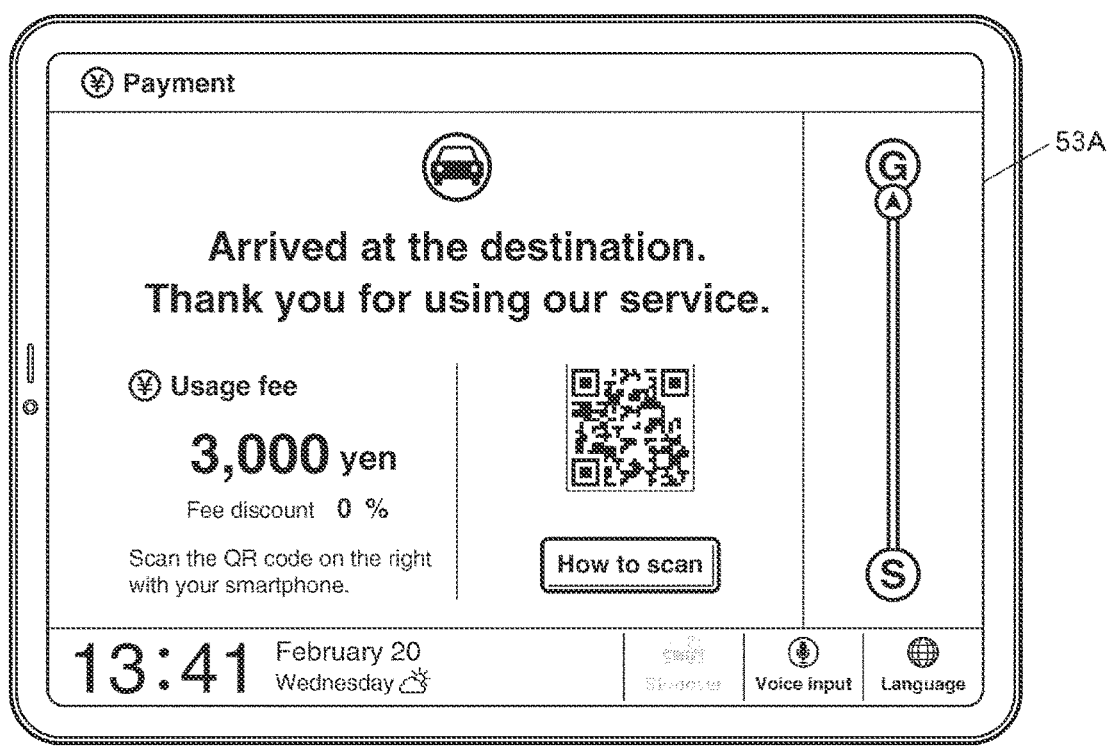
FIG. 5D is a diagram showing an example of a display screen of a terminal according to the third example.

FIG. 5D is a diagram showing an example of a screen displayed on the display 53A of the vehicle system 50 at the vehicle-exit point when the "No" function icon on the reservation application screen in FIG. 5A has been touched by the user of the terminal 20. In this case, in the advertisement content area, information that notifies the user of the terminal 20 of the fact that the vehicle has arrived at the vehicle-exit point, the regular usage fee for the case in which the rental vehicle has travelled the shortest route, and a payment code that is used to pay the usage fee, are displayed.

Processing

Figure 6J:
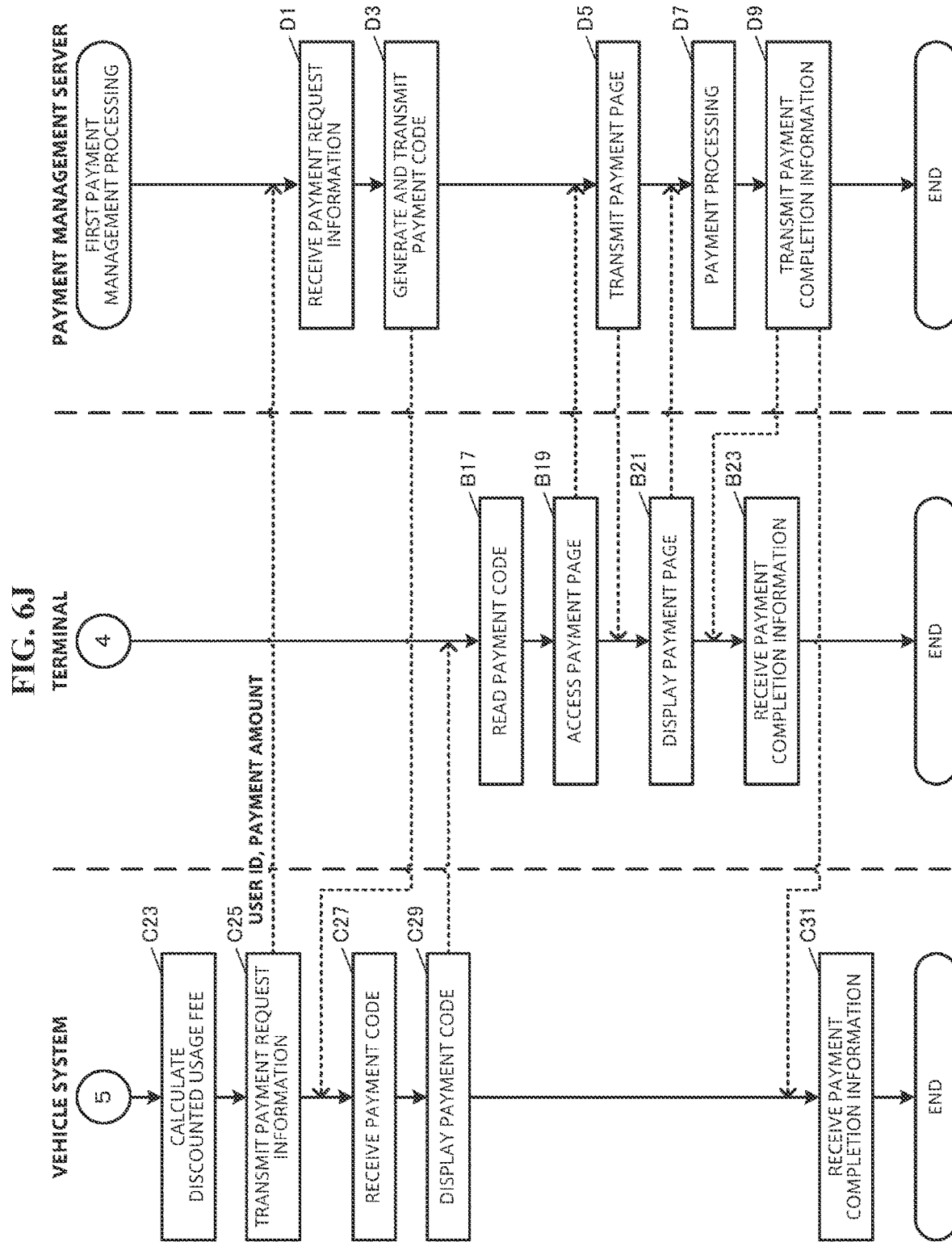
FIG. 6J is a flowchart showing an example of the flow of processing that is performed by devices according to the third example.

FIGS. 6H to 6J are flowcharts showing an example of the flow of processing that is performed by the devices according to the present example.

These figures show first advertisement proposal processing, which is an example of advertisement proposal processing executed by the advertisement proposal processor 112 of the server 10, first vehicle system main processing executed by the vehicle system main processor 511 of the vehicle system 50, and first terminal main processing B, which is an example of terminal main processing executed by the terminal main processor 211 of the terminal 20.

Each step in each kind of processing is indicated by a combination of an uppercase alphabet and a number, and the term "step" is omitted in this description.

Also, the flowcharts described below merely illustrate processing in the present example. In the flowcharts described below, some of the steps may be omitted, and an additional step may be inserted.

Also, the processing performed by the terminal 20 described below may be processing in which all of the steps are carried out by the rental car usage application and the payment application installed on the terminal 20, or processing in which some of the steps are carried out by the rental car usage application and the payment application. In addition, the processing does not necessarily have to be processing that is performed by the application installed on the terminal 20.

First, the reservation application processor 212 of the terminal 20 receives a user operation input to the input/output interface 23 and acquires the vehicle-boarding point and the vehicle-exit point according to the reservation application 282. Thereafter, the reservation application processor 212 transmits the user ID corresponding to the user of the terminal 20, the vehicle-boarding point and the vehicle-exit point (hereinafter referred to as "reservation information") stored in the reservation application 282 to, in a non-limiting example, the vehicle system 50 via a server that manages reservation of the autonomous driving rental car (hereinafter referred to a "reservation server") via the communication I/F 22 (operation B1).

Note that the server 10 may optionally have the function of the reservation server so that the reservation information can be transmitted from the terminal 20 to the vehicle system 50 via the server 10.

Upon receiving the reservation information from the terminal 20 via the communication I/F 54 (operation C1), the advertisement providing processor 512 of the vehicle system 50 calculates, from the vehicle-boarding point and the vehicle-exit point included in the received reservation information, a regular usage fee that is based on the shortest travel route between these two points, in a non-limiting example (operation C3). Thereafter, the advertisement providing processor 512 transmits the regular usage fee and the shortest travel route to the terminal 20 via the communication I/F 54 (operation C3).

In this case, the advertisement providing processor 512 may optionally calculate an estimated required time (e.g., an estimated travel time), based on the aforementioned shortest travel route, and transmit information of the estimated required time, to the terminal 20. The estimated required time is the time expected to be required for the vehicle to travel from the vehicle-boarding point to the vehicle-exit point along the route.

The terminal 20 receives the regular usage fee and the shortest travel route via the communication I/F 22 (operation B3).

After the user boards the vehicle, the reservation application processor 212 displays information that is to be used by the user to select whether or not to allow the input/output interface 23 to provide an advertisement while the user is in the vehicle (for example, a selection screen on which the user can select whether or not to allow an advertisement to be displayed) (operation B5). Note that a method through which the vehicle system 50 detects that the user has boarded the vehicle will be described below.

When the user selects the option not to allow an advertisement to be output (operation B5: NO), the reservation application processor 212 transmits travel start information regarding the shortest travel route, to the server 10 and the vehicle system 50 via the communication I/F 22 (operation B15).

When the user selects the option to allow an advertisement to be output (operation B5: YES), the reservation application processor 212 transmits the reservation information and the regular usage fee received in operation B3, to the server 10 via the communication I/F 22 (operation B7).

In this processing, whether or not to allow the vehicle system 50 to output an advertisement is selected and set by the user. However, settings for outputting an advertisement regardless of the user's will may optionally be employed.

Also, a setting regarding whether or not to allow the vehicle system 50 to output an advertisement is not necessarily performed after the user of the terminal 20 boards the autonomous driving rental car, and may be performed before the user boards the rental car. Non-limiting examples of the times before the user boards the autonomous driving rental car may be the time when the user of the terminal 20 reserves the autonomous driving rental car, the time when the user calls the autonomous driving rental car, and so on. In such a case, in a non-limiting example, the user of the terminal 20 can set whether or not to allow an advertisement to be output, by using an application such as the above-described reservation application.

Also, in such a case, the usage fee for the autonomous driving rental car may optionally be reduced whenever a setting for displaying an advertisement is performed on or applied to the vehicle system 50.

The server 10 receives the reservation information and regular usage fee from the terminal 20 via the communication I/F 14 (operation A1).

The advertisement proposal processor 112 acquires, regarding the shortest travel route, a set of advertisement IDs that includes at least one advertisement ID with which the total discount amount will be the maximum amount, by using dynamic programing, which is a non-limiting example, from the advertisement areas in the pieces of advertisement management data and the discount amounts with the advertisement area relevant flag "o" in the advertisement information table, stored in the first advertisement management database 154A (operation A5).

In a non-limiting example, regarding the calculation of the total discount amount, if the advertisement areas in advertisement management data overlap each other, it is possible to calculate the advertisement output duration for each advertisement ID based on the distribution advertisement content IDs stored in the advertisement information table in the advertisement management data and the advertisement output duration of each advertisement content ID stored in the advertisement content data 155, and calculate the total discount amount such that the total discount amount of a plurality of advertisement IDs will be the maximum amount within the range of the estimated time required to pass through the advertisement areas.

When there is no corresponding advertisement area on the shortest travel route, it is possible to acquire a set that includes at least one advertisement ID so that the total discount amount will be the maximum amount, from the discount amounts with the advertisement area relevant flag "x" in the advertisement information table.

Note that the number of advertisement IDs acquired in operation A5 may optionally have an upper limit. Also, the total discount amount may optionally have an upper limit.

The above-described method for determining the advertisement IDs and the method for calculating the total discount amount are merely examples, and the present embodiment is not limited thereto.

The advertisement proposal processor 112 calculates the total discount amount of the case where the advertisements are output, based on the set of advertisement IDs acquired in A5, with reference to the first advertisement management database 154A (operation A7). In this case, in a non-limiting example, the discount amount calculated in operation A7 is stored as a variable in the advertisement proposal processing program 1511.

Thereafter, the advertisement proposal processor 112 transmits the discount amount calculated in operation A7 to the terminal 20 via the communication I/F 14 (operation A8).

Upon receiving the discount amount from the server 10 via the communication I/F 22 (operation B10), the reservation application processor 212 displays the received discount amount on the display 24.

Next, the reservation application processor 212 transmits the travel start information regarding the shortest travel route, to the server 10 and the vehicle system 50 via the communication I/F 22 (operation B15).

Upon receiving the travel start information from the terminal 20 via the communication I/F 14, the advertisement proposal processor 112 performs processing to select the advertisement ID to be presented (operation A11).

Upon receiving the travel start information from the terminal 20 via the communication I/F 54 (operation C5), the advertisement providing processor 512 outputs (transmits) the shortest travel route to the route indicating unit 57 (operation C7). In this case, the route indicating unit 57 outputs (transmits) the aforementioned route and a departure instruction to the autonomous driving device 60.

In a non-limiting example, while the autonomous driving device 60 is operating the autonomous driving rental car along the travel route, the advertisement providing processor 512 acquires vehicle position information calculated by the controller 51 based on position calculation information detected by the position calculation information detector 58 (or vehicle position information directly calculated by the position calculation information detector 58), at constant intervals (operation C9). Note that vehicle position information may optionally be acquired from the autonomous driving device 60 by using the route indicating unit 57.

The advertisement providing processor 512 transmits the acquired vehicle position information to the server 10 via the communication I/F 54 (operation C11).

The advertisement proposal processor 112 receives the vehicle position information transmitted from the advertisement providing processor 512, via the communication I/F 14 (operation A13). When one or more advertisement IDs are included in the set of advertisement IDs acquired in operation A5 (operation A15: YES), the advertisement proposal processor 112 searches for the advertisement ID of which the advertisement area corresponding thereto is closest to the vehicle position information, from the set of advertisement IDs. Next, the advertisement proposal processor 112 references the advertisement information table corresponding to the advertisement ID found by the search, and acquires the distribution advertisement content ID corresponding to the advertisement area relevant flag "○" if the vehicle position information indicates a position or location within the advertisement area (operation A17).

Note that, if the vehicle position information indicates a position or location outside the advertisement area, the advertisement proposal processor 112 may acquire the distribution advertisement content ID corresponding to the advertisement area relevant flag "x", or wait without proceeding to operation A17 until the position indicated by the vehicle position information enters the advertisement area.

Next, based on the distribution advertisement content ID acquired in operation A15, the advertisement proposal processor 112 transmits the data corresponding to the content ID in the advertisement content data 155, to the vehicle system 50 via the communication I/F 14 (operation A19).

Thereafter, the advertisement proposal processor 112 references the advertisement information table in the advertisement management data, and cumulatively stores (or sums up) the discount amount corresponding to the advertisement area used in operation A17, as a variable in the advertisement proposal processing program 1511 (operation A21).

The advertisement providing processor 512 receives the above-described advertisement content data from the server 10 via the communication I/F 54 (operation C13). The advertisement providing processor 512 outputs an advertisement content file (an advertisement that is based on the advertisement content file) to the advertisement output destination written in the advertisement content data, by using any one or any combination of the display 53A, the speaker 53C, and the vehicle environment adjustment unit 53E (operation C15). The length of time for which the advertisement is to be output is defined by the advertisement output duration.

If the set of advertisement IDs acquired in operation A5 does not include an advertisement ID (operation A15: NO), the advertisement providing processor 512 does not perform the processing for transmitting advertisement information to the vehicle system 50 (operations A17, A19) or the processing for cumulatively storing the discount amount (operation A21). That is to say, if the user selects the option not to allow an advertisement to be output in operation B5 (operation B5: NO), operations A17 to A21 are not performed.

The advertisement providing processor 512 receives an arrival signal transmitted from the autonomous driving device 60 by using the route indicating unit 57, and determines whether or not the vehicle has arrived at the vehicle-exit point (operation C17).

Note that the advertisement providing processor 512 may optionally determine whether the vehicle has arrived at the vehicle-exit point by comparing the vehicle position information acquired in operation C9 with the positional information regarding the vehicle-exit point, and determining whether or not these pieces of information are the same.

If the vehicle has not arrived at the vehicle-exit point (operation C17: NO), the advertisement providing processor 512 returns to operation C9 and acquires vehicle position information again. If the vehicle has arrived at the vehicle-exit point (operation C17: YES), the advertisement providing processor 512 transmits vehicle-exit point arrival information to the server 10 via the communication I/F 54 (operation C19).

The advertisement proposal processor 112 receives the vehicle-exit point arrival information transmitted from the vehicle system 50, via the communication I/F 14 (operation A23). Next, the advertisement proposal processor 112 transmits the cumulative discount amount stored as a variable in the advertisement proposal processing program 1511, to the vehicle system 50, via the communication I/F 14 (operation A25).

The advertisement providing processor 512 receives the cumulative discount amount from the server 10 via the communication I/F 54 (operation C21), and calculates the discounted usage fee by subtracting the cumulative discount amount from the regular usage fee (operation C23).

Note that if the user selects the option not to allow an advertisement to be presented in operation B5 (operation B5: NO), the discounted usage fee will be the regular usage fee.

The above-described discounted usage fee and the user ID included in the reservation information received in operation C1 are transmitted from the advertisement providing processor 512 to the payment processor 513. Thereafter, the payment processor 513 transmits payment request information that includes the discounted usage fee and the user ID to the payment management server 40 via the communication I/F 54 (operation C25).

The controller 41 of the payment management server 40 receives the payment request information from the payment processor 513 via the communication I/F 44 (operation D1). Thereafter, the controller 41 generates a payment code that includes a URI (for example, a URL) of a payment page. The controller 41 transmits the generated payment code to the vehicle system 50 via the communication I/F 44 (operation D3).

Upon receiving the payment code from the payment management server 40 via the communication I/F 54 (operation C27), the payment processor 513 displays the payment code on the display 53A (operation C29).

The user of the terminal 20 reads the payment code displayed on the display 53A by using the camera 27 (operation B17). The payment application processor 213 of the terminal 20 accesses the payment page of the payment management server 40 based on the URI of the payment page included in the read payment code (operation B19).

The payment management server 40 transmits the payment page to the terminal 20 via the communication I/F 44 (operation D5). The payment application processor 213 of the terminal 20 receives the payment page transmitted from the payment management server 40 via the communication I/F 22, and displays the payment page on the display 24. In a non-limiting example, the displayed screen shows the discounted usage fee. Upon the user of the terminal 20 confirming the usage fee and agreeing to pay the fee, the payment application processor 213 transmits information required for the payment to the payment management server 40 via the communication I/F 22 (operation B21).

The payment management server 40 performs payment processing (operation D7), and transmits payment completion information indicating that the payment is complete, to the terminal 20 and the vehicle system 50 (operation D9).

Upon receiving the payment completion information from the payment management server 40 via the communication I/F 54, the payment processor 513 of the vehicle system 50 displays information indicating that the payment of the usage fee is complete, on the display 53A (operation C31).

Similarly, upon receiving the payment completion information from the payment management server 40 via the communication I/F 22, the payment application processor 213 of the terminal 20 displays information indicating that the payment of the usage fee is complete, on the display 24 (operation B23).

Note that, in operation C1, for example, the vehicle system 50 receives reservation information from the terminal 20. In operation C1, the vehicle system 50 may receive reservation information directly from the terminal 20. However, in a non-limiting example, the vehicle system 50 may receive reservation information indirectly from the terminal 20 via a server or an external device such as the above-described server that manages reservation of an autonomous driving rental car (the reservation server) or a server that performs assignment of an autonomous driving rental car (a vehicle assignment server).

Also, in operation C3, for example, the vehicle system 50 calculates the regular usage fee. Also, in operation C3, in a non-limiting example, the vehicle system 50 acquires information regarding the usage fee for the autonomous driving rental car (for example, a list of fees for autonomous driving rental cars) from a server such as the above-described reservation server or a vehicle assignment server or an external device. The regular usage fee may be calculated based on the information regarding the usage fee thus acquired.

Also, in operation A7, for example, the server 10 calculates the discount amount (the total discount amount) in the case where advertisements are output. Such calculation of the discount amount may be performed by the payment management server 40 instead of the server 10.

That is to say, the above-described processing may optionally be realized by separate servers, one performing processing related to advertisements and the other performing processing related to fees. For example, the server 10 may perform processing related to advertisements, and the payment management server 40 may perform processing related to fees.

The same applies to the subsequent processing.

Effects of Third Example

In the third example, the terminal 20 receives a discounted usage fee for an autonomous driving rental car (a non-limiting example of information regarding a usage fee for a vehicle) calculated by the advertisement proposal processor 112 of the vehicle system 50 based on the fact that an advertisement has been displayed on the display 53A (a non-limiting example of a display device) of the vehicle system 50 (a non-limiting example of an electronic device). The third example shows a configuration with which the terminal 20 displays display regarding payment that is based on the discounted usage fee (a non-limiting example of a first display) in an area (a non-limiting example of a display area of a terminal) on a display screen of the display 24.

One example of the effects that can be achieved with such a configuration is that information regarding the usage fee for the vehicle can be confirmed on the terminal instead of the display device, and therefore user convenience can be improved.

The third example shows a configuration with which setting for displaying an advertisement is created, applied, and/or performed using the controller 21 of the terminal 20.

One example of the effects that can be achieved with such a configuration is that a setting for displaying an advertisement can be performed on or applied to a terminal, and therefore user convenience can be improved.

Also, in the third example, when the setting for displaying an advertisement is applied, the server 10 calculates a cumulative discount amount (a non-limiting example of a discounted amount) based on the advertisements displayed by the vehicle system 50. The advertisement providing processor 512 of the vehicle system 50 calculates the discounted usage fee by subtracting the cumulative discount amount from the regular usage fee. The third example shows a configuration with which the discounted usage fee is displayed on the terminal 20.

One example of the effects that can be achieved with such a configuration is that the usage fee is discounted based on the setting for displaying an advertisement, and therefore the financial burden on the user can be reduced. Also, the user can check the discounted usage fee on the terminal, and therefore user convenience can be improved.

Also, in the third example, the terminal 20 displays an advertisement setting display (a non-limiting example of a second display) that is to be used to create, apply, or perform a setting regarding whether or not to display an advertisement on the display device of the vehicle system 50 based on an operation input by the user of the terminal 20, on an area (a non-limiting example of a display area of the terminal) of the display screen of the display 24. The third example shows a configuration with which setting for selecting whether or not to display an advertisement on the display device of the vehicle system 50 is performed based on input from the user of the terminal 20 to the advertisement setting display.

One example of the effects that can be achieved with such a configuration is that the second display related to the setting for displaying an advertisement on the display device of a vehicle is displayed on a display area of the terminal, and the setting is performed based on input from the user of the terminal on the second display, and therefore the user can easily apply and/or perform the setting for displaying an advertisement on the display device of the vehicle, using their own terminal.

Also, the third example shows a configuration with which an advertisement display setting for displaying an advertisement on the display device of the vehicle system 50 (a non-limiting example of a first setting) or an advertisement non-display setting for not displaying an advertisement on the display device of the vehicle system 50 (a non-limiting example of a second setting) is employed as the above-described setting for displaying an advertisement.

One example of the effects that can be achieved with such a configuration is that it is possible to enable the user to use their own terminal to select the setting for displaying an advertisement on the display device of a vehicle or the setting for not displaying an advertisement on the display device of the vehicle.

Also, the third example shows a configuration with which an advertisement display setting for displaying an advertisement on the display device of the vehicle system 50 (a non-limiting example of a first setting) or an advertisement non-display setting for not displaying an advertisement on the display device of the vehicle system 50 (a non-limiting example of a second setting) is employed as the above-described setting for displaying an advertisement.

One example of the effects that can be achieved with such a configuration is that it is possible to enable the user to use their own terminal to select the setting for displaying an advertisement on the display device of a vehicle or the setting for not displaying an advertisement on the display device of the vehicle.

Also, in the third example, the server 10 (a non-limiting example of an electronic device) acquires an advertisement ID or an advertisement content ID (a non-limiting example of information regarding display of an advertisement on the display device of a vehicle) corresponding to an advertisement that is to be displayed on the display 53A of the vehicle system 50, from the storage 15. The third example shows a configuration with which the server 10 transmits the discounted usage fee for the rental car (a non-limiting example of information regarding a usage fee for a vehicle) to the terminal 20 via the communication I/F 14, based on the acquired information.

One example of the effects that can be achieved with such a configuration is that, by transmitting information regarding the usage fee of a vehicle to the terminal based on information regarding the display of an advertisement on the display device of the vehicle, acquired by the electronic device, it is possible to appropriately make a notification to the user of the terminal of information regarding the usage fee of the vehicle.

Third Modification (1)

Although the advertisement proposal processor 112 of the server 10 transmits data corresponding to the content ID of the advertisement content data 155 to the vehicle system 50 via the communication I/F 14 in the third example, the present embodiment is not limited thereto. For example, the advertisement content data 155 may transmit data corresponding to the content ID of the advertisement content data 155 to the terminal 20.

FIG. 6K is a flowchart showing an example of the flow of processing that is performed by the devices in such a case. Note that the same steps as those in the above described flowchart are assigned the same reference numerals and redundant descriptions thereof will be omitted, and different steps will mainly be described.

The flowchart in FIG. 6K is a flowchart formed by adding steps related to transmission and reception of data related to an advertisement between the server 10 and the terminal 20, and to the display of an advertisement on the terminal 20 (for example operation A19a and operations B16a and B16b) to the flowchart in FIG. 6I.

Unlike the processing in FIG. 6I, after operation A17, the advertisement proposal processor 112 transmits data corresponding to the content ID of the advertisement content data 155 to the terminal 20 based on the distribution advertisement content ID acquired in operation A15, via the communication I/F 14 (operation A19a).

Upon receiving the above-described advertisement content data from the server 10 via the communication I/F 22 (operation B16a), the reservation application processor 212 outputs an advertisement content file (an advertisement that is based on an advertisement content file) by using any combination of the display 24 and the speaker 26, to the advertisement output destination stored in the advertisement content data (operation B16b).

Note that the advertisement proposal processor 112 may optionally transmit the data corresponding to the content ID of the advertisement content data 155 to the vehicle system 50 and the terminal 20.

Effects of Third Modification (1)

This modification shows a configuration with which the terminal 20 displays an advertisement in an area on the display screen of the display 24.

One example of the effects that can be achieved with such a configuration is that an advertisement can be displayed in the display area of a terminal, and the user can see the advertisement on their own terminal.

Third Modification (2)

Although an autonomous driving rental vehicle that is provided with an autonomous driving device is described as a vehicle that is used as a transportation means in the third example, the present embodiment is not limited thereto.

The vehicle may optionally be a vehicle that is provided with an autonomous driving device other than an autonomous driving rental vehicle, such as an autonomous driving taxi or an autonomous driving bus. Also, the vehicle may be a ride sharing service car, or a car sharing service car.

Alternatively, the vehicle may optionally be a ship or an aircraft. The vehicle may or may not be provided with an autonomous driving device.

In addition, the vehicle may be a vehicle for which a travel route is not defined, or a vehicle for which a travel route is defined.

Also, the usage fee for the vehicle is not limited to the usage fee for the above-described autonomous driving rental car, and may optionally be a fare in the case of traveling using a vehicle that is provided with an autonomous driving device. Specifically, in a non-limiting example, the usage fee may optionally be the fare in the case of using an autonomous taxi. Also, the usage fee may be the fare for a ride sharing service car, or a usage fee for a car sharing service car.

Also, instead of the terminal 20 causing the vehicle to travel to the position or location of a store or the like indicated by the advertisement displayed on the display device of the vehicle, via the server 10, the terminal 20 may optionally transmit a control signal to the vehicle system 50 by using a BOT or the like of the terminal 20 to perform control to move the vehicle to the position of the store or the like indicated by the advertisement displayed on the display device of the vehicle.

Effects of Third Modification (2)

One example of the effects that can be achieved with the present modification is that the method according to the present disclosure is applicable to a vehicle that is provided with an autonomous driving device other than the autonomous driving rental vehicle, and a transportation means other than the vehicle. Therefore, versatility can be improved.

The same applies to a fourth example and the subsequent examples.

Fourth Example

The fourth example is, as with the third example, an example in which an autonomous driving rental car that can autonomously travel according to the vehicle-boarding point and the vehicle-exit point specified by the user is provided with an extended vehicle display device (a vehicle system/a vehicle device).

More specifically, in the fourth example, after getting in the autonomous driving rental car, the user of the terminal 20 selects a route from among one or more routes to the vehicle-exit point presented by the vehicle system 50. As a result, the output device provided in the vehicle outputs an advertisement based on advertisement information according to the waypoint corresponding to the selected route. Accordingly, the server 10 calculates the usage fee discount amount, and performs payment of the discounted usage fee when the user of the terminal 20 exits the vehicle, based on the usage fee discount amount by using the vehicle system 50.

The system configuration and the HW configuration and functional configuration of each device of the fourth example may be the same as those in the third example. Therefore, redundant descriptions thereof will be omitted.

Note that, in the fourth example, the advertisement providing processor 512 of the vehicle system 50 may output and transmit passenger information to the route indicating unit 57, and informing the autonomous driving device 60 of the travel route including the waypoint and the vehicle-exit point. The waypoint may or may not be present. Alternatively, a plurality of waypoints may be present.

Usage Method

The following describes a method for using the autonomous driving rental car by utilizing the reservation application, the advertisement providing processing program, and the payment application according to the present example, with reference to examples of display screens displayed on the display 24 of the terminal 20 and the display 53A of the vehicle system 50.

Note that the following describes the details of a case in which an advertisement is displayed on a display device provided in a vehicle, and a passenger who has boarded the autonomous driving rental car selects a waypoint from three kinds of waypoint candidates and sees the advertisement displayed on the display device, and accordingly the usage fee is discounted. Descriptions of the same features as those shown in the screen diagrams of the third example will be omitted.

FIGS. 5E to 5M are screen diagrams illustrating the above-described flow.

Figure 5E:
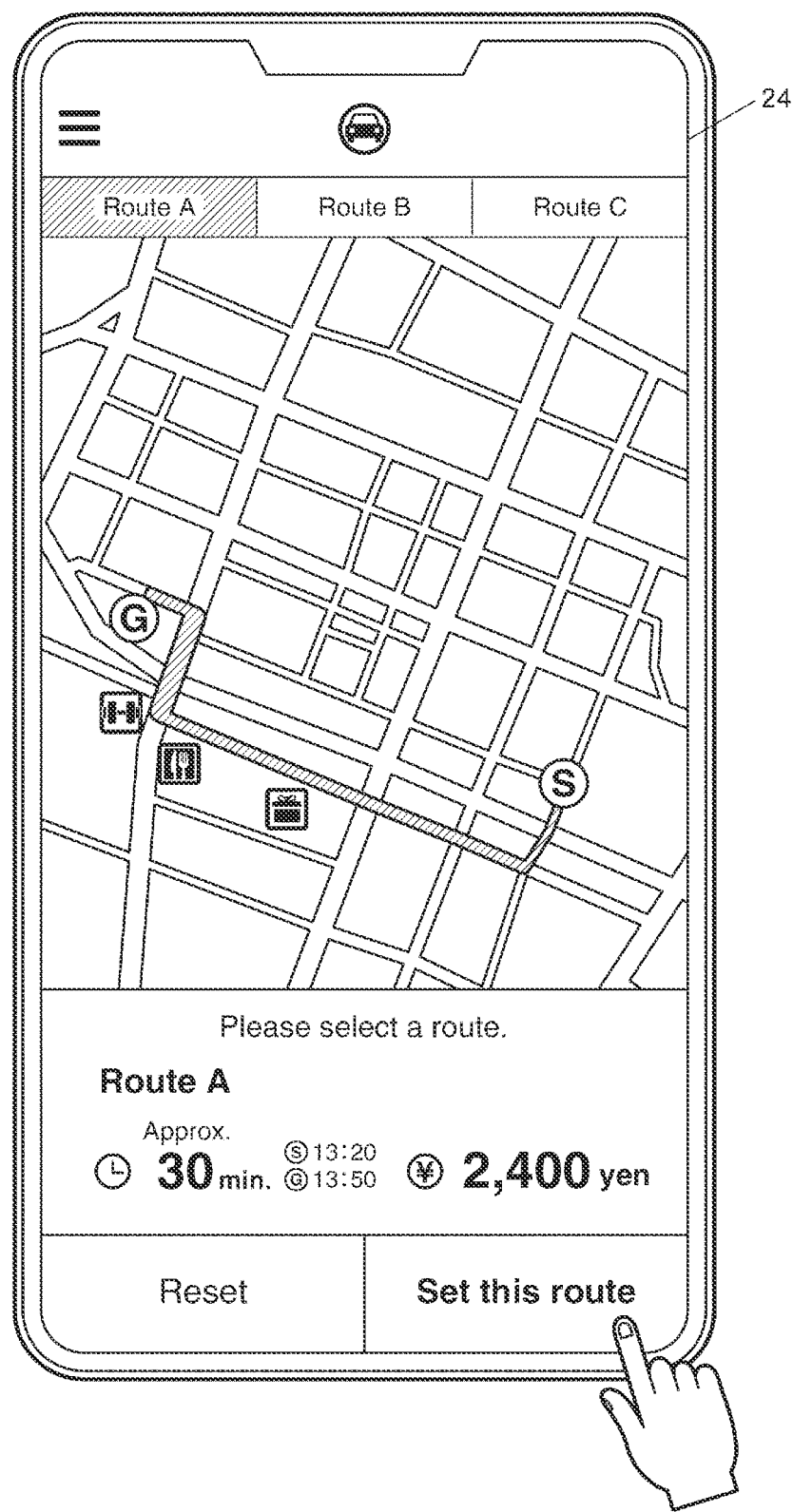
FIG. 5E is a diagram showing an example of a display screen of a vehicle system according to the third example.

FIG. 5E is a diagram showing an example of a screen displayed when the "Yes" function icon on the reservation application screen in FIG. 5A is touched by the user of the terminal 20.

In an upper portion of the map area, a plurality of tabs that are to be used to select a waypoint candidate (hereinafter referred to as "route selection tabs") are displayed. FIG. 5E shows a state in which "Route A" is selected by using a route selection tab.

The hatched portion in the map area represents a travel route connecting the vehicle-boarding point symbol and the vehicle-exit point symbol as shown in FIG. 5A. Also, areas in which advertisements are to be output are displayed along the travel route as symbols (these symbols are hereinafter referred to as "advertisement symbols"). That is to say, in the map area, the advertisement symbols are displayed in association with the advertisement area positions in the first advertisement management database 154A.

An area below the map area shows the estimated required time and the discounted usage fee for the travel route "Route A" that is based on the waypoint candidate that is currently selected. On the right side of the vehicle-boarding point symbol and the vehicle-exit point symbol, the respective rental vehicle arrival times of the points are displayed.

At the bottom of the screen, a function icon "Set this route" with which the user of the terminal 20 can select/confirm the option to accept the waypoint candidate "Route A", and a function icon "Reset" with which the user can select/confirm the option not to accept the waypoint candidate, are displayed.

Figure 5F:
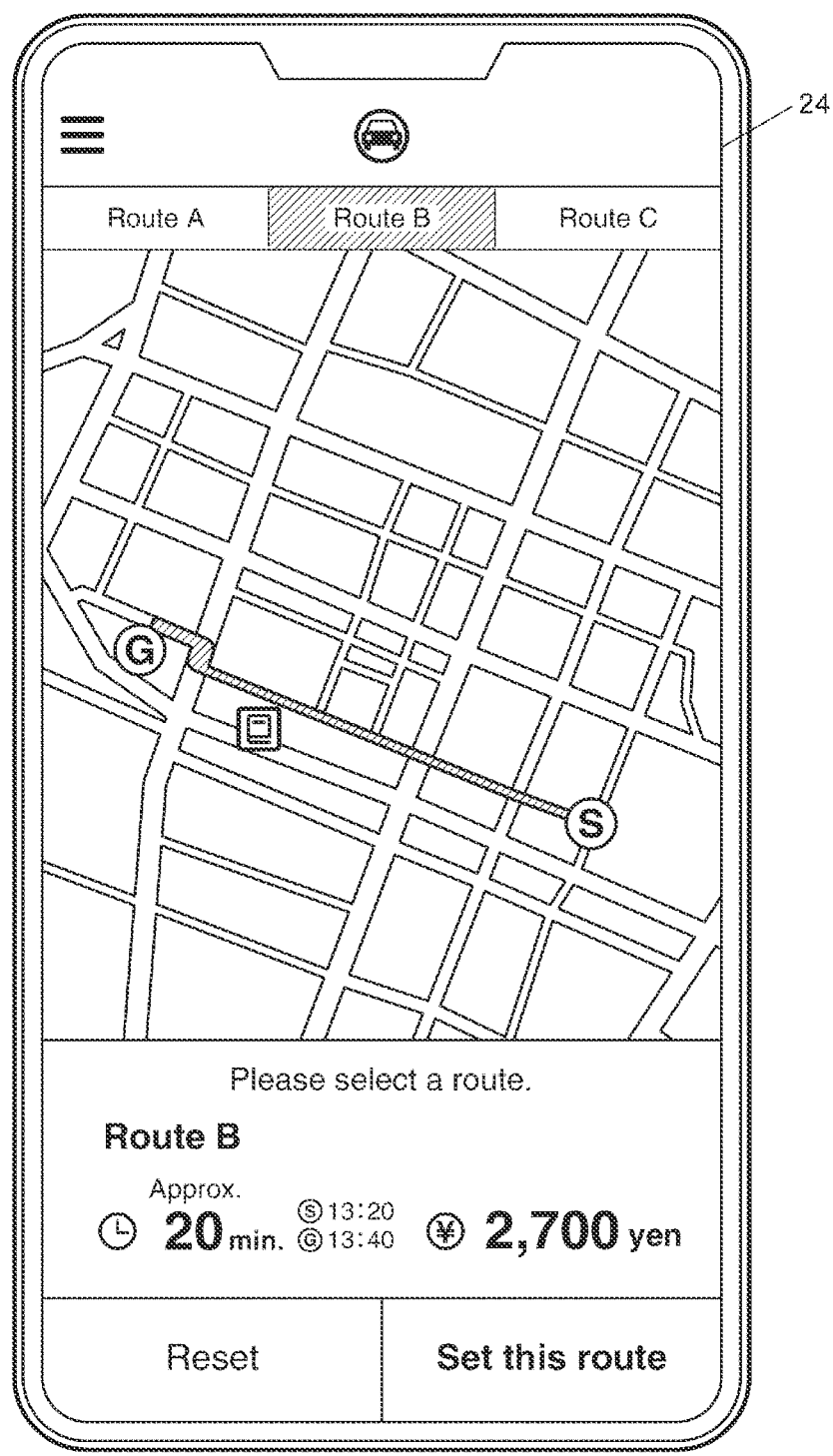
FIG. 5F is a diagram showing an example of a display screen of the vehicle system according to the third example.

FIG. 5F is a diagram showing an example of a screen displayed when the "Reset" function icon in FIG. 5E is touched by the user of the terminal 20.

As in FIG. 5E, the route selection tab shows that "Route B" has been selected. Also, the hatched portion in the map area represents a travel route connecting the vehicle-boarding point symbol and the vehicle-exit point symbol.

An area below the map area shows the estimated required time and the discounted usage fee for the travel route "Route B" that is based on the waypoint candidate that is currently selected. On the right side of the vehicle-boarding point symbol and the vehicle-exit point symbol, the respective rental vehicle arrival times of the points are displayed.

At the bottom of the screen, a function icon "Set this route" with which the user of the terminal 20 can select/confirm the option to accept the waypoint candidate "Route B", and a function icon "Reset" with which the user can select/confirm the option not to accept the waypoint candidate, are displayed.

Figure 5G:
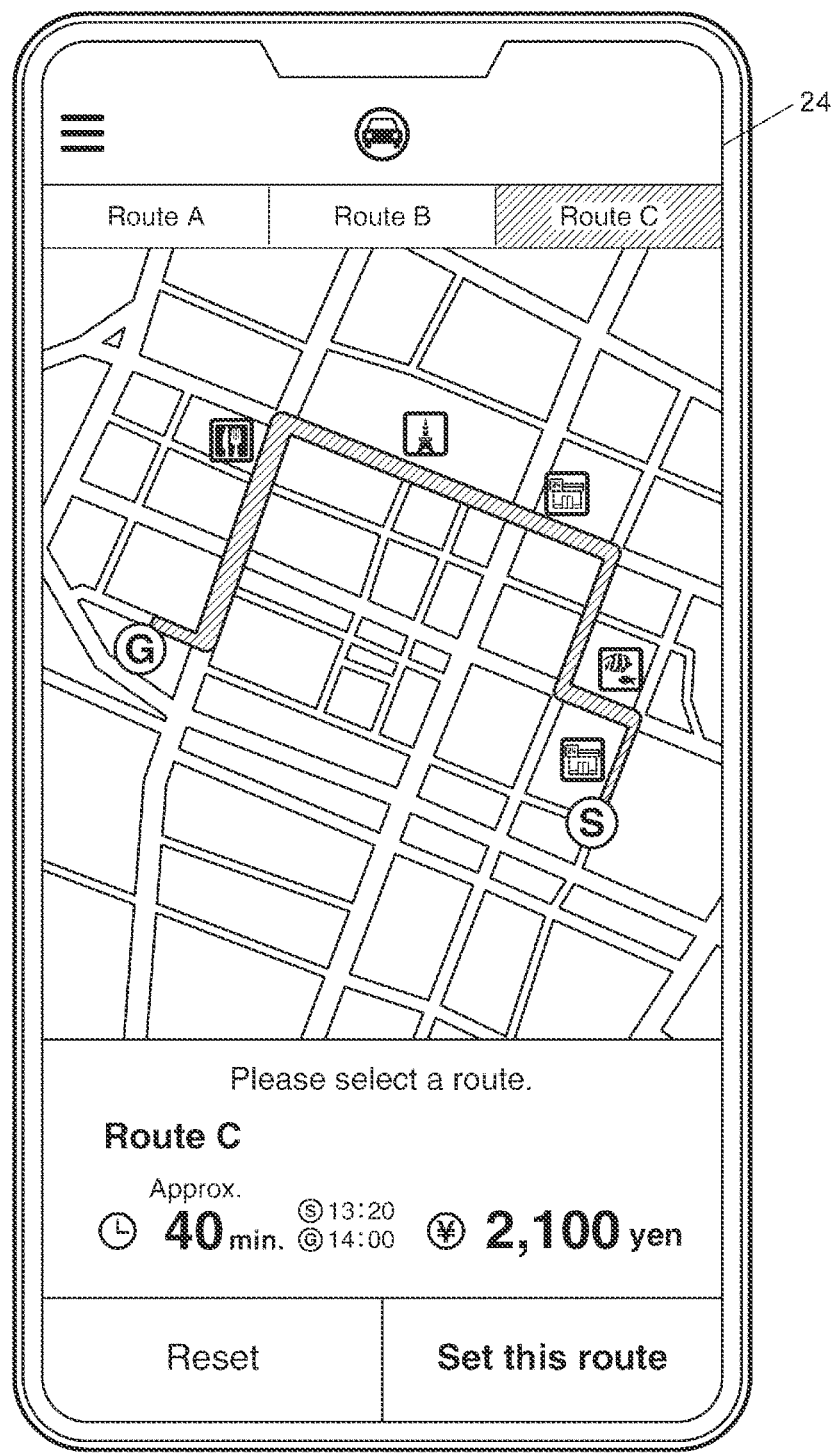
FIG. 5G is a diagram showing an example of a display screen of the vehicle system according to the third example.

FIG. 5G is a diagram showing an example of a screen displayed when the "Reset" function icon in FIG. 5F is touched by the user of the terminal 20.

As in FIG. 5E, the route selection tab shows that "Route C" has been selected. Also, the hatched portion in the map area represents a travel route connecting the vehicle-boarding point symbol and the vehicle-exit point symbol. Advertisement symbols are displayed along the travel route.

An area below the map area shows the estimated required time and the discounted usage fee for the travel route "Route C" that is based on the waypoint candidate that is currently selected. On the right side of the vehicle-boarding point symbol and the vehicle-exit point symbol, the respective rental vehicle arrival times of the points are displayed.

At the bottom of the screen, a function icon "Set this route" with which the user of the terminal 20 can select/confirm the option to accept the waypoint candidate "Route C", and a function icon "Reset" with which the user can select/confirm the option not to accept the waypoint candidate, are displayed.

Figure 5H:
FIG. 5H is a diagram showing an example of a display screen of the vehicle system according to the third example.

FIG. 5H is a diagram showing an example of a screen displayed on the display 53A of the vehicle system 50 when the "Set this route" function icon in FIG. 5E is touched by the user of the terminal 20.

In the operation status display area, the vehicle symbol that simply indicates the current position or location of the rental vehicle and the advertisement symbols arranged along the route are displayed on the route between the vehicle-boarding point symbol and the vehicle-exit point symbol.

In FIG. 5H, in the operation status display area, three advertisement symbols provided along the route "Route A" are displayed in association with the route connecting the vehicle-boarding point symbol and the vehicle-exit point symbol.

In FIG. 5H, in the operation status display area, the vehicle symbol has moved from the vehicle-boarding point symbol to the vehicle-exit point symbol, and has arrived at the position of the advertisement symbol associated with "ooo department store". That is to say, the rental vehicle is in the advertisement area corresponding to the "ooo department store". In this case, the advertisement title "ooo department store" is displayed in the advertisement title area, and an advertisement for a winter clearance sale, which is the content of an advertisement content file, is displayed in the advertisement content area.

Figure 5I:
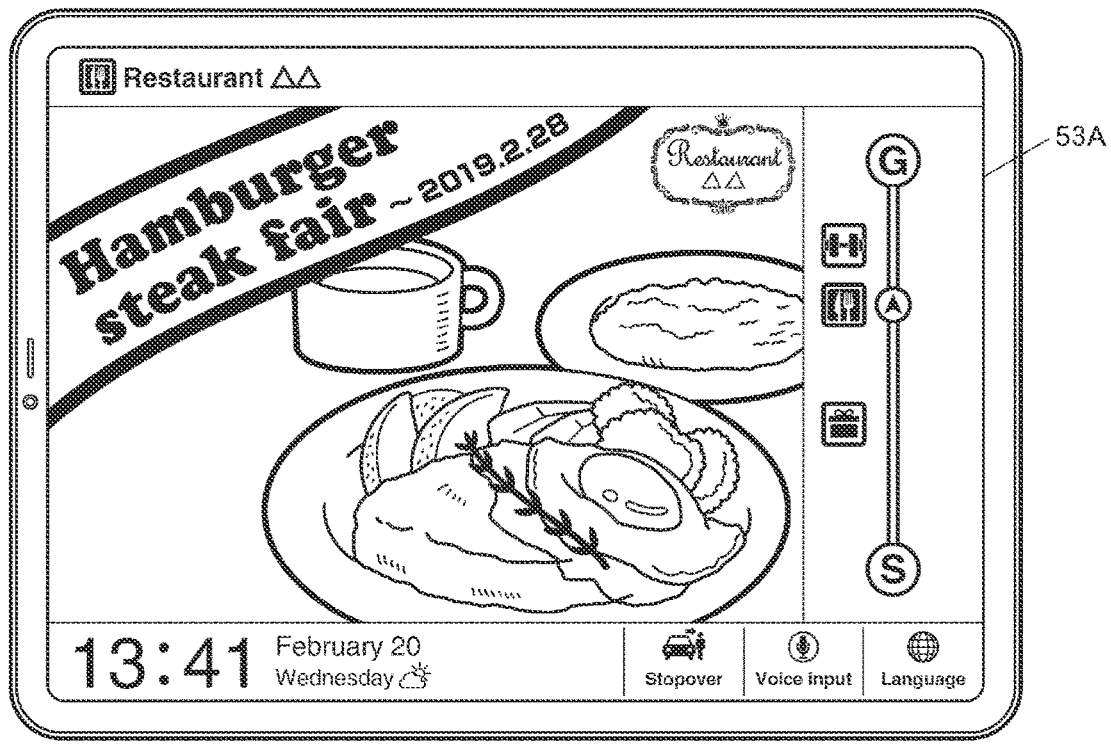
FIG. 5I is a diagram showing an example of a display screen of the vehicle system according to the third example.

FIG. 5I is a display screen that has transitioned from FIG. 5H as the vehicle has moved. In FIG. 5I, in the operation status display area, the vehicle symbol has moved toward the vehicle-exit point symbol, and has arrived at the position of the advertisement symbol associated with "Restaurant ΔΔ". That is to say, the rental vehicle is in the advertisement area corresponding to "Restaurant ΔΔ". In this case, the advertisement title "Restaurant ΔΔ" is displayed in the advertisement title area, and an advertisement for a hamburger steak fair, which is the content of an advertisement content file, is displayed in the advertisement content area.

Figure 5J:
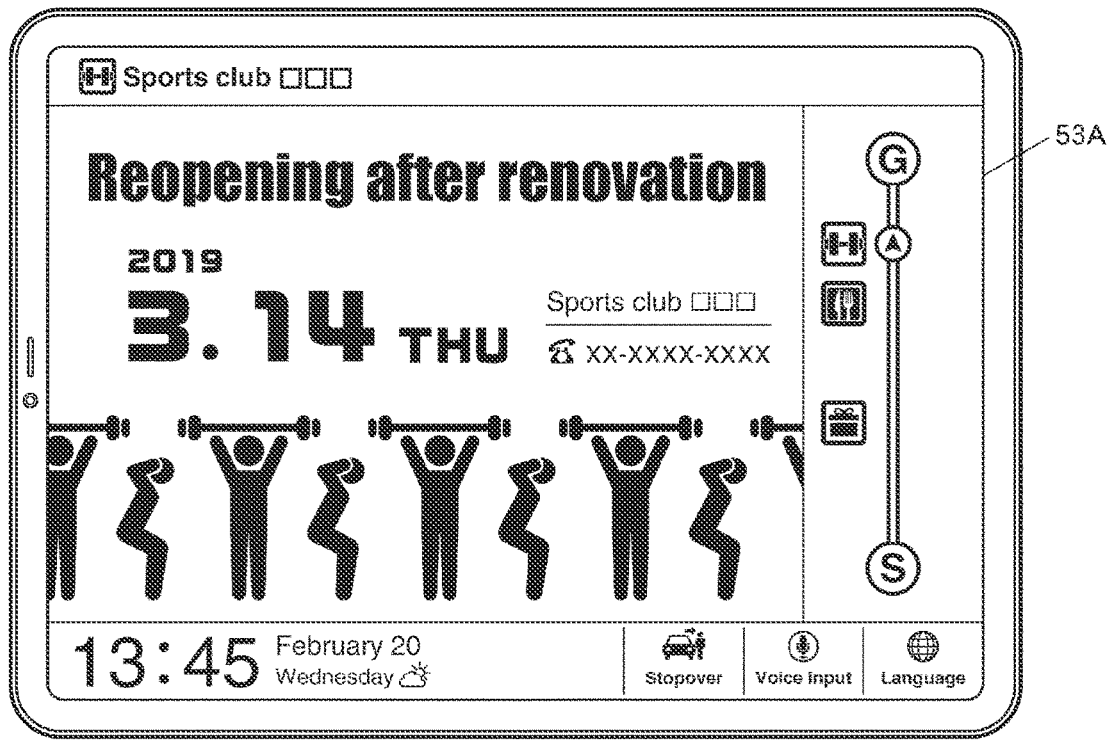
FIG. 5J is a diagram showing an example of a display screen of the vehicle system according to the third example.

FIG. 5J is a display screen that has transitioned from FIG. 5I as the vehicle has moved. In FIG. 5J, in the operation status display area, the vehicle symbol has moved toward the vehicle-exit point symbol, and has arrived at the position of the advertisement symbol associated with "Sports club ☐☐☐". That is to say, the rental vehicle is in the advertisement area corresponding to "Sports club ☐☐☐". In this case, the advertisement title "Sports club ☐☐☐" is displayed in the advertisement title area, and an advertisement for the reopening of the sports club, which is the content of an advertisement content file, is displayed in the advertisement content area.

Figure 5K:
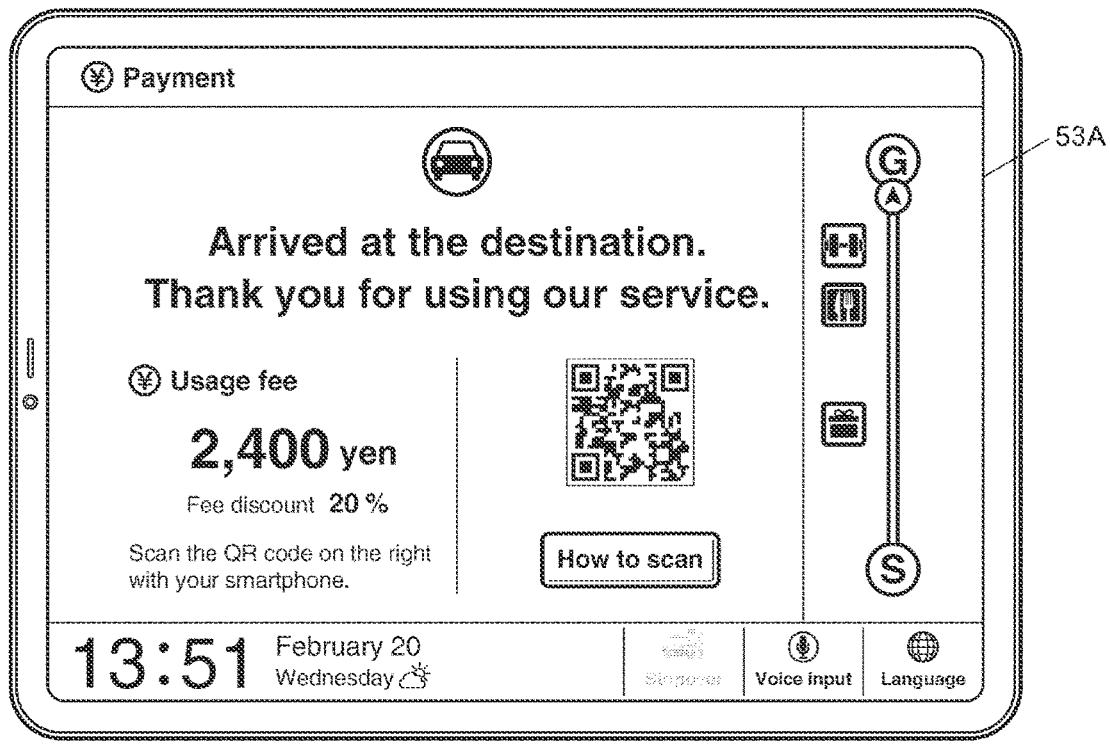
FIG. 5K is a diagram showing an example of a display screen of the vehicle system according to the third example.

FIG. 5K is a display screen that has transitioned from FIG. 5J as the vehicle has moved. In FIG. 5K, in the operation status display area, the vehicle symbol has reached the vehicle-exit point symbol. This means that the rental vehicle has arrived at the vehicle-exit point. In this case, in the advertisement content area, information that notifies the user of the terminal 20 of the fact that the vehicle has arrived at the vehicle-exit point, the discounted usage fee that is based on the fact that advertisements have been output while the user is travelling along "Route A" by the rental vehicle, and a payment code that is used to pay the usage fee, are displayed. In this example, a QR code (registered trademark), which is a type of two-dimensional code, is displayed as a payment code.

Figure 5L:
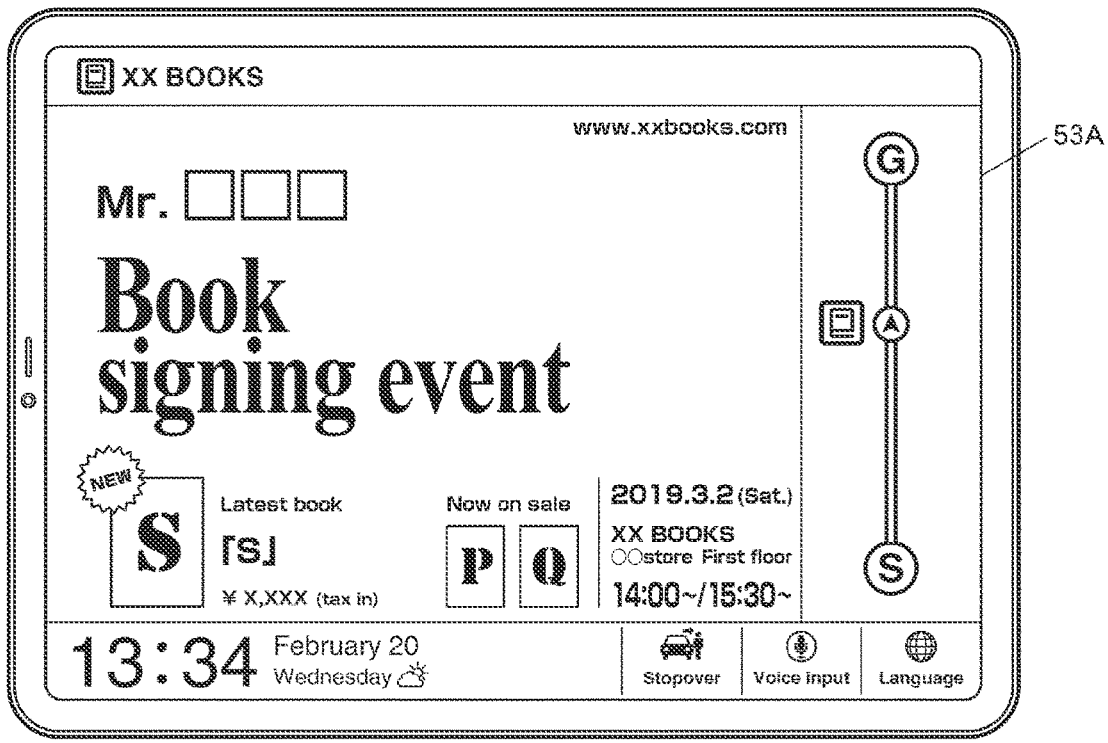
FIG. 5L is a diagram showing an example of a display screen of the vehicle system according to the third example.

FIG. 5L is a diagram showing an example of a screen displayed on the display 53A of the vehicle system 50 when the "Set this route" function icon in FIG. 5F is touched by the user of the terminal 20. In FIG. 5L, in the operation status display area, one advertisement symbol provided on the route "Route B" is displayed in association with the route connecting the vehicle-boarding point symbol and the vehicle-exit point symbol.

In FIG. 5L, in the operation status display area, the vehicle symbol has moved from the vehicle-boarding point symbol to the vehicle-exit point symbol, and has arrived at the position of the advertisement symbol associated with "XX BOOKS". The rental vehicle is in the advertisement area of "XX BOOKS". In this case, the advertisement title "XX BOOKS" is displayed in the advertisement title area, and an advertisement for a book signing event for celebrating the release of a new book, which is the content of an advertisement content file, is displayed in the advertisement content area.

Figure 5M:
FIG. 5M is a diagram showing an example of a display screen of the vehicle system according to the third example.

FIG. 5M is a display screen that has transitioned from FIG. 5L as the vehicle has moved. In FIG. 5M, in the operation status display area, the vehicle symbol has reached the vehicle-exit point symbol. This means that the rental vehicle has arrived at the vehicle-exit point. In this case, in the advertisement content area, information that notifies the user of the terminal 20 of the fact that the vehicle has arrived at the vehicle-exit point, the discounted usage fee that is based on the fact that an advertisement has been output while the user is travelling along "Route B" by the rental vehicle, and a payment code that is used to pay the usage fee, are displayed.

Processing

FIG. 7A is a flowchart showing an example of the flow of processing that is performed by the devices according to the present example.

FIG. 7A shows second advertisement proposal processing, which is an example of advertisement proposal processing executed by the advertisement proposal processor 112 of the server 10, second vehicle system main processing executed by the vehicle system main processor 511 of the vehicle system 50, and second terminal main processing B, which is an example of terminal main processing executed by the terminal main processor 211 of the terminal 20.

Note that the same steps as those in the above described flowchart are assigned the same reference numerals and redundant descriptions thereof will be omitted, and different steps will mainly be described.

Also, the flowcharts described below merely illustrate processing in the present example. In the flowcharts described below, some of the steps may be omitted, and an additional step may be inserted.

Also, the processing performed by the terminal 20 described below may be processing in which all of the steps are carried out by the rental car usage application and the payment application installed on the terminal 20, or processing in which some of the steps are carried out by the rental car usage application and the payment application. In addition, the processing does not necessarily have to be processing that is performed by the application installed on the terminal 20.

The flowchart in FIG. 7A is a flowchart formed by adding steps for selecting/setting a waypoint (for example, operations A3, A9, and B9 to B13) to the flowcharts in FIGS. 6H to 6J.

When the user selects the option to allow an advertisement to be output (operation B5: YES), the reservation application processor 212 transmits the reservation information and the regular usage fee received in operation B3, to the server 10 via the communication I/F 22 (operation B7). The reservation application processor 212 transmits waypoint setting request information that is used to set a waypoint, to the server 10 via the communication I/F 22 (operation B9).

Upon receiving the reservation information and the regular usage fee from the terminal 20 via the communication I/F 14 (operation A1), and receiving the waypoint setting request information from the terminal 20 via the communication I/F 14 (operation A3), in a non-limiting example, the advertisement proposal processor 112 determines a waypoint candidate with which the travel distance is longer than the shortest route connecting the vehicle-boarding point and the vehicle-exit point, but the travel route corresponds to more advertising areas of the advertisement management data, based on the reservation information received in operation A1 and the advertisement areas corresponding to the pieces of advertisement management data stored in the first advertisement management database 154A (operation A3).

The advertisement proposal processor 112 acquires, regarding the travel route that is based on the waypoint candidate set in A3, a set of advertisement IDs that includes at least one advertisement ID with which the total discount amount will be the maximum amount, by using dynamic programing, which is a non-limiting example, from the advertisement areas in the pieces of advertisement management data and the discount amounts with the advertisement area relevant flag "○" in the advertisement information table, stored in the first advertisement management database 154A (operation A5).

Based on the set of advertisement IDs acquired in operation A5 and the travel route that is based on the waypoint candidate set in operation A3, the advertisement proposal processor 112 calculates the total discount amount related to the waypoint candidate set in A3, with reference to the first advertisement management database 154A (operation A7). In this case, in a non-limiting example, the discount amount in the case where an advertisement is displayed when the vehicle travels along the travel route that is based on the waypoint candidate set in operation A3, and the waypoint candidate set in operation A3, are stored as a variable in the advertisement proposal processing program 151I.

Thereafter, the advertisement proposal processor 112 transmits the waypoint candidate and the discount amount calculated in operation A7 to the terminal 20 via the communication I/F 14 (operation A9).

The reservation application processor 212 receives the waypoint candidate and the discount amount from the server 10 via the communication I/F 22 (operation B11).

Note that, in this case, the reservation application processor 212 may optionally calculate an estimated required time regarding the travel route that is based on the waypoint candidate received in operation B11.

Next, the reservation application processor 212 displays the waypoint candidate and the discount amount received in operation B11 on the display 24, and displays confirmation information for confirming that the user agrees with the current waypoint (for example, a confirmation screen for checking whether or not the current waypoint candidate is problematic) (operation B13).

Note that the estimated required time for the travel route that is based on the waypoint candidate and the estimated required time that is based on the shortest travel route may optionally be displayed together.

If the terminal 20 or the server 10 determines that the user does not agree with the current waypoint candidate (operation B13: NO), the reservation application processor 212 transmits the waypoint setting request information to the advertisement proposal processor 112 again (operation B9). If this is the case, the advertisement proposal processor 112 sets a waypoint candidate that is different from the previous one (operation A3).

On the other hand, when the terminal 20 recognizes that the user selects the option to agree with the current waypoint candidate (operation B13: YES), the reservation application processor 212 sets the current waypoint candidate as the waypoint, and transmits the travel start information to the server 10 and the vehicle system 50 via the communication I/F 22 (operation B15).

Note that, in the above-described processing method, several sets of a waypoint candidate and a discount amount may optionally be acquired so that the user can select a set of a waypoint candidate and a discount amount from among the sets.

Upon receiving the travel start information from the terminal 20 via the communication I/F 14, the advertisement proposal processor 112 terminates the processing for selecting the waypoint candidate and the advertisement ID to be presented, and confirms the waypoint (operation A11).

Upon receiving the travel start information from the terminal 20 via the communication I/F 54 (operation C5), the advertisement providing processor 512 outputs (transmits) the travel route that is based on the received waypoint, to the route indicating unit 57 (operation C7). In this case, the route indicating unit 57 outputs (transmits) the aforementioned route and a departure instruction to the autonomous driving device 60.

The subsequent processing can be carried out in the same manner as in FIGS. 6I and 6J, and therefore a description thereof will be omitted.

Effects of Fourth Example

The fourth example shows a configuration with which the advertisement to be displayed on the display device of the vehicle is selected based on either one of first route selection information and second route selection information selected based on input from the user of the terminal 20.

One example of the effects that can be achieved with such a configuration is that an advertisement that is based on the route information selected from the first route information and the second route information, based on the input from the user of the terminal, is displayed on the display device of the vehicle. For example, by displaying an advertisement of a store that is present on the route along which the vehicle is to travel, on a display device of the vehicle, it is possible to advertise the store to users in the vehicle.

Also, in the fourth example, the terminal 20 performs processing to cause the vehicle system 50 to determine the travel route (a non-limiting example of processing related to travelling to the position or location related to the advertisement by using the vehicle) by transmitting information regarding a waypoint in the case where the vehicle travels to the position or location of the store of the advertiser of the advertisement (a non-limiting example of the position related to the advertisement) displayed on the display device of the vehicle, using the controller 21. The fourth example shows a configuration with which the terminal 20 thereafter receives information regarding the usage fee that is based on the above-described processing from the server 10 (a non-limiting example of an electronic device), via the communication I/F 22 (a non-limiting example of a communication interface of the terminal).

One example of the effects that can be achieved with such a configuration is that travel by a vehicle to a position or location related to an advertisement displayed on the display device of the vehicle can be realized through processing performed by the controller of the terminal. Therefore, user convenience can be improved. Also, it is possible to receive information regarding the usage fee that is based on the processing from an electronic device by using a terminal. Therefore, the user can check the received information by using their own terminal, which improves user convenience.

Also, the fourth example shows a configuration with which the usage fee is reduced based on the above-described processing, and the terminal 20 displays the discounted usage fee after the reduction (a non-limiting example of a first display).

One example of the effects that can be achieved with such a configuration is that the usage fee is discounted based on the fact that the controller has carried out the processing that is related to travel by the vehicle to the position related to the advertisement displayed on the display device of the vehicle, and therefore the financial burden on the user can be reduced. Also, the user can check the discounted usage fee on the terminal, and therefore user convenience can be improved.

Fourth Modification (1)

In the fourth example, the advertisement proposal processor 112 of the server 10 acquires, regarding the travel route that is based on the waypoint candidate set in operation A3, a set of advertisement IDs that includes at least one advertisement ID with which the total discount amount will be the maximum amount, by using the advertisement areas in the pieces of advertisement management data and the discount amounts with the advertisement area relevant flag in the advertisement information table, stored in the first advertisement management database 154A. However, the present embodiment is not limited thereto. In a non-limiting example, it is possible to calculate the total discount amount by using the sex of the user who has boarded the vehicle as additional information, to determine the advertisement ID.

Figure 7B:
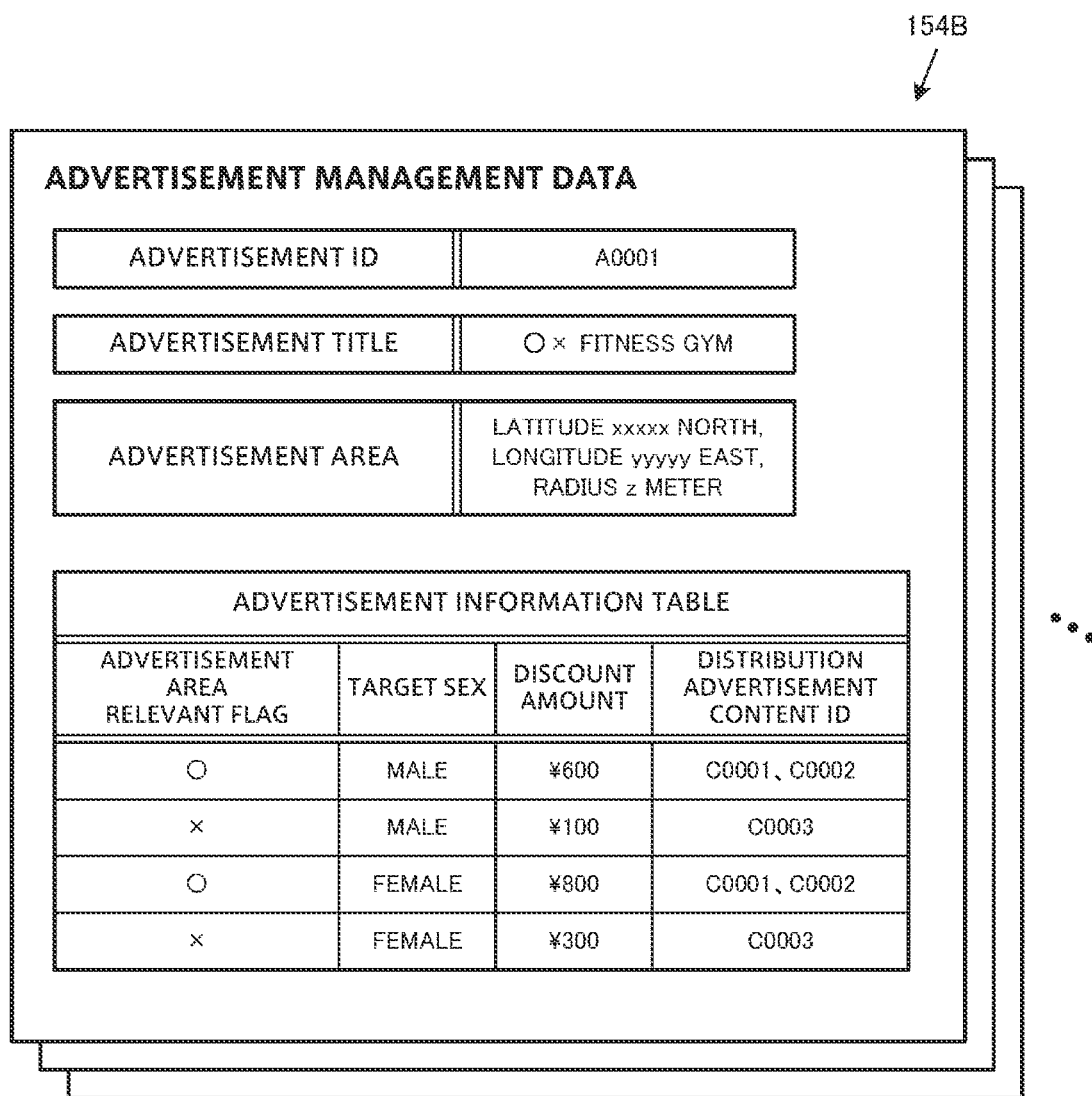
FIG. 7B is a diagram showing an example of an advertisement management database according to a fourth modification.

FIG. 7B illustrates a second advertisement management database 154B, which is an example of the advertisement management database 154.

In the second advertisement management database 154B, in a non-limiting example, the advertisement information table contains an advertisement area relevant flag, a target sex, a discount amount, and a distribution advertisement content ID in association with each other. Here, in a non-limiting example, the advertisement area relevant flag, the discount amount, and the distribution advertisement content ID may be the same as those in the first advertisement management database 154A.

The target sex is a condition for determining the advertisement ID according to the sex of the user of the terminal 20. The sex of the user of the terminal 20 is called from the user registration data 152 by using a user ID included in reservation information. In this case, the example of data in FIG. 7B shows an example in which, if an autonomous driving rental car that a user with the target sex "man (male)" has boarded passes through the advertisement area related to "∘× FITNESS GYM", and advertisement information defined by the advertisement content data 155 is output, the usage fee discount amount 600 yen will be accumulated. On the other hand, the example shows that, if an autonomous driving rental car that a user with the target sex "woman (female)" has boarded passes through the advertisement area related to "∘× FITNESS GYM", and advertisement information defined by the advertisement content data 155 is output, the usage fee discount amount 800 yen will be accumulated.

Note that an advertisement may optionally be selected based on information such as the age, the place of residence, the nationally, and so on of the user of the terminal 20 instead of, or in addition to, the sex of the user of the terminal 20.

Effects of Fourth Modification (1)

One example of the effects that can be achieved with the present modification is that the first route selection information and the second route selection information can be displayed in the display area of the terminal 20 based on information such as the sex, the age, the place of residence, the nationality, and so on (non-limiting examples of information regarding the user of the terminal) of the user of the terminal. Therefore, it is possible to allow the user to select a route with which an advertisement that is suitable for the user of the terminal will be displayed.

Fourth Modification (2)

In the fourth example, the terminal main processing performed by the terminal 20 is processing that is terminated at the vehicle-exit point when payment of the discounted usage fee is complete. However, the present embodiment is not limited thereto. For example, based on the advertisement information indicating that the vehicle-exit point is in an advertisement area, the user of the terminal 20 may enter a store after exiting the vehicle, and make a payment using the terminal 20, in a non-limiting example.

Figure 7C:
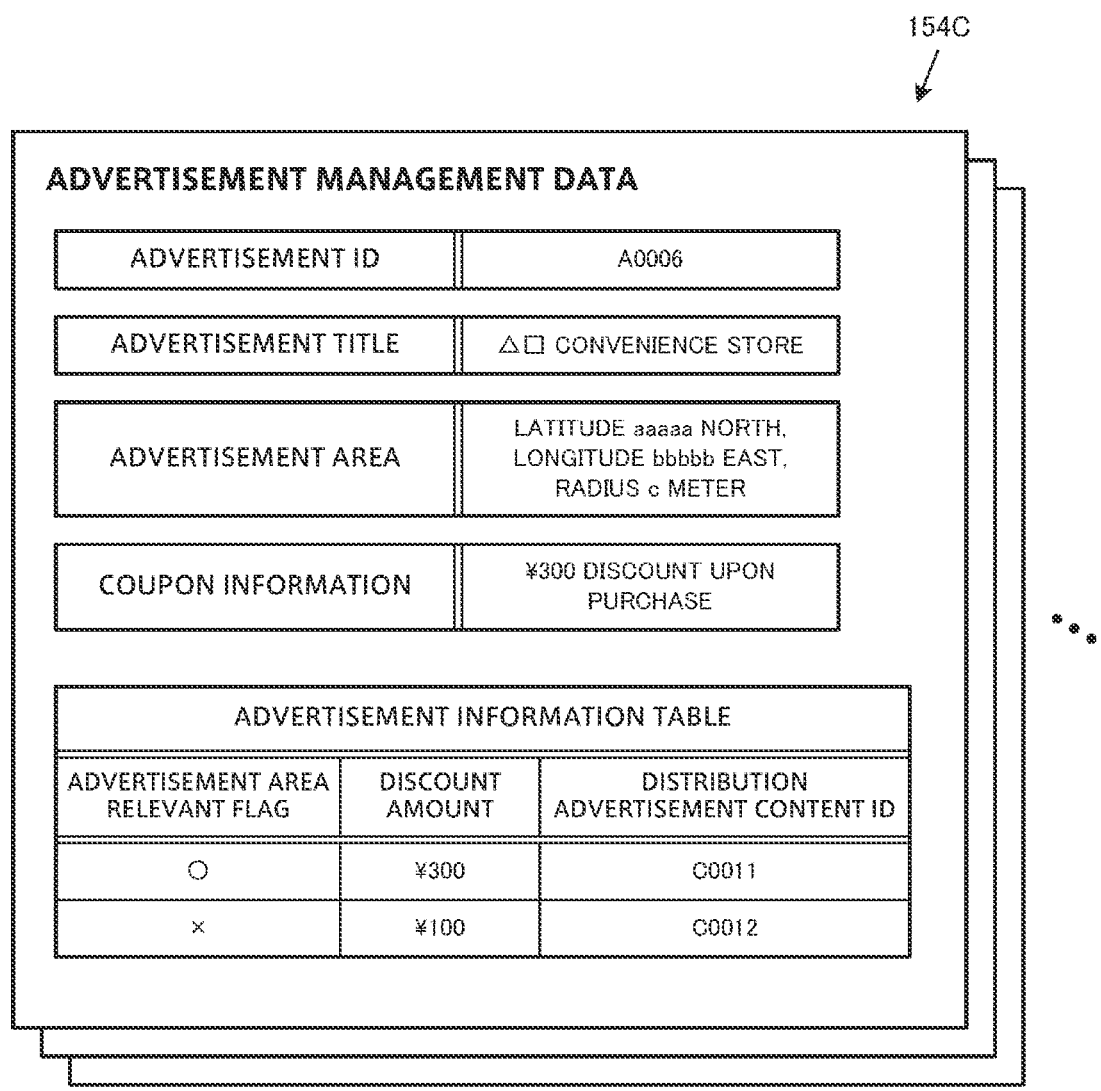
FIG. 7C is a diagram showing an example of an advertisement management database according to the fourth modification.

FIG. 7C illustrates a third advertisement management database 154C, which is an example of the advertisement management database 154.

In a non-limiting example, in the third advertisement management database 154C, each piece of management data contains the advertisement ID, the advertisement title, the advertisement area, coupon information, and an advertisement information table. Here, coupon information is information regarding the content of a coupon that is to be transmitted to the terminal 20. In a non-limiting example, the advertisement ID, the advertisement title, the advertisement area, and the advertisement information table may be the same as those in the first advertisement management database 154A.

Note that coupon information may optionally be added to every piece of advertisement management data.

Figure 7D:
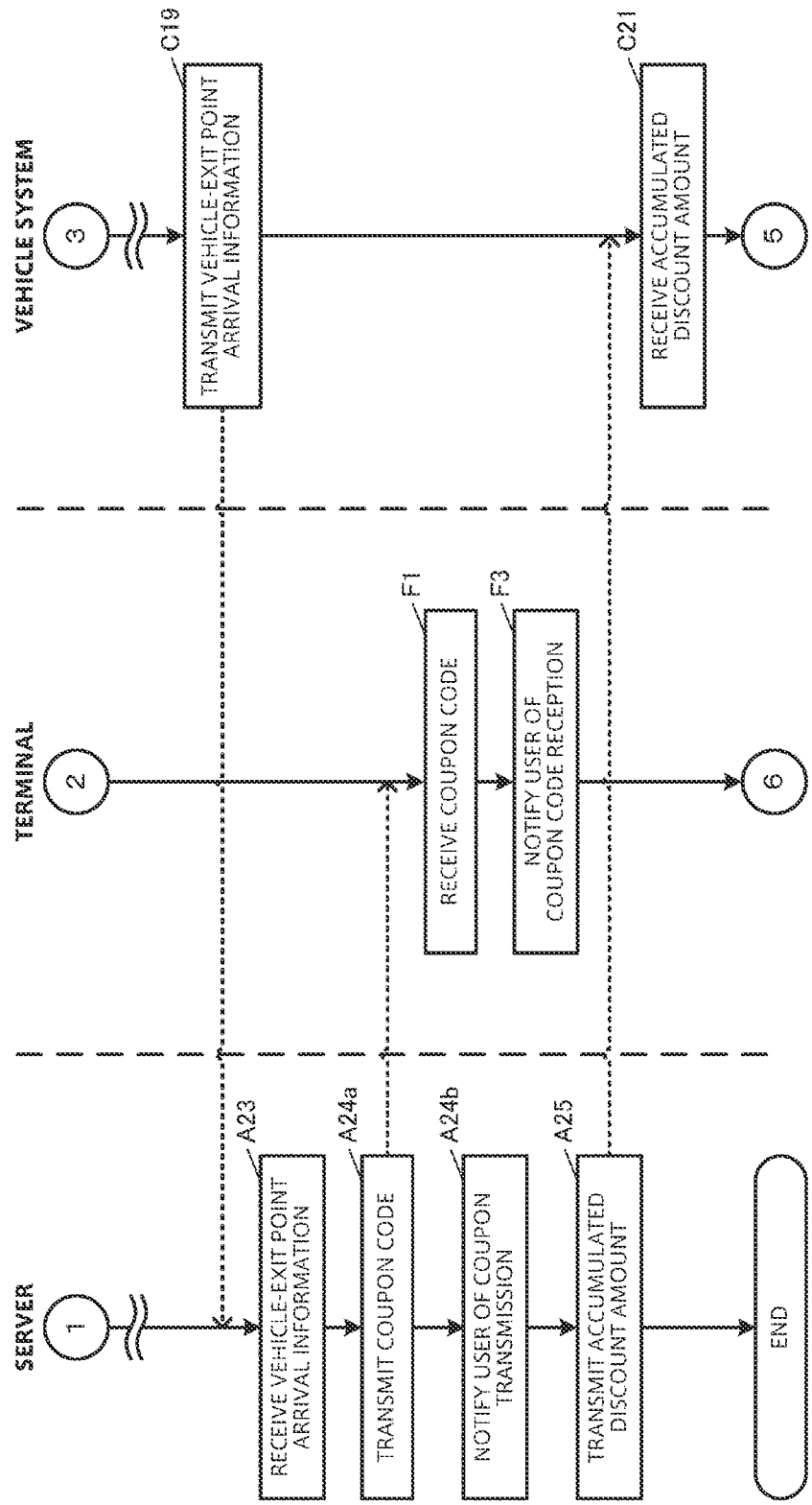
FIG. 7D is a flowchart showing an example of the flow of processing that is performed by devices according to the fourth modification.
Figure 7E:
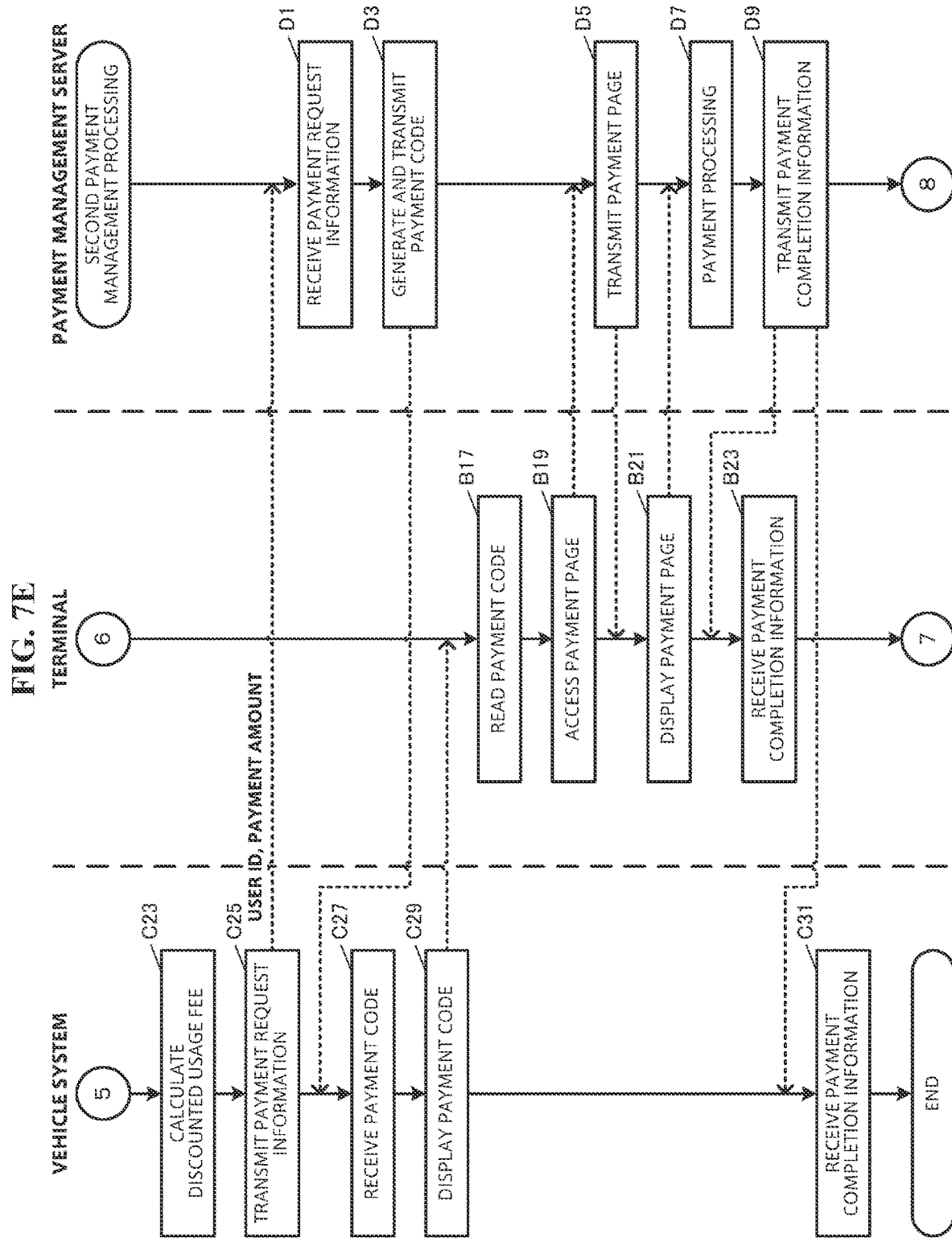
FIG. 7E is a flowchart showing an example of the flow of processing that is performed by devices according to the fourth modification.

FIGS. 7D to 7F are flowcharts showing an example of the flow of processing that is performed by the devices in such a case. Note that the same steps as those in the above described flowchart are assigned the same reference numerals and redundant descriptions thereof will be omitted, and different steps will mainly be described.

The flowcharts in FIGS. 7D to 7F are flowcharts formed by adding steps related to coupon information processing (for example, operations A24a and A24b, operations F1 to F5, step B17a, and operations D1a, D3a, and D9a) to the flowcharts in FIGS. 6I, 6J and 7A.

Upon receiving vehicle-exit point arrival information from the vehicle system 50 (operation A23), the advertisement proposal processor 112 of the server 10 acquires coupon information from the third advertisement management database 154C based on the advertisement ID acquired in operation A15.

Next, in a non-limiting example, the advertisement proposal processor 112 generates a coupon code that contains the advertisement ID, the coupon information, and the user ID acquired from the reservation information. Thereafter, the controller 11 transmits the generated coupon code to the terminal 20 via the communication I/F 14 (operation A24*a*). Also, in a non-limiting example, the advertisement proposal processor 112 notifies the user of the server 10 of the fact that the coupon (the coupon code) has been transmitted to the terminal 20 and the content of the coupon information, by display them on the display 53A, for example (operation A24*b*).

In a non-limiting example, upon receiving the coupon code from the server 10 via the communication I/F 22 (operation F1), the reservation application processor 212 of the terminal 20 displays a message indicating that the coupon (coupon code) has been received, on the display 24, for example, to notify the user of the terminal 20 (operation F3).

Thereafter, the terminal 20, the vehicle system 50, and the payment management server 40 perform payment of the usage fee.

After the usage fee has been paid and the user of the terminal 20 has exited the vehicle, the user of the terminal 20 enters the store that is based on the advertisement ID of the coupon code. Upon the user selecting the option to display the coupon by using the input/output interface 23 of the terminal 20, the reservation application processor 212 displays the coupon code on the display 24 (operation F5).

In this case, for example, a store point-of-sale (POS) system, which is a POS system installed in a store, reads the coupon code displayed on the display 24 of the terminal 20 by using a store code reader device (operation E1). Thereafter, the store POS system calculates the discounted total amount by subtracting the discount amount included in the coupon code from the total amount to be paid at the store (operation E3). Then, the store POS system transmits payment request information that includes the discounted total amount and the user ID to the payment management server 40 via a communication I/F (operation E5).

The controller 41 of the payment management server 40 receives the payment request information from the store POS system via the communication I/F 44 (operation D1*a*). Thereafter, the controller 41 generates a payment code that includes the URI (for example, the URL) of the payment page. The controller 41 transmits the generated payment code to the store POS system via the communication I/F 44 (operation D3*a*).

Upon receiving the payment code from the payment management server 40 via the communication I/F (operation E7), the store POS system displays the payment code on a display (operation E9).

The user of the terminal 20 reads the payment code displayed on the display of the store POS system by using an application code reader that is provided as a function of the payment application, or a code reader or the camera 27 provided as a function of the terminal 20 (operation B17*a*). In this case, the user accesses the payment page in operation B19 and the payment page is displayed in B21, and thus the amount to be paid at the store is displayed on the display 24 of the terminal 20.

The payment management server 40 performs payment processing (operation D7), and transmits payment completion information indicating that the payment is complete, to the terminal 20 and the store POS system (operation D9*a*).

Upon receiving the payment completion information from the payment management server 40 via the communication I/F, the store POS system displays information indicating that the payment of the discounted total amount is complete, on the display of the store POS system (operation Eli).

Note that, in the above-described example, the transmission of the coupon code and the display of the coupon at the store are not essential, and may or may not be performed.

Also, in the case where the user of the terminal 20 enters the store to buy a product or use a service as described above, the payment performed using the controller 21 of the terminal 20 (a first payment for a product or a service of a store at a position related to an advertisement) is not necessarily payment that is to be performed by the POS system of the store, and may optionally be payment that is to be performed by the POS system at the store and a BOT.

Effects of Fourth Modification (2)

In the present modification, the controller 21 of the terminal 20 performs processing for requesting payment (a non-limiting example of a first payment) for a product or a service of a store at a position related to an advertisement, to which the vehicle has travelled (a non-limiting example of processing related to a first payment for a product or a service of a store at a position related to an advertisement, to which the vehicle has travelled based on processing). The present modification shows a configuration with which the terminal 20 displays the amount to be paid, on the payment page.

One example of the effects that can be achieved with such a configuration is that processing related to the first payment for a product or a service of a store at a position related to an advertisement, to which the vehicle has travelled, is performed by the controller of the terminal, based on processing related to travelling, by the vehicle, to the position related to the advertisement displayed on the display device of the vehicle, and thus payment can be appropriately performed. The payment amount of the first payment is displayed in the display area of the terminal, based on the processing related to travelling, by the vehicle, to the position related to the advertisement displayed on the display device of the vehicle. Therefore, the user can check the payment amount of the first payment by using their own terminal.

In the present modification, the controller 21 of the terminal 20 performs processing for requesting payment (a non-limiting example of payment) for a product or a service of a store at a position related to an advertisement, to which the vehicle has travelled (a non-limiting example of processing related to payment related to a product or a service of a store at a position related to an advertisement, to which the vehicle has travelled based on processing). The present modification shows a configuration with which the terminal 20 receives a coupon code related to a store (a non-limiting example of coupon information regarding a store) based on processing for requesting payment, via the communication I/F 22.

One example of the effects that can be achieved with such a configuration is that processing related to the payment related to a product or a service of a store at a position related to an advertisement, to which the vehicle has travelled is performed by the controller of the terminal, based on processing related to travelling, by the vehicle, to the position related to the advertisement displayed on the display device of the vehicle, and thus payment can be appropriately performed. Also, the terminal 20 receives coupon information related to the store, via the communication I/F 22, based on processing related to travelling, by the vehicle, to a position related to an advertisement displayed on the display device of the vehicle. Therefore, the user can use the coupon information received by their own terminal 20 to buy a product or to be provided with a service at a store.

Fourth Modification (3)

In the fourth example, the discount amount is calculated for the advertisement content file transmitted from the server 10 to the vehicle system 50 and output by using any combination of the display 53A, the speaker 53C, and the vehicle environment adjustment unit 53E, regardless of whether the user of the terminal 20 has actually checked the content of the advertisement content file. However, the present embodiment is not limited thereto. For example, the discount amount may optionally be changed upon the terminal 20 being operated based on the content of the advertisement content file.

Figure 7G:
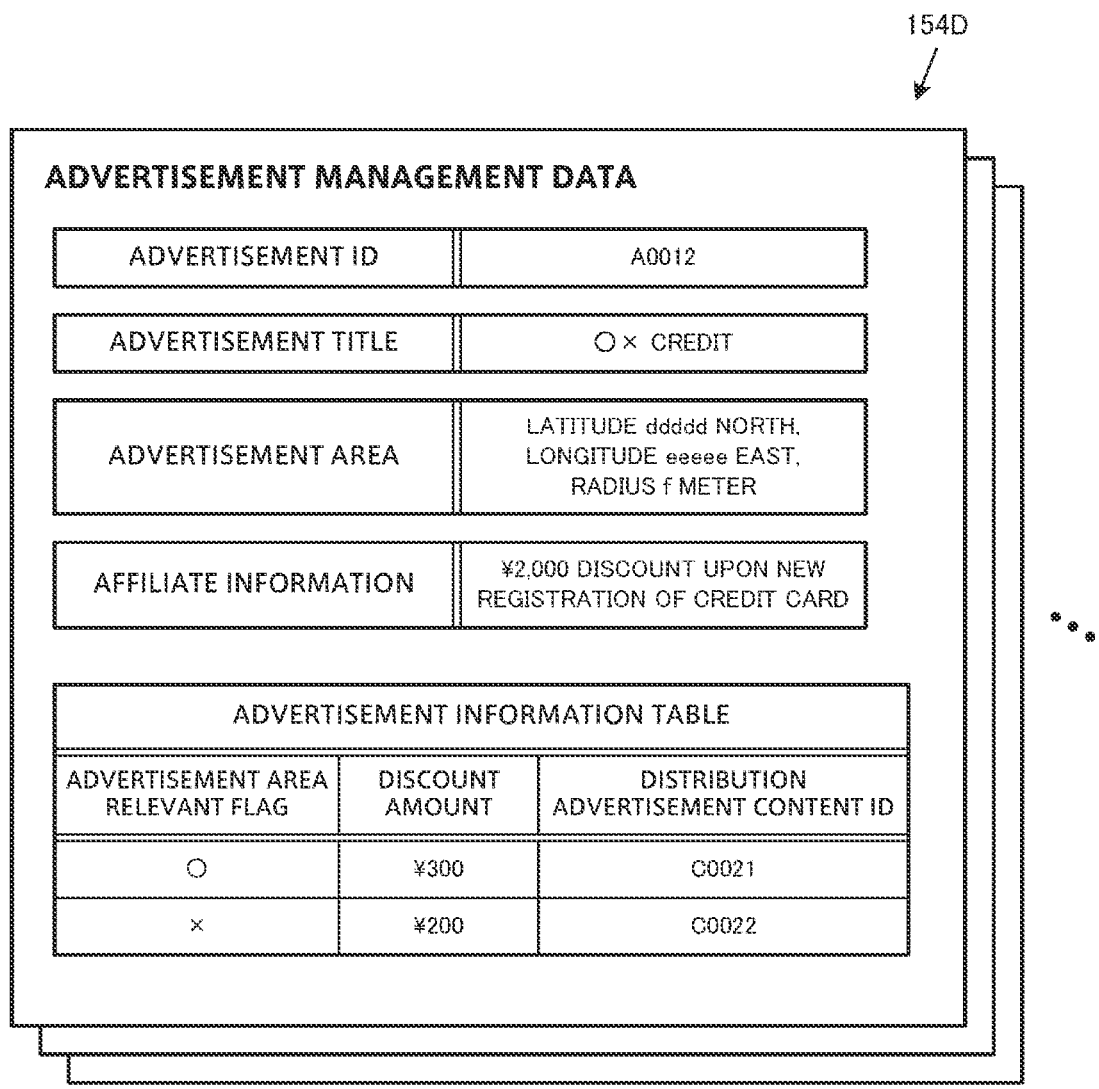
FIG. 7G is a diagram showing an example of the advertisement management database according to the fourth modification.

FIG. 7G illustrates a fourth advertisement management database 154D, which is an example of the advertisement management database 154.

In a non-limiting example, in the fourth advertisement management database 154D, each piece of management data contains the advertisement ID, the advertisement title, the advertisement area, affiliate information, and an advertisement information table.

Affiliate information contains a discount amount corresponding to the content of operation performed on the terminal 20, based on the advertisement to be output. In a non-limiting example, the advertisement ID, the advertisement title, the advertisement area, and the advertisement information table may be the same as those in the first advertisement management database 154A.

FIG. 7H is a flowchart showing an example of the flow of processing that is performed by the devices in such a case. Note that the same steps as those in the above described flowchart are assigned the same reference numerals and redundant descriptions thereof will be omitted, and different steps will mainly be described.

The flowchart in FIG. 7H is formed by rewriting the flowchart in FIG. 7D with steps related to affiliate information processing (for example, operations A24*d* to A24*f* and operations F7 to F11).

Upon receiving vehicle-exit point arrival information from the vehicle system 50 (operation A23), the advertisement proposal processor 112 of the server 10 acquires affiliate information from the fourth advertisement management database 154D based on the advertisement ID acquired in operation A15. Next, the advertisement proposal processor 112 transmits the affiliate information to the terminal 20 via the communication I/F 14 (operation A24*d*).

The reservation application processor 212 receives the affiliate information from the server 10 via the communication I/F 22 (operation F7). Thereafter, in a non-limiting example, the reservation application processor 212 causes the display 24 to display an image based on the affiliate information, and acquires an affiliate response to the image based on the affiliate information, input by using the input/output interface 23 (operation F9).

For example, with the fourth advertisement management database 154D, the reservation application processor 212 displays a new registration screen for registration of a credit card on the display 24, and acquires information required for new registration of a credit card, input by using the input/output interface 23.

The reservation application processor 212 transmits the affiliate response acquired in operation F9 to the server 10 via the communication I/F 22 (operation F11).

The advertisement proposal processor 112 of the server 10 receives the affiliate response from the terminal 20 via the communication I/F 14 (operation A24*e*). In this case, if the affiliate response satisfies content defined by the affiliate information, the advertisement proposal processor 112 cumulatively stores the discount amount stored in the affiliate information, to the variable in the advertisement proposal processing program 1511 (operation A24*f*).

On the other hand, if the affiliate response does not satisfy the content defined by the affiliate information, the cumulative discount amount is kept unchanged. That is to say, in operation A25, the discount amount based on the fact that the advertisement has been output in the vehicle system 50 and the discount amount that is based on the fact that a response has been made to the affiliate information by using the terminal 20 are subtracted from the regular usage fee.

Note that the transmission of the affiliate information and the transmission of the affiliate response are not necessarily performed after the server 10 has received the vehicle-exit point arrival information in operation A23. The server 10 may optionally transmit affiliate information to the terminal 20 upon the server 10 transmitting advertisement content data in operation A19. Also, the terminal 20 may optionally transmit an affiliate response to the server 10 before the server 10 receives vehicle-exit point arrival information in operation A23.

Effects of Fourth Modification (3)

In the present modification, the controller 21 of the terminal 20 acquires an affiliate response related to an advertisement displayed on the display device of a vehicle (a non-limiting example of an input related to an advertisement displayed on the display device). The modification shows a configuration with which the discount amount based on the fact that the advertisement has been output and the discount amount that is based on the fact that a response has been made to the affiliate information by using the terminal 20 are subtracted from the regular usage fee, and the discounted usage fee is displayed on the terminal 20.

One example of the effects that can be achieved with such a configuration is that input regarding the advertisement displayed on the display device is acquired by the controller of the terminal and the usage fee for the vehicle is reduced by the input related to the advertisement. Therefore, the user of the terminal can reduce the usage fee for the vehicle by performing input related to the advertisement displayed on the display device of the vehicle by using their own terminal. As a result, the financial burden on the user can be reduced. Also, the user can check the discounted usage fee by using their own terminal.

Fourth Modification (4)

In the fourth example, the rental vehicle passes through the waypoints without stopping, but, the present embodiment is not limited thereto. For example, the vehicle may optionally temporarily stop at a waypoint based on an advertisement displayed at the waypoint, and, in a non-limiting example, the user may optionally exit the vehicle on the way and enter a store or the like. Note that the usage fee may optionally be discounted when the vehicle temporarily stops at a waypoint.

Figure 7I:
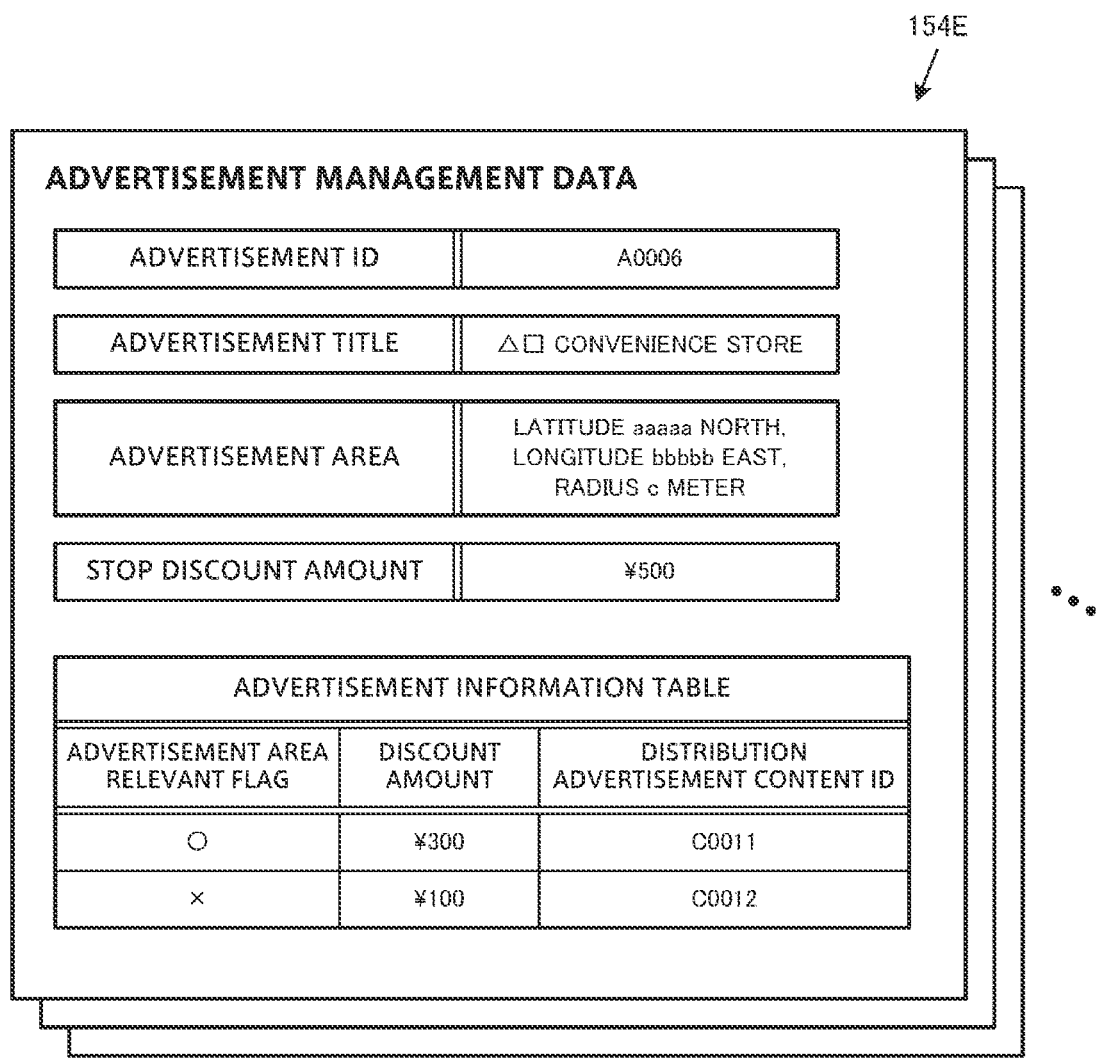
FIG. 7I is a diagram showing an example of the advertisement management database according to the fourth modification.

FIG. 7I illustrates a fifth advertisement management database 154E, which is an example of the advertisement management database 154.

In a non-limiting example, in the fifth advertisement management database 154E, each piece of management data contains the advertisement ID, the advertisement title, the advertisement area, a stop discount amount (also referred to as "a stopover discount amount"), and an advertisement information table.

A stop discount amount (or stopover discount amount") contains the usage fee discount amount in the case where the vehicle temporarily stops at a waypoint. In a non-limiting example, the advertisement ID, the advertisement title, the advertisement area, and the advertisement information table may be the same as those in the first advertisement management database 154A.

Figure 7J:
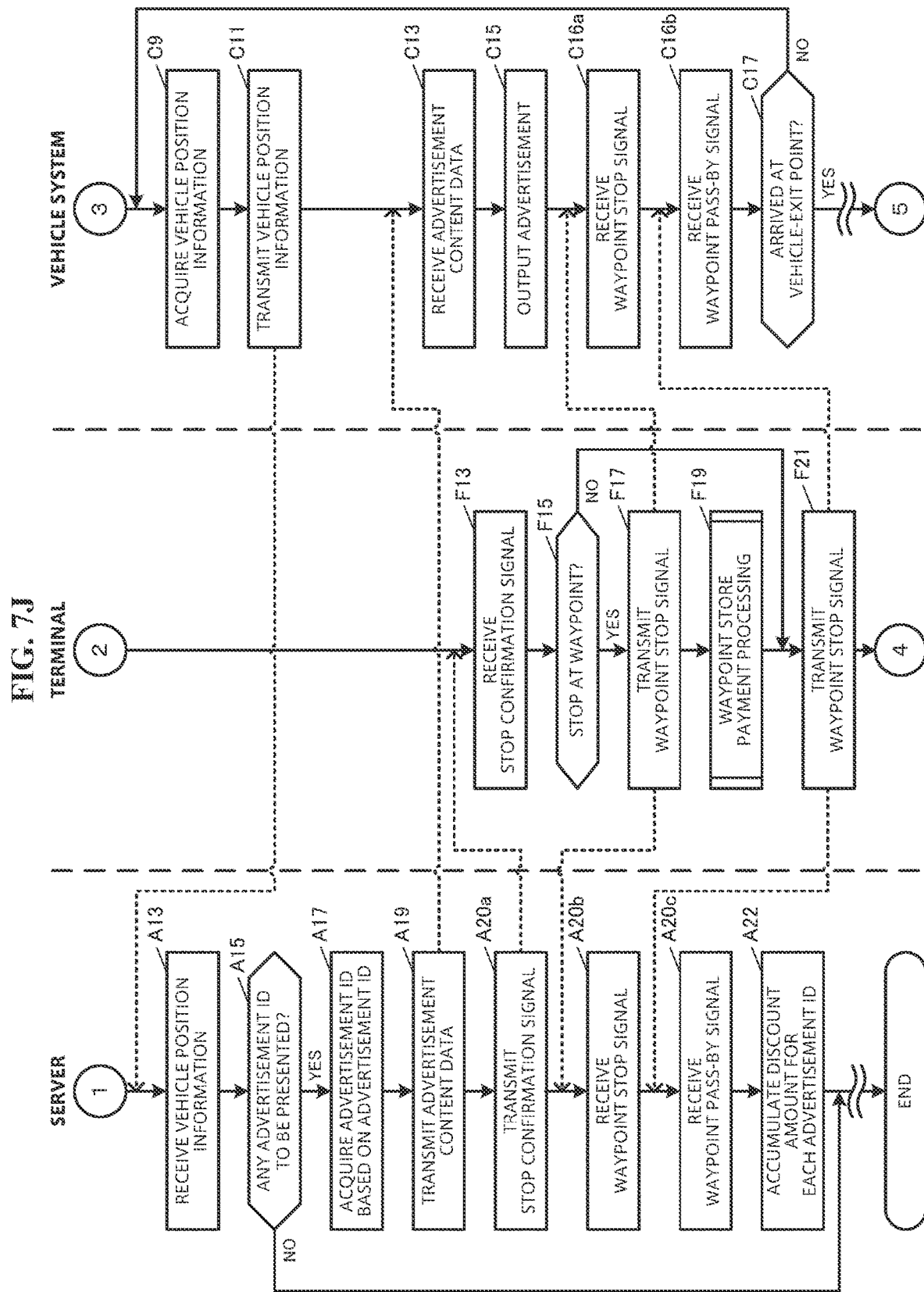
FIG. 7J is a flowchart showing an example of the flow of processing that is performed by devices according to the fourth modification.

FIG. 7J is a flowchart showing an example of the flow of processing that is performed by the devices in such a case. Note that the same steps as those in the above described flowchart are assigned the same reference numerals and redundant descriptions thereof will be omitted, and different steps will mainly be described.

The flowchart in FIG. 7J is a flowchart formed by adding steps related to a temporary stop at a waypoint (for example, operations A20a to A20c and A22, steps F13 to F21, and operations C16a and C16b) to the flowchart in FIG. 6I.

Upon transmitting advertisement content data to the vehicle system 50 via the communication I/F 14 (operation A19), the advertisement proposal processor 112 of the server 10 transmits a stop confirmation signal that requests the user to confirm whether or not to stop off at the current waypoint (or temporarily stop the vehicle at the current waypoint), to the terminal 20, via the communication I/F 14 (operation A20a).

The reservation application processor 212 of the terminal 20 receives the stop confirmation signal from the server 10 via the communication I/F 22 (operation F13). Thereafter, the reservation application processor 212 displays selection information regarding whether or not the user wishes to temporarily stop the rental vehicle at the current waypoint (for example, a selection screen on which the user can select whether or not to temporarily stop the rental vehicle) on the display 24 (operation F15).

If the user selects the option not to temporarily stop the vehicle (operation F15: NO), the reservation application processor 212 transmits a waypoint pass-by signal to the server 10 and the vehicle system 50 via the communication I/F 22 to pass by the current waypoint (operation F21).

On the other hand, if the user selects the option to stop off or temporarily stop (operation F15: YES), the reservation application processor 212 transmits a waypoint stop signal to the server 10 and the vehicle system 50 via the communication I/F 22 to apply or perform a setting to temporarily stop at the current waypoint (operation F17).

Upon receiving the waypoint stop signal from the terminal 20 via the communication I/F 14, the advertisement proposal processor 112 of the server 10 stores the stop discount amount (or stopover discount amount) stored in the fifth advertisement management database 154E as a variable in the advertisement proposal processing program 1511 (operation A20b).

Upon receiving the waypoint stop signal from the terminal 20 via the communication I/F 54, the advertisement providing processor 512 of the vehicle system 50 outputs (transmits) an instruction to temporarily stop at the current waypoint, to the route indicating unit 57 (operation C16a). In this case, the route indicating unit 57 outputs (transmits) a vehicle temporary stop instruction to the autonomous driving device 60.

When the user exits the vehicle and enters a store or the like after the vehicle has temporarily stopped, the reservation application processor 212 performs waypoint store payment processing according to a waypoint store payment processing program stored in the storage 28 (operation F19). Note that it is possible to proceed to operation F21 without performing operation F19.

FIG. 7K is a flowchart showing an example of the flow of processing that is performed by the devices in such a case, which includes waypoint store payment processing that is performed by the terminal 20. Note that the same steps as those in the above described flowchart are assigned the same reference numerals and redundant descriptions thereof will be omitted, and different steps will mainly be described.

The flowchart in FIG. 7K is formed by rewriting the flowchart in FIG. 7F with steps related to payment processing performed at a store at a waypoint (for example, operations E2 and E4 and operation B19b).

The store POS system calculates the total amount to be paid at the store (operation E2). Then, the store POS system transmits payment request information that includes the total payment amount to the payment management server 40 via a communication I/F (operation E4).

The payment application processor 213 of the terminal 20 accesses the payment page of the payment management server 40 based on the URI (for example, the URL) of the payment page included in the read payment code. Also, the payment application processor 213 transmits the user ID corresponding to the user of the terminal 20 stored in the reservation application 282 to the payment management server 40 via the communication I/F 22 (operation B19b).

In FIG. 7J again, upon performing the waypoint payment processing, the reservation application processor 212 transmits a waypoint pass-by signal (or a waypoint reset signal) to the server 10 and the vehicle system 50 via the communication I/F 22 in order to restart travelling from the current waypoint (operation F21).

The advertisement proposal processor 112 of the server 10 receives the waypoint pass-by signal from the terminal 20 via the communication I/F 14 (operation A20c). Thereafter, the advertisement proposal processor 112 references the advertisement information table in the advertisement management data, and cumulatively stores the discount amount corresponding to the advertisement area used in operation A17, and the stop discount amount (or stopover discount amount) stored in operation A20b as a variable in the advertisement proposal processing program 1511 (operation A22). Note that the stop discount amount (or stopover discount amount) is not accumulated when operation A20b is not performed.

Upon receiving the waypoint pass-by signal from the terminal 20 via the communication I/F 54, the advertisement providing processor 512 of the vehicle system 50 outputs (transmits) an instruction to restart travel from the current waypoint, to the route indicating unit 57 (operation C16b). In this case, the route indicating unit 57 outputs (transmits) a vehicle departure instruction to the autonomous driving device 60.

Note that the usage fee at the store may optionally be reduced through the waypoint store payment processing by combining this modification with the processing according to the fourth modification (2), and adding coupon information to the fifth advertisement management database 154E.

Effects of Fourth Modification (4)

In the present modification, the controller 21 of the terminal 20 acquires information for selecting a route in which the vehicle stops at a waypoint (a non-limiting example of a second position) that is different from a vehicle-exit point (a non-limiting example of a first position) that is the destination of the route on which the vehicle is to travel. The modification shows a configuration with which the discount amount based on the fact that the advertisement has been output and the stop discount amount (or stopover discount amount) that is based on the fact that the vehicle has stopped at a waypoint are subtracted from the regular usage fee, and the discounted usage fee is displayed on the terminal 20.

One example of the effects that can be achieved with such a configuration is that the controller of the terminal acquires the selection of a route in which the vehicle stops at a second point that is different from a first position that is the destination of the route on which the vehicle travels, and the usage fee for the vehicle is reduced based on the route of the selection. Therefore, the user of the terminal can reduce the usage fee for the vehicle by selecting a route on which the vehicle stops at the second position that is different from the first position that is the destination, using their own terminal. As a result, the financial burden on the user can be reduced. Also, the user can check the discounted usage fee by using their own terminal.

Also, in the present modification, the controller 21 of the terminal 20 performs processing for requesting payment (a non-limiting example of processing related to a second payment) for a product or a service at a store located at a waypoint (a non-limiting example of a store related to the second position). The present modification shows a configuration with which the amount to be paid at the stored located at the above-described waypoint is displayed on the display 24 of the terminal 20 based on the selection of the route.

One example of the effects that can be achieved with such a configuration is that the processing related to the second payment for a product or a service related to the second position is performed by the controller of the terminal. Therefore, payment related to the product or the service at the store related to the second position can be appropriately performed. Also, the display area of the terminal displays the payment amount of the second payment based on the selection of the route. Therefore, the user can check the payment amount of the second payment by using their own terminal.

Fourth Modification (5)

In the fourth example, the rental vehicle passes through the waypoints without stopping, but the present embodiment is not limited thereto. For example, the vehicle temporarily stops at a waypoint based on an advertisement displayed at the waypoint, and, in a non-limiting example, the user may optionally exit the vehicle on the way and enter a store or the like. The usage fee may be discounted as a result of the user assisting with work at the store or the like at which the user has entered.

Here, non-limiting examples of work assistance include helping delivery of a product (for example, flowers) related to a store (for example, a flower shop) at which the user has entered, and cleaning up and tidying up the store.

In this case, in a non-limiting example, when the user assists with work in the store or the like, the store owner provides a discount code on the code reader 56A of the vehicle system 50. Upon the discount code being read by the code reader 56A, the discount code is transmitted from the vehicle system 50 to the server 10, and the usage fee for the autonomous driving rental car is reduced.

In this case, in a non-limiting example, the discount amount and the discount rate regarding the usage fee may be set based on the content, effort, or the like regarding the work with which the user is to assist. Specifically, it is possible to set the discount amount and the discount rate to be larger the more the work is complicated, difficult, or the more it requires time and labor (a lot of effort). It is also possible to set the discount amount and the discount rate for each store.

Also, in order to assist with work at a store or the like, a waypoint with which a longer detour is formed may optionally be added and set.

Effects of Fourth Modification (5)

One example of the effects that can be achieved by the present modification is that the user who boards the vehicle can reduce the usage fee for the vehicle by assisting with work related to an advertisement displayed on the display device of the vehicle. Therefore, the financial burden on the user can be reduced.

Fifth Example

In the fifth example, as in the fourth example, the usage fee is discounted as a result of the user of the terminal 20 causing the output device of the vehicle system 50 provided in the autonomous driving rental car to output an advertisement that is based on advertisement information distributed from the server 10 when the user of the terminal 20 is in the autonomous driving rental car. When the user of the terminal 20 exits the vehicle at the vehicle-exit point, the user electronically pays the usage fee by using a payment application that is an application for electronic payment, started up and used in the terminal 20 of the user.

Also, in the fifth example, the discounted usage fee for the autonomous driving rental car is set based on an advertisement unit price associated with the advertisement content ID selected as the advertisement content ID of the advertisement to be output to the output device, and the advertisement unit price is set based on the state in which the advertisement is output from the output device.

The descriptions in the fifth example are applicable to any of the other examples.

Also note that the same constituent elements as the above-described constituent elements are assigned the same reference numerals, and redundant descriptions thereof will be omitted.

Functional Configuration (1) Functional Configuration of Server

Figure 8A:
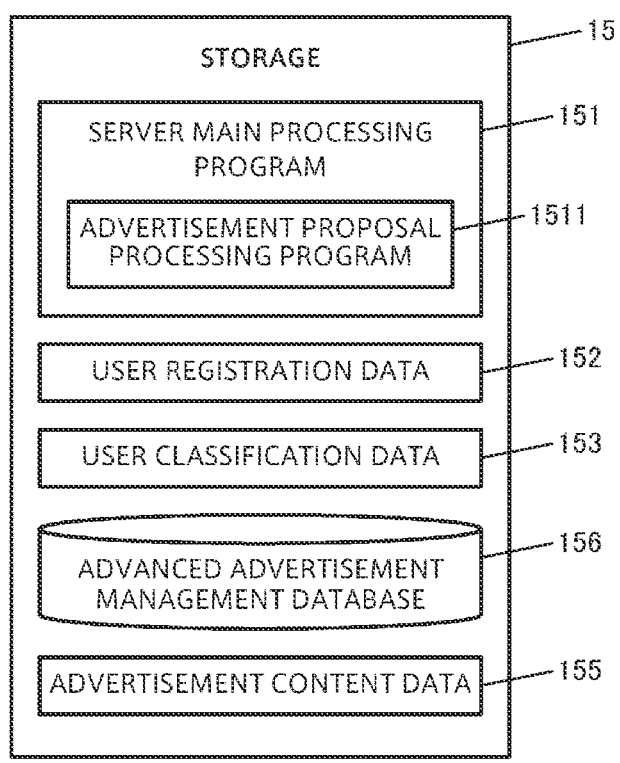
FIG. 8A is a diagram showing an example of information that is stored in a storage of a server according to a fifth example.

FIG. 8A is a diagram showing examples of information stored in the storage 15 of the server 10 according to the present example.

In a non-limiting example, the storage 15 stores user classification data 153 and an advanced advertisement management database 156 in addition to the server main processing program 151, the user registration data 152, and the advertisement content data 155.

The user classification data 153 is data for classifying a user into one of a plurality of categories (types/classifications) based on user registration information contained in the user registration data 152. An example of such a data structure is shown in FIG. 8B.

In a non-limiting example, the user classification data 153 contains a user classification ID, a target sex, a target age range, a target place of residence, and other target information in association with each other.

The user classification ID is an ID that serves as identification information for identifying the category into which the user is to be classified.

The target sex is the sex of the user that corresponds to a given user classification ID.

The age range is the range of the age of the user that corresponds to a given user classification ID. Note that the age range may optionally be divided into fixed ranges or any ranges. Alternatively, the target age range may optionally be a specific age.

The place of residence is the range of the place of residence of the user corresponding to a user classification ID. Note that the range of the place of residence may be a country, or a wide range of an area (a non-limiting example of which is a prefecture), or a narrower area (a non-limiting example of which is a city).

The other target information is the classification of the user corresponding to a user classification ID determined based on the other registration information in the user registration data 152, and one non-limiting example of which is classification by occupation.

Information regarding the user of the terminal 20 such as the sex, the age (the age range), place of residence, the occupation, and so on (user information) is information that indicates the situation in the vehicle, i.e. what attribute the user in the vehicle belongs to, when an advertisement is displayed on the display device of the vehicle. Therefore, these piece of user information (may also be referred to as attribute information) is a non-limiting example of information regarding the situation where the advertisement is displayed on the display device.

Note that, in a non-limiting example, information regarding the situation where an advertisement is displayed may be, in addition to the above-described user information, the position of the vehicle when the advertisement is displayed on the display device (a non-limiting example of positional information regarding the position of the vehicle), the time and time zone when the advertisement is displayed on the display device (non-limiting examples of information regarding the time), and information regarding the climate, the weather, or the like when the advertisement is displayed on the display device.

Also, in a non-limiting example, the above-described user information (user attribute information) may include, in addition to the information illustrated above, information regarding whether the user is married or unmarried.

For example, in the example of data in FIG. 8B, the user corresponding to the user classification ID "S0001" has "MALE" as the sex, "20 to 29" as the age, and "IN JAPAN" as the place of residence. That is to say, in the user registration data 152 illustrated in FIG. 3C, the user with the user name "B.B" corresponds to "S0001". Similarly, the user with the user name "A.A" corresponds to "S0004".

When determining a user classification ID, it may optionally be possible to define only some items selected from among the target sex, the target age range, the target place of residence, and other target information.

The advanced advertisement management database 156 is a database in which pieces of data for managing the advertisement content data to be distributed to the vehicle system 50 are cumulatively stored, and is a database formed by extending the advertisement management database 154. FIG. 8C shows an example of the data structure thereof. Here, a first advanced advertisement management database 156A, which is an example of the advanced advertisement management database 156, is illustrated.

The first advanced advertisement management database 156A contains advanced advertisement management data generated for each advertisement.

In a non-limiting example, each piece of advanced management data contains the advertisement ID, the advertisement title, the advertisement area, and the advertisement information table.

In a non-limiting example, the advertisement information table contains the target user classification ID, the advertisement area relevant flag, an advertisement unit price, and a distribution advertisement content ID in association with each other.

The target user classification ID is a condition for classification that is performed based on the user classification ID classified according to the user classification data 153 based on the user information of the terminal 20 that reserves the autonomous driving rental car. Note that the target user classification ID may define a single user classification ID, a plurality of user classification IDs, or no user classification ID.

The advertisement area application flag is a flag for classification that is based on the condition that the advertisement area overlaps the travel route of the autonomous driving rental car.

The advertisement unit price is, for example, an advertising fee paid by the advertiser to the business operator operating the server 10 for the advertisement to be output in the vehicle system 50. A non-limiting example of the advertisement unit price is the value of advertisement information.

Here, in a non-limiting example, the usage fee discount amount resulting from the advertisement being output may be calculated by multiplying the advertisement unit price by a predetermined coefficient (hereinafter referred to as a "discount coefficient"). In the following description, in order to simplify the description, the discount coefficient is invariably illustrated described as "0.5", which is a non-limiting example.

The distribution advertisement content ID is the advertisement content ID in the advertisement content data 155 to be distributed from the server 10 to the vehicle system 50. Note that the distribution advertisement content ID may contain one advertisement content ID or a plurality of advertisement content IDs.

For example, the example of data in FIG. 8C shows that, if the autonomous driving rental car that the user with the user name "B.B" corresponding to the user classification ID "S0001" boarded passes through the area with a radius of z meters centered around the point indicated by the latitude xxxxx north and the longitude yyyyy east, which is within the advertisement area related to "○x FITNESS GYM", and advertisement information defined by the advertisement content data 155 is output, the usage fee discount amount "700 yen x 0.5=350 yen" will be accumulated. In this case, the server 10 distributes the advertisement content corresponding to the content ID "C0001" and the advertisement content corresponding to the content ID "C0004" to the vehicle system 50 according to the advertisement proposal processing program 1511. Then, the advertisement unit price "700 yen" is accumulated for the advertisement ID "A0001".

If the autonomous driving rental car that the user with the user name "B.B" corresponding to the user classification ID "S0001" boarded does not pass through the advertisement area related to "○x FITNESS GYM" when travelling along the route, and outputs the advertisement information defined by the advertisement content data 155, the usage fee discount amount "300 yen x 0.5=150 yen" will be accumulated. In this case, the server 10 distributes the advertisement content corresponding to the content ID "C0003" to the vehicle system 50 according to the advertisement proposal processing program 1511. Then, the advertisement unit price "300 yen" is accumulated for the advertisement ID "A0001".

Also, for example, if an autonomous driving rental car that the user with the user name "A.A" corresponding to the user classification ID "S0004" boarded passes through the advertisement area related to "○× FITNESS GYM", and advertisement information defined by the advertisement content data 155 is output, the usage fee discount amount "200 yen×0.5=100 yen" will be accumulated. In this case, the server 10 distributes the advertisement content corresponding to the content ID "C0002" to the vehicle system 50 according to the advertisement proposal processing program 1511. Then, the advertisement unit price "200 yen" is accumulated for the advertisement ID "A0001".

In this example, even for advertisements with the same advertisement ID, a different advertisement unit price may be set based on the user information of the user in the autonomous driving rental car.

Here, the advertisement unit price is set in the advertisement information table. However, instead of the advertisement unit price, the usage fee discount amount may optionally be set. Alternatively, both the usage fee discount amount and the advertisement unit price may optionally be set.

Processing

FIG. 8D is a flowchart showing an example of the flow of processing that is performed by the devices according to the present example.

This figure shows third advertisement proposal processing, which is an example of advertisement proposal processing executed by the advertisement proposal processor 112 of the server 10, third vehicle system main processing executed by the vehicle system main processor 511 of the vehicle system 50, and third terminal main processing, which is an example of terminal main processing executed by the terminal main processor 211 of the terminal 20.

Note that the same steps as those in the above described flowchart are assigned the same reference numerals and redundant descriptions thereof will be omitted, and different steps will mainly be described.

Also, the flowcharts described below merely illustrate processing in the present example. In the flowcharts described below, some of the steps may be omitted, and an additional step may be inserted.

The flowchart in FIG. 8D is a flowchart formed by adding steps related to the determination of the advertisement ID that is based on the user classification ID (for example, operations A2, A6, and A8) to the flowchart in FIG. 7A.

The reservation application processor 212 transmits the reservation information and the regular usage fee received in operation B3, to the server 10 via the communication I/F 22 (operation B7). The advertisement proposal processor 112 of the server 10 receives the aforementioned reservation information and regular usage fee via the communication I/F 14 (operation A1).

In a non-limiting example, the advertisement proposal processor 112 acquires the sex, the age, and the place of residence of the user who made the reservation, from the user registration data 152, based on the user ID of the terminal 20 included in the reservation information. Thereafter, the advertisement proposal processor 112 makes a comparison with the user classification data 153, to determine the user classification ID of the user who made the reservation (operation A2).

Next, upon the advertisement proposal processor 112 setting a waypoint candidate (operation A3), the advertisement proposal processor 112 compares the advertisement area of each piece of advanced advertisement management data stored in the first advanced advertisement management database 156A and the waypoint candidate with each other by using the travel route based on the waypoint candidate set in operation A3 and the user classification ID of the user who made the reservation. The advertisement proposal processor 112 acquires a set of advertisement IDs that includes at least one advertisement ID with which the total discount amount will be the maximum amount, by using dynamic programming, which is a non-limiting example, from the discount amounts corresponding to the target user classification ID and the advertisement area relevant flag "○" in the advertisement information table (operation A6).

In a non-limiting example, regarding the calculation of the total of the advertisement unit prices, if the advertisement areas in advertisement management data overlap each other, it is possible to calculate the advertisement output duration for each advertisement ID based on the distribution advertisement content IDs stored in the advertisement information table in the advertisement management data and the advertisement output duration of each advertisement content ID stored in the advertisement content data 155, and calculate the total of the advertisement unit prices such that the total of the advertisement unit prices of a plurality of advertisement IDs will be the maximum amount within the range of the estimated time required to pass through the advertisement areas.

When there is no corresponding advertisement area on the travel route, it is possible to acquire a set that includes at least one advertisement ID so that the total of the advertisement unit prices will be the maximum amount, from the advertisement unit prices corresponding to the target user classification ID and having the advertisement area relevant flag "×" in the advertisement information table.

Note that the number of advertisement IDs acquired in operation A6 may optionally have an upper limit. Also, the total of the advertisement unit prices may optionally have an upper limit.

The above-described method for determining the advertisement IDs and the method for calculating the total of the advertisement unit prices are merely examples, and the present embodiment is not limited thereto.

Based on the set of advertisement IDs acquired in A6 and the travel route that is based on the waypoint candidate set in A3, the advertisement proposal processor 112 calculates the discount amount by multiplying the advertisement unit price for each advertisement ID by a discount coefficient, with reference to the first advanced advertisement management database 156A. Thereafter, the total of the discount amounts related to the waypoint candidate set in operation A3 is calculated (operation A8).

In this case, in a non-limiting example, the discount amount in the case where an advertisement is displayed when the vehicle travels along the travel route that is based on the waypoint candidate set in operation A3, and the waypoint candidate set in operation A3, are stored as a variable in the advertisement proposal processing program 1511. Also, the advertisement unit price for each advertisement ID is cumulatively stored as a variable in the advertisement proposal processing program 1511.

Note that, in the above-described processing, the discount amount in the fourth example is replaced with the value obtained by multiplying the advertisement unit price by the discount coefficient. Therefore, it can be said that the configuration of the fifth example is a configuration that can achieve the same effects as the fourth example.

Effects of Fifth Example

In the fifth example, the terminal 20 receives the advertisement content ID (a non-limiting example of advertisement information) corresponding to an advertisement displayed on the display device of a vehicle (a non-limiting example of a vehicle) and a discounted usage fee for the vehicle (a non-limiting example of information regarding the usage fee for the vehicle) that is based on user information (a non-limiting example of information regarding the situation where the advertisement is displayed on the display device) such as the sex, the age (the age range), the place of residence, and the occupation of the user who has boarded the vehicle in which the advertisement is displayed on the display device, from the server 10 via the communication I/F 22. The fifth example shows a configuration with which the terminal 20 displays display regarding payment that is based on the discounted usage fee (a non-limiting example of a first display) in an area (a non-limiting example of a display area of a terminal) on a display screen of the display 24.

One example of the effects that can be achieved with such a configuration is that the user of the terminal can acquire advertisement information displayed on the display device and information regarding the usage fee for the vehicle based on the situation where the advertisement is displayed on the display device, from an electronic device, by using their own terminal device. In addition, the first display that is based on information regarding the usage fee for the vehicle is displayed in the display area of the terminal, and therefore the user of the terminal can check the information regarding the usage fee for the vehicle by using their own terminal.

Also, the fifth example shows a configuration with which the advertisement content ID is set based on the above-described user information and the discounted usage fee is set based on the advertisement content ID.

One example of the effects that can be achieved with such a configuration is that the user of the terminal can acquire information regarding the usage fee for the vehicle based on advertisement information set based on the situation where the advertisement is displayed on the display device, from the electronic device, by using their own terminal. Also, the usage fee for the vehicle is set based on information regarding the set advertisement, and therefore the user of the terminal can use the vehicle by paying an optimized usage fee.

Also, the fifth example shows a configuration with which at least one advertisement content ID is selected from a plurality of advertisement content IDs based on the above-described user information, and the discounted usage fee is set based on the advertisement unit price (a non-limiting example of the value of advertisement information) associated with the selected advertisement content ID.

One example of the effects that can be achieved with such a configuration is that the user of the terminal can see an advertisement based on at least one piece of advertisement information selected from among a plurality of pieces of advertisement information based on the situation where the advertisement is displayed on the display device, in the vehicle. Also, the usage fee for the vehicle is set based on the selected advertisement information, and therefore the user of the terminal can use the vehicle by paying an optimized usage fee.

Also, the fifth example shows a configuration with which the above-described advertisement unit price is set based on the situation where the advertisement is displayed on the display device in the vehicle.

One example of the effects that can be achieved with such a configuration is that the value of advertisement information is optimized based on the situation where the advertisement is displayed on the display device, and therefore the user of the terminal can see the advertisement that is based on the optimized value of the advertisement information in the vehicle.

Here, by performing the above-descried processing by replacing the advertisement unit price described in the fifth example with the discount amount described in the fourth example, it is obviously possible to achieve the following effects as non-limiting examples.

For example, the fifth example shows a configuration with which the terminal 20 receives the advertisement content ID corresponding to the advertisement displayed on the display device in the vehicle provided with the display device, and the discounted usage fee that is based on the information regarding the position of the vehicle, from the server 10, via the communication I/F 22.

One example of the effects that can be achieved by such a configuration is that the user of the terminal can acquire information regarding the usage fee for the vehicle based on positional information regarding the position of the vehicle provided with the display device, from an electronic device, by using their own terminal device.

Also, for example, the fifth example shows a configuration with which a first advertisement unit price is set as the advertisement unit price when information regarding the position of the vehicle is positional information corresponding to a first destination, and a second advertisement unit price that is higher than the first advertisement unit price is set as the advertisement unit price when information regarding the position of the vehicle is positional information corresponding to a second destination.

One example of the effects that can be achieved with such a configuration is that a first value is set as advertisement information when information regarding the position of the vehicle provided with the display device is first positional information, and a second value that is higher than the first value is set as advertisement information when information regarding the position of the vehicle provided with the display device is second positional information. Therefore, the user of the terminal can see an advertisement to which a different value has been set depending on the positional information of the vehicle, in the vehicle.

Also, the fifth example shows a configuration with which information regarding the position of the vehicle contains information regarding the position to which the vehicle has moved or information regarding the position to which the vehicle is scheduled to move.

One example of the effects that can be achieved with such a configuration is that the user of the vehicle can see an advertisement to which a different value has been set depending on information regarding a position to which the vehicle has moved, or information regarding a position to which the vehicle is scheduled to move, in the vehicle.

Also, the fifth example shows a configuration with which information regarding the position of the vehicle contains information regarding a travel route (a route) through which the vehicle has travelled or information regarding a travel route thorough which the vehicle is scheduled to travel.

One example of the effects that can be achieved with such a configuration is that the user of the vehicle can see an advertisement to which a different value has been set depending on information regarding a route through which the vehicle has traveled, or information regarding a route through which the vehicle is scheduled to travel, in the vehicle.

Also, in the fifth example, the terminal 20 displays a travel route selection screen (a display 24 of the second display) that includes at least first travel route information regarding a travel route through which the vehicle is scheduled to travel (a non-limiting example of first route information) and second travel route information regarding a travel route through which the vehicle is scheduled to travel (a non-limiting example of second route information) on the display 24. The fifth example shows an example with which the information regarding the position of the vehicle is based on information regarding whether the user selects the first travel route information or the second travel route information, input from the input/output interface 23 by the user of the terminal 20.

One example of the effects that can be achieved with such a configuration is that a second display that includes at least first route information regarding a route through which the vehicle is scheduled to travel and second route information regarding a route through which the vehicle is scheduled to travel in the display area of the terminal, and therefore the user can check a plurality of route candidates through which the vehicle is scheduled to travel, by using their own terminal. Also, positional information regarding the position of the vehicle that is provided with the display device is appropriately determined based on input from the terminal of the user and at least one of the first route information and the second route information.

Also, the fifth example shows a configuration with which a first usage fee that is based on the first travel route information and a second usage fee that is based on the second travel route information are displayed on the above-described travel route selection screen.

One example of the effects that can be achieved with such a configuration is that the first usage fee that is based on the first route information and the second usage fee that is based on the second route information are displayed as the second display, and therefore the user of the terminal can check usage fees that are based on a plurality of pieces of route information by using their own terminal.

Also, the fifth example shows a configuration with which the first travel route information includes a position of a store for which the advertisement unit price is higher than any position included in the second travel route information (a non-limiting example of a position for which the value of advertisement information is higher) and the first usage fee is lower than the second usage fee.

One example of the effects that can be achieved with such a configuration is that the first travel route information includes a position for which the value of advertisement information is higher than any position included in the second travel route information, and therefore it is possible to enhance advertising effectiveness by displaying an advertisement with a higher value on the display device of the vehicle. Also, the first usage fee that is based on the first route information is lower than the second usage fee that is based on the second route information, and it is possible to reduce the usage fee for the vehicle by selecting route information with higher advertising effectiveness. Therefore, the financial burden on the user can be reduced.

Also, the fifth example shows a configuration with which the first travel route information and the second travel route information are travel route information for which the destination/vehicle-exit point (a non-limiting example of a destination) is the same, and the first travel route information indicates a longer distance to the destination/vehicle-exit point or a longer time required for the vehicle to reach the destination/vehicle-exit point than the second travel route information.

One example of the effects that can be achieved with such a configuration is that the first route information and the second route information are route information regarding the same destination, and therefore the user of the terminal can select different routes for the same destination. Also, the first route information indicates a longer distance to the destination, or a longer time required for the vehicle to reach the destination, than the second route information. Therefore, in combination with the above configuration, the user of the terminal can use a vehicle for which the usage fee is set based on an idea different from the general vehicle usage fee setting, i.e., the usage fee is lower for a route for which the distance to the destination, or the time required to reach the destination, is longer.

Also, the fifth example shows a configuration with which the terminal 20 receives information regarding the discounted usage fee for the vehicle based on advertisement information displayed on the display device of the vehicle and the user information of the user of the terminal 20 who boards the vehicle, from the server 10 via the communication I/F 22.

One example of the effects that can be achieved with such a configuration is that the situation where an advertisement is displayed on the display device includes information regarding the user of the terminal who boards the vehicle. Therefore, the user of the terminal can use a vehicle for which the usage fee is set based on information regarding the user.

Also, in the fifth example, the server 10 (a non-limiting example of an electronic device) acquires the advertisement content ID (a non-limiting example of advertisement information displayed on the display device) corresponding to an advertisement displayed on the display device of a vehicle (a non-limiting example of a vehicle) and user information (a non-limiting example of information regarding the situation where the advertisement is displayed on the display device) such as the sex, the age (the age range), the place of residence, and the occupation of the user who boards the vehicle in which the advertisement is displayed on the display device. The fifth example shows a configuration with which the server 10 transmits a discounted usage fee for the vehicle (a non-limiting example of information regarding the usage fee for the vehicle) to a terminal 20 that is different from the display device, based on the acquired advertisement content ID and the acquired user information, via the communication I/F 14.

One example of the effects that can be achieved with such a configuration is that, by transmitting information regarding the usage fee for the vehicle to a terminal that is different from the display device, based on information regarding the acquired advertisement and the situation where the acquired advertisement is displayed on the display device, the electronic device can make a notification to the user of the terminal of the usage fee for the vehicle.

Fifth Modification (1)

It is possible to perform the same processing as in the fifth example by using a normal rental vehicle that is not provided with the autonomous driving device instead of the autonomous driving rental vehicle as described in the first example and the second example.

In such a case, the type of the advertisement and the advertisement unit price of the advertisement to be displayed on a display 93 of the vehicle display device 90 provided in a normal rental vehicle may also be set by using the same method as in the fifth example.

Fifth Modification (2)

In the fifth example, the user classification ID is determined based on the user ID of the terminal 20 included in the reservation information, but the present embodiment is not limited thereto.

Specifically, an image of the user getting in the vehicle is captured using the camera 53D of the vehicle system 50, for example. Thereafter, in a non-limiting example, the user classification ID may optionally be determined by estimating information such as the age, the sex, and so on of the user based on the acquired image.

Also, the user's voice is acquired by using the microphone 53B of the vehicle system 50. Thereafter, in a non-limiting example, the user classification ID may optionally be determined by estimating information such as the age, the sex, the place of residence, and so on of the user based on the acquired voice.

Also, in a non-limiting example, the user classification ID may optionally be determined by estimating information such as the age, the sex, the place of residence, and so on of the user based on the combination of the image acquired from the camera 53D and the voice acquired from the microphone 53B.

Effects of Fifth Modification (2)

One example of the effects that can be achieved by the present modification is that it is easy to acquire user information based on information output from an image capturing device and a sound collection device.

Fifth Modification (3)

In the fifth example, the user classification ID is determined by using one user of the terminal 20 who uses the reservation application. However, the present embodiment is not limited to such a modification.

For example, when the user of the terminal 20 makes a reservation by using the reservation application, if there are a plurality of passengers in the vehicle, it is possible to determine the user classification ID based on user information regarding the plurality of passengers by acquiring user information regarding the plurality of passengers upon the user inputting the age and the sex of each passenger, in a non-limiting example.

In this case, in a non-limiting example, a configuration may be employed where the user classification data 153 does not include the target sex, the target age range, or the target place of residence as a condition. In a non-limiting example, a new user classification ID such as "S0001 and S0002 are in the same vehicle" may optionally be defined as the other target information.

Note that, after the user boards the autonomous driving rental car, the user classification ID may optionally be determined by estimating the age, the sex, and the place of residence of each of the plurality of passengers, in a non-limiting example, by using at least one of the camera 53D and the microphone 53B of the vehicle system 50.

In a non-limiting example, even if the user of the terminal 20 who uses the reservation application is an adult, if a child is detected by the camera 53D, for example, a user classification ID associated with a parent and child may be set so that an advertisement ID including advertisement content for adults such as alcohol and tobacco will not be selected.

Effects of Fifth Modification (3)

The present modification shows a configuration with which the advertisement to be displayed on the display device of the vehicle is selected based on information regarding a user in the vehicle other than the user of the terminal 20.

One example of the effects that can be achieved with such a configuration is that it is possible to make the user use a vehicle in which an advertisement that matches the demand of a user in the vehicle, other than the user of the terminal, is displayed.

Also, the present modification shows a configuration with which, regarding the advertisement to be displayed on the display device of the vehicle, the advertisement unit price is set based on information regarding a user in the vehicle other than the user of the terminal 20.

One example of the effects that can be achieved with such a configuration is that it is possible to make the user use a vehicle in which the value of the advertisement is set based on information regarding the user in the vehicle other than the user of the terminal.

Also, the user need only pay a usage fee discounted based on the above-described advertisement information, and therefore, the financial burden on the user of the terminal can be reduced.

Fifth Modification (4)

In the fifth example, the advertisement proposal processor 112 of the server 10 acquires a set that includes at least one advertisement ID so that the total of the advertisement unit prices will be the maximum amount, based on the target user classification ID and the advertisement area relevant flag in the advertisement information table, in the first advanced advertisement management database 156A, by using the travel route that is based on the waypoint candidate set in operation A3 and the user classification ID of the user who made a reservation. However, the present embodiment is not limited to such an example. For example, the advertisement proposal processor 112 may also be able to determine the advertisement ID by using information regarding time slots in which the autonomous driving rental car operates.

FIG. 8E illustrates a second advanced advertisement management database 156B, which is an example of the advanced advertisement management database 156.

In the second advanced advertisement management database 156B, a non-limiting example of the advertisement information table contains the target user classification ID, the advertisement area relevant flag, an advertisement output time slot, an advertisement unit price, and a distribution advertisement content ID in association with each other. Here, in a non-limiting example, the target user classification ID, the advertisement area relevant flag, the advertisement unit price, and the distribution advertisement content ID may be the same as those in the first advanced advertisement management database 156A.

The advertisement output time slot is a condition for determining the advertisement ID according to the time slot in which the advertisement providing processor 512 of the vehicle system 50 outputs an advertisement.

The advertisement output time slot is a time slot in which an advertisement is output in the vehicle. This is an example of information regarding the situation where the advertisement is displayed on the display device.

In this case, the example of data in FIG. 8E shows an example in which, if an autonomous driving rental car that a user with the target user classification ID "S0001" boarded passes through the advertisement area related to "∘× FITNESS GYM", and advertisement information defined by the advertisement content data 155 is output, the advertisement unit price "600 yen" will be accumulated as the advertising fee for the advertisement ID "A0001" when the time slot in which the autonomous driving rental car passes through the advertisement area is "7:00 to 17:00", and the advertisement unit price "1000 yen" will be accumulated when the time slot is "17:00 to 21:00", and the advertisement unit price "400 yen" will be accumulated when the time slot is "21:00 to 7:00".

In this modification, different advertisement unit prices can be set to an advertisement with the same advertisement ID depending on the time slot in which the advertisement is output.

Also, in the example of data in FIG. 8E, the advertisement unit price is set to be the highest in a time slot from evening (for example, 17:00) to a time before the midnight (for example, before 21:00) in which the number of users of the "○× FITNESS GYM" is the largest, and the advertisement unit price is set to be the lowest in a time slot from midnight (for example, 21:00) to early morning (for example, 7:00) in which the number of users is the smallest.

Here, the start time and the end time of each time slot are merely examples, and are not limited to these examples. For example, the midnight time slot may optionally be "22:00 to 5:00 the next day", and the advertisement unit price may optionally be set to be the lowest in this midnight time slot.

This means that, when the time slot (a non-limiting example of information regarding a time) in which an advertisement that is based on advertisement information is displayed on the display device of the vehicle is a time slot from midnight to early morning (a non-limiting example of a first time slot), a first advertisement unit price (a non-limiting example of a first value) is set, and when the time slot in which an advertisement is displayed on the display device of the vehicle is a time slot from evening to a time before midnight (a non-limiting example of a second time slot), a second advertisement unit price that is higher than the first advertisement unit price (a non-limiting example of a second value that is higher than the first value) is set. A time slot from midnight to early morning means a time slot later than the time slot from evening to a time before midnight (a late night time slot, a midnight time slot).

In a non-limiting example, regarding the daytime when the number of users is smaller than that in the time slot from evening to a time before midnight and is greater than the time slot from midnight to early morning, the advertisement unit price is set to be an intermediate price between the unit prices for these time slots.

Note that, when setting and calculating the advertisement unit price, it is possible to use the time at which the user of the terminal 20 makes a reservation by using the reservation application, instead of the time at which the autonomous driving rental car passes through the advertisement area. Alternatively, the time at which the user of the terminal 20 pays the usage fee may be used.

The advertisement output time slot is not limited to a period between a time and another time. In a non-limiting example, as an advertisement output time slot, delimiters may optionally be set in units of information regarding at least one of a date, the day of the week, a month, and a year (information regarding a time). For example, a different discount amount may be set to Monday to Friday and Saturday to Sunday.

Note that the advertisement output time slot may be set by combining a time and another delimiter defined in the unit of time. In a non-limiting example, the advertisement output time slot may optionally be set by combining a time and the day of the week. For example, in the case of an advertisement for an Izakaya chain store, the advertisement proposal processor 112 may be set so as not to explicitly select an advertisement ID by setting the advertisement unit price to be "0 yen" for a time slot from midnight to early morning from Sunday to Thursday, in which advertising effectiveness is low.

Effects of Fifth Modification (4)

The present modification shows a configuration with which information regarding the situation where an advertisement is displayed on the display device of the vehicle includes information regarding a time slot in which the advertisement is displayed on the display device of the vehicle (a non-limiting example of information regarding the time when the advertisement that is based on advertisement information is displayed on the display device).

One example of the effects that can be achieved by such a configuration is that information regarding the situation where an advertisement is displayed on the display device includes time information regarding a time at which the advertisement is displayed on the display device. Therefore, the user of the terminal can use a vehicle for which the fee is set based on information regarding the time at which an advertisement that is based on advertisement information is displayed on the display device.

Also, the present modification shows a configuration in which, when the time slot in which an advertisement is displayed on the display device of the vehicle is a time slot from midnight to early morning (a non-limiting example of a first time slot), a first advertisement unit price (a non-limiting example of a first value) is set as an advertisement unit price, and when the time slot is a time slot from evening to a time before midnight (a non-limiting example of a second time slot), a second advertisement unit price that is higher than the first advertisement unit price (a non-limiting example of a second value that is higher than the first value) is set.

One example of the effects that can be achieved by such a configuration is that, to advertisement information, a first value is set when the time information indicates a first time slot, and a second value that is higher than the first value is set when the time information indicates a second time slot. Therefore, the user of the terminal can see an advertisement to which a different value has been set depending on the information regarding the time, in the vehicle.

Also, the present modification shows a configuration with which a time slot from midnight to early morning includes a time slot later than the time slot from evening to a time before midnight (a late night time slot, a midnight time slot).

One example of the effects that can be achieved with such a configuration is that the first time slot includes a time slot that is later than the second time slot. Therefore, it is possible to set the value of advertisement information to be lower in a later time slot, in combination with the above-described configuration.

Also, the present modification shows a configuration in which the value of advertisement information is set based on information regarding at least one of a date, the day of the week, a month, and a year (information regarding a time).

One example of the effects that can be achieved with such a configuration is that the user of the terminal can see an advertisement to which a different value has been set depending on information regarding at least one of a date, the day of the week, a month, and a year, in the vehicle.

Also, with the configuration of the present modification, for example, the user of the terminal can check the first route information regarding a route through which the vehicle can travel, and the second route information regarding a route through which the vehicle can travel, based on the second display, by using their own terminal.

Also, with the configuration of the present modification, for example, the user of the terminal can check the first usage fee that is based on the first route information and the second usage fee that is based on the second route information, by using their own terminal.

Also, with the configuration according to the present modification, for example, the first route information includes a position for which the value of advertisement information is higher than any position included in the second travel route information, and therefore it is possible to enhance advertising effectiveness by displaying an advertisement with a higher value on the display device of the vehicle. Also, the first usage fee that is based on the first route information is lower than the second usage fee that is based on the second route information, and it is possible to reduce the usage fee for the vehicle by selecting route information with higher advertising effectiveness. Therefore, the financial burden on the user can be reduced.

With such a configuration, for example, the first route information and the second route information are pieces of route information regarding the same destination, and therefore the user of the terminal can select different routes for the same destination. Also, the first route information indicates a longer distance to the destination or a longer time required for the vehicle to reach the destination than the second route information. Therefore, in combination with the above configuration, the user of the terminal can use a vehicle for which the usage fee is set based on an idea different from the general vehicle usage fee setting, i.e., the usage fee is lower for a route for which the distance to the destination, or the time required for the vehicle to reach the destination, is longer.

Fifth Modification (5)

In the fifth example, the usage fee discount amount resulting from the advertisement being output may be calculated by multiplying the advertisement unit price by a constant coefficient. However, the present embodiment is not limited to such an example. For example, regarding an advertisement ID with which an advertisement is likely to be output for a vehicle-exit point of the autonomous driving rental car, it is possible to give a higher discount coefficient than that of other advertisement IDs to such an advertisement ID to increase the usage fee discount amount.

FIG. 8F illustrates a third advanced advertisement management database 156C, which is an example of the advanced advertisement management database 156.

In the third advanced advertisement management database 156C, a non-limiting example of the advertisement information table contains the target user classification ID, the advertisement area relevant flag, a vehicle interior advertisement output flag, a vehicle exterior advertisement output flag, the advertisement output time slot, the advertisement unit price, a discount coefficient, and the distribution advertisement content ID in association with each other. Here, in a non-limiting example, the target user classification ID, the advertisement area relevant flag, the advertisement output time slot, the advertisement unit price, and the distribution advertisement content ID may be the same as those in the second advanced advertisement management database 156B.

The discount coefficient is to be applied when a condition is satisfied in the advertisement information table.

In this case, the example of data in FIG. 8F shows an example in which, if an autonomous driving rental car that a user with the target user classification ID "S0001" boarded passes through the advertisement area related to "○x hotel", and advertisement information defined by the advertisement content data 155 is output, the advertisement unit price "300 yen" will be accumulated as the advertising fee for the advertisement ID "A0001" when the time slot in which the autonomous driving rental car passes through the advertisement area is "1:00 to 17:00", and the advertisement unit price "800 yen" will be accumulated when the time slot is "17:00 to 23:00" or "23:00 to 1:00". Note that the discount coefficient for "17:00 to 23:00" is "0.5", and the discount coefficient for "23:00 to 1:00" is "0.8".

That is to say, the same advertisement unit price "800 yen" is applied to both "17:00 to 23:00" and "23:00 to 1:00", but the usage fee discount amount for "17:00 to 23:00" is "400 yen", whereas the usage fee discount amount for "23:00 to 1:00" is "640 yen".

Also, when the autonomous driving rental car in which the user with the target user classification ID "S0001" boarded does not pass through the advertisement area related to "○x hotel", a lower discount coefficient will be set and the usage fee discount amount will be lower.

In the case of the example of data in FIG. 8F, the demand for a hotel as a waypoint and a vehicle-exit point for an autonomous driving rental car is expected to be high in a midnight time slot, and therefore although the advertisement unit price in the midnight time slot is the same as in other time slots, the discount coefficient is set so that the usage fee discount amount for the midnight time slot is high.

On the other hand, in a non-limiting example, a low discount coefficient may optionally be set for a department store or the like in the time slot other than the business hour thereof so that the usage fee discount amount will be small.

Note that when the discount coefficient varies, the advertisement ID may optionally be selected such that the total usage fee discount amount calculated by multiplying the advertisement unit prices by their respective coefficients will be at its maximum, instead of selecting the advertisement ID with which the total advertisement unit price will be at its maximum in operation A6.

Effects of Fifth Modification (5)

One example of the effects that can be achieved by the present embodiment is that it is possible to allow the user to use the vehicle at an appropriate price range according to the demand or the like of the user.

Fifth Modification (6)

In the fifth example, the advertisement proposal processor 112 of the server 10 calculates the advertisement unit price regardless of which device in the vehicle system 50 is used to output an advertisement. Also, the advertisement proposal processor 112 of the server 10 may calculate the advertisement unit price regardless of whether the advertisement is output through the vehicle system 50, or through the display 24 of the terminal 20 of the user who is aboard the vehicle 90. For example, the server 10 may determine that the user of the terminal 20 has boarded the vehicle 90 based on a location of the terminal 20 matching a location of the vehicle 90, and the server 10 may transmit the advertisement to the terminal 20 and may accumulate the discount amount while the user of the terminal 20 is driving the vehicle 90 or is having a ride in the vehicle 90. However, the present embodiment is not limited to such an example. For example, the advertisement proposal processor 112 may prompt the user to select an advertisement output destination by using the vehicle system 50 or the terminal 20 so that the advertisement unit price can be changed according to the advertisement output destination.

FIG. 8G illustrates a fourth advanced advertisement management database 156D, which is an example of the advanced advertisement management database 156.

In the third advanced advertisement management database 156C, a non-limiting example of the advertisement information table contains the target user classification ID, the advertisement area relevant flag, a vehicle interior advertisement output flag, a vehicle exterior advertisement output flag, the advertisement unit price, and the distribution advertisement content ID in association with each other. Here, in a non-limiting example, the target user classification ID, the advertisement area relevant flag, the advertisement unit price, and the distribution advertisement content ID may be the same as those in the first advanced advertisement management database 156A.

In a non-limiting example, the vehicle interior advertisement output flag is a flag for classification according to a condition regarding which combination of the display 53A, the speaker 53C, and the vehicle environment adjustment unit 53E of the vehicle system 50 is to be used to output an advertisement toward the inside of the autonomous driving rental car.

In a non-limiting example, the vehicle exterior advertisement output flag is a flag for classification according to a condition regarding which combination of the display 53A and the speaker 53C of the vehicle system 50 is to be used to output an advertisement toward the outside of the autonomous driving rental car.

In this case, the example of data in FIG. 8E shows an example in which, if an autonomous driving rental car that a user with the target user classification ID "S0001" boarded passes through the advertisement area related to "○× FITNESS GYM", and advertisement information defined by the advertisement content data 155 is output, when the advertisement is to be output only toward the inside of the vehicle, a moving image defined by the content ID "C0001" is displayed on the vehicle interior display as shown in FIG. 8E, and the advertisement unit price is "300 yen". On the other hand, if the advertisement is to be output only toward the outside of the vehicle, sound defined by the content ID "C0002" is output from the vehicle exterior speaker, and the advertisement unit price is "600 yen". Also, if the advertisement is to be output to both the inside and the outside of the vehicle, the advertisement unit price is "1000 yen".

That is to say, with this example of data, it is possible to change the advertisement unit price according to whether the advertiser wishes to output their advertisement to the inside of the vehicle or the outside of the vehicle.

Note that the output destination of the advertisement may optionally be selected for each advertisement ID.

Effects of Fifth Modification (6)

One example of the effects that can be achieved with the present modification is that it is possible to perform advertising not only to users who use the vehicle but also to people outside the vehicle such as passersby. In addition, if the user who uses the vehicle selects the option to perform advertising to people outside the vehicle, the user's usage fee will be reduced. Therefore, is beneficial to all of the users who use the vehicle, advertisers, and the operator of the server 10.

Fifth Modification (7)

In the fifth example, the advertisement unit price resulting from an advertisement being output is determined for each advertisement ID. However, the present embodiment is not limited to such an example. For example, in the advanced advertisement management database 156, in a non-limiting example, the advertisement unit price (the value of the advertisement) for an advertisement area corresponding to a region in which the density of advertisements is high (hereinafter referred to as a "high-density advertisement region") may be varied based on the user who boards the vehicle.

In a high-density advertisement region, it is possible to output various types of advertisements from the output device of the vehicle. However, which of these advertisements is an advertisement in high demand (an advertisement with a high value) may differ for each person (user).

Specifically, for example, advertisements for sports, magazines/cartoons, and games are often in high demand for male users, and advertisements for food, fashion, and cosmetics are often in high demand for female users. Also, the demand for advertising may differ depending on the attributes of the user, such as the age, the place of residence, the nationality, the occupation, and married/unmarried, in addition to the sex.

Therefore, the type of advertisement considered to be in high demand for the user is determined based on the attribute information of the user who boards the vehicle. Then, the advertisement unit price of the determined type of advertisement stored in the advertisement information table can be increased by a certain amount, for example.

Effects of Fifth Modification (7)

One example of the effects that can be achieved by the present modification is that the value of an advertisement in a region in which the density of advertisements is high is set based on information regarding the user of a terminal who boards a vehicle. Therefore, it is possible to make the user use a vehicle in which an advertisement of which the value has been appropriately set according to the demand of a user who boards a vehicle is displayed.

Fifth Modification (8)

It is also possible to vary the advertisements to be displayed in a vehicle, or vary the advertisement unit price between the above-described high-density advertisement region and, a region in which the density of advertisements is conversely low (hereinafter referred to as a "low-density advertisement region").

In a high-density advertisement region, stores and facilities that can advertise are concentrated compared to a low-density advertisement region. Therefore, in a non-limiting example, the advertisement unit price stored in the advertisement information table may optionally be increased by a certain amount.

Conversely, in a low-density advertisement region, stores and facilities that can advertise are sparse compared to a high-density advertisement region. Therefore, in a non-limiting example, the advertisement unit price stored in the advertisement information table may optionally be reduced by a certain amount.

In this case, the advertisement proposal processor 112 compares the case of selecting a travel route that passes through a high-density advertisement region despite the travel distance or the required time being long, with the case of selecting a travel route that passes through a low-density advertisement region despite the travel distance or the required time being short.

In the case of the travel route that passes through a high-density advertisement region, the accumulated amount of advertisement unit prices is higher than in the case of the travel route that passes through a low-density advertisement region, and the usage fee discount amount for the autonomous driving rental car is larger. That is to say, the usage fee for the travel route that passes through the high-density advertisement region can be set lower than that for the travel route that passes through the low-density advertisement region.

Note that the time slot information described in the fifth modification (4) may optionally be added to the above-described configuration.

Effects of Fifth Modification (8)

One example of the effects that can be achieved by the present modification is that the value of advertisement information is set based on the density of advertisements in a place to which the vehicle provided with a display device is to travel. Therefore, the user of the terminal can see an advertisement to which a different value has been set depending on the density of advertisements, in the vehicle.

Sixth Example

In the third example to the fifth example, which are non-limiting examples, the communication system 1B includes the server 10, the terminals 20 (the terminal 20A, the terminal 20B, the terminal 20C, and so on), the payment management server 40, and vehicle systems 50 (the vehicle system 50a, the vehicle system 50b, the vehicle system 50c, and so on) connected to each other via the network 30. However, the present embodiment is not limited to such a configuration.

In a non-limiting example, the sixth example may have three types of system configurations in addition to the above-described examples.

The descriptions in the sixth example are applicable to any of the other examples.

Also note that the same constituent elements as the above-described constituent elements are assigned the same reference numerals, and redundant descriptions thereof will be omitted.

System Configuration A

In the system configuration A, which is a non-limiting example, the vehicle system 50, the terminal 20, and the payment management server 40 are connected to each other via the network 30.

The system configuration A is formed by integrating the functions of the server 10 with the functions of the vehicle system 50. That is to say, the functions of the controller 11 are transferred to the controller 51, the functions of the storage 15 are transferred to the storage 55, the functions of the input/output interface 12 are transferred to the input/output interface 52, the functions of the display 13 are transferred to the display 53A, and the functions of the communication I/F 14 are transferred to the communication I/F 54.

In this case, in a non-limiting example, the functional configurations, the data structures, and the processing illustrated in the flowcharts in the third example to the fifth example, the third modification (1) to the third modification (2), the fourth modification (1) to the fourth modification (5), and the fifth modification (1) to the fifth modification (8) can be employed in a similar manner.

System Configuration B

In the system configuration B, which is a non-limiting example, the server 10, the payment management server 40, and the vehicle system 50 are connected to each other via the network 30.

The system configuration B is formed by integrating the functions of the terminal 20 with the functions of the vehicle system 50. That is to say, the functions of the controller 21 are transferred to the controller 51, the functions of the storage 28 are transferred to the storage 55, the functions of the input/output interface 23 are transferred to the input/output interface 52, the functions of the display 24 are transferred to the display 53A, the functions of the communication I/F 22 are transferred to the communication I/F 54, the functions of the microphone 25 are transferred to the microphone 53B, the functions of the speaker 26 are transferred to the speaker 53C, the functions of the camera 27 are transferred to the camera 53D, and the functions of the position calculation information detector 29 are transferred to the position calculation information detector 58.

In a non-limiting example, reservation of an autonomous driving rental car through a reservation application, performed using the terminal 20, may optionally be performed using a kiosk terminal (an information processing terminal) installed on a street. Also, in a non-limiting example, the autonomous driving rental car that travels without a passenger may optionally stop upon recognizing a person standing by the road with their hand raised as a user, by using the camera 53D of the vehicle system 50.

The processing in B5 for prompting the user to determine whether or not to display an advertisement, and the processing in B13 for displaying a waypoint candidate and prompting the user to determine whether or not to agree with the current waypoint candidate, which are performed in the input/output interface 23 of the terminal 20 can be realized in a similar manner by using the input/output interface 52 of the vehicle system 50.

In the payment of the usage fee, after the processing in C27 for receiving the payment code by using the vehicle system 50, payment may optionally be performed by using server-type electronic money, which is a non-limiting example, using the code reader 56A of the vehicle system 50, or by using a credit card, which is a non-limiting example, using the card reader 56B.

In addition, the functional configurations, the data structures, and the processing illustrated in the flowcharts in the third example to the fifth example, the third modification (1) to the third modification (2), the fourth modification (1) to the fourth modification (5), and the fifth modification (1) to the fifth modification (8) can be employed in a similar manner.

System Configuration C

In the system configuration C, which is a non-limiting example, the payment management server 40 and the vehicle system 50 are connected to each other via the network 30.

The system configuration A is formed by integrating the functions of the server 10 in the system configuration B with the functions of the vehicle system 50. That is to say, the functions of the controller 11 are transferred to the controller 51, the functions of the storage 15 are transferred to the storage 55, the functions of the input/output interface 12 are transferred to the input/output interface 52, the functions of the display 13 are transferred to the display 53A, and the functions of the communication I/F 14 are transferred to the communication I/F 54.

Also in this case, the functional configurations, the data structures, and the processing illustrated in the flowcharts in the third example to the fifth example, the third modification (1) to the third modification (2), the fourth modification (1) to the fourth modification (5), and the fifth modification (1) to the fifth modification (8) can be employed in a similar manner.

In the first example to the second example, which are non-limiting examples, the communication system 1A includes the server 10, the terminals 20 (the terminal 20A, the terminal 20B, the terminal 20C, and so on) and the vehicle display devices 90 (the vehicle display device 90a, the vehicle display device 90b, the vehicle display device 90c, and so on) connected to each other via the network 30.

However, similarly, the present embodiment is not limited to such a configuration. That is to say, as in the above-described communication system 1B, the system may optionally be formed by integrating the functions of the server 10 with the functions of the vehicle system 50.

In this case, the functional configurations, the data structures, and the processing illustrated in the flowcharts in the first example to the second example and the first modification (1) to the first modification (2) can be employed in a similar manner.

Effects of Sixth Example

One example of the effects that can be achieved by the present example is that the user of a terminal can acquire information regarding the usage fee for a vehicle from the electronic device provided in the vehicle, by using their own terminal.

Also, the user of the terminal can acquire information regarding the usage fee for a vehicle from an electronic device that is provided in the vehicle and that includes a display device for displaying an advertisement, by using their own terminal.

Also, the display device for displaying an advertisement, provided in the vehicle, acquires, via the controller thereof, information regarding the usage fee for the vehicle that is based on advertisement information to be displayed on the device and information regarding the situation where the advertisement is displayed on the device. Thereafter, in order to display first information that is based on the acquired information regarding the usage fee on the display area of the display device, the display device can make a notification to the user of the vehicle (the user who boards the vehicle) of the information regarding the usage fee for the vehicle.

Also, the display device provided in the vehicle displays an advertisement on the display. Thereafter, in order to display information regarding the usage fee for the vehicle that is based on the advertisement displayed on the display, on the display area of the display device, the display device can make a notification to the user of the vehicle (the user who boards the vehicle) of the information regarding the usage fee for the vehicle.

Others

The following describes an example of a method that is performed in the vehicle to detect whether or not the user of the terminal 20 has boarded the vehicle after the user of the terminal 20 has made a reservation for an autonomous driving rental car by using a reservation application.

First, in B1, the reservation application processor 212 of the terminal 20 transmits reservation information to the reservation server via the communication I/F 22. Accordingly, the reservation server generates a boarding confirmation code based on the reservation information, and transmits it to the vehicle system 50. Upon the autonomous driving rental car provided with the vehicle system 50 arriving at the vehicle-boarding point specified through the reservation application of the terminal 20, the advertisement providing processor 512 of the vehicle system 50 displays the boarding confirmation code on the display 53A.

Upon reading the boarding confirmation code by using the camera 27, the reservation application processor 212 of the terminal 20 transmits boarding confirmation information to the reservation server via the communication I/F 22.

Upon receiving the boarding confirmation information from the terminal 20, the reservation server transmits the boarding confirmation information to the vehicle system 50.

Upon receiving the boarding confirmation information from the reservation server, the advertisement providing processor 512 of the vehicle system 50 detects that the user of the terminal 20 has boarded the vehicle.

Although the reservation server transmits the boarding confirmation code to the vehicle system 50 in the above-described example, the reservation server may transmit it to the terminal 20.

In such a case, the reservation application processor 212 of the terminal 20 displays the boarding confirmation code on the display 24, and the advertisement providing processor 512 of the vehicle system 50 detects that the user of the terminal 20 has boarded the vehicle, by reading the boarding confirmation code, using the code reader 56A.

Note that the fact that the user of the terminal 20 has boarded the vehicle may optionally be detected by using information regarding an image of the interior of the vehicle by using the camera 53D of the vehicle system 50.

What is claimed is:

1. An information processing method to be carried out by a terminal that is configured to communicate with an electronic device, the electronic device being configured to manage information related to a vehicle, the information processing method comprising:
    displaying a first display in a display area of the terminal that comprises a first setting for controlling a content to be displayed on a display device of the vehicle, and a second setting for controlling the content to not be displayed on the display device of the vehicle;
    controlling, by a processor of the terminal, a setting related to whether the content is to be displayed on the display device of the vehicle based on selection among the first setting and the second setting transmitting information indicating either the first setting or the second setting to the electronic device;
    controlling by the processor of the terminal, a travel-related processing operation that is related to traveling, by the vehicle, to a location related to the content displayed on the display device of the vehicle based on the first setting being set as the setting by a user of the terminal, the travel-related processing operation comprising transmitting, through a communication interface of the terminal, a control signal for controlling the vehicle to move to the location related to the content displayed on the display device of the vehicle from the terminal;
    receiving by the processor of the terminal, information related to a discounted vehicle usage fee from the electronic device; and
    displaying a second display in the display area of the terminal that comprises the discounted vehicle usage fee based on the information related to the discount vehicle usage fee, a vehicle usage fee being discounted to the discounted vehicle usage fee based on the travel-related processing operation and the content displayed on the display device of the vehicle based on the first setting being set as the setting by the user of the terminal.

2. The information processing method according to claim 1, further comprising
    applying a content display setting, by the processor of the terminal, to the display device of the vehicle to display the content based on the first setting being set as the setting by the user of the terminal.

3. The information processing method according to claim 2, wherein the vehicle usage fee is discounted to the discounted vehicle usage fee based on the content display setting, the travel-related processing operation and the content displayed on the display device of the vehicle based on the first setting being set as the setting by the user of the terminal.

4. The information processing method according to claim 2, wherein the content display setting is created or applied based on the user of the terminal inputting information to the second display.

5. The information processing method according to claim 1, further comprising:
displaying first route information related to a first route through which the vehicle is to travel, and second route information related to a second route through which the vehicle is to travel, in at least the display area of the terminal.

6. The information processing method according to claim 5, further comprising displaying, in the display area of the terminal, a first content related to the first route information or a second content related to the second route information.

7. The information processing method according to claim 5, wherein the content displayed on the display device of the vehicle is selected based on either the first route information or the second route information selected based on the input from the user of the terminal.

8. The information processing method according to claim 5, wherein the first route information and the second route information are displayed in the display area of the terminal based on user information related to the user of the terminal.

9. The information processing method according to claim 1, further comprising performing, by the processor, a payment-related processing operation that is related to a first payment for a product or a service provided by a store at the location related to the content, to which the vehicle has traveled based on the travel-related processing operation,
wherein the display area of the vehicle displays a payment amount of the first payment that is based on the payment-related processing operation.

10. The information processing method according to claim 1, further comprising:
performing, by the processor, a payment-related processing operation that is related to a payment for a product or a service provided by a store at the location related to the content, to which the vehicle has traveled based on the travel-related processing operation; and
receiving, by the communication interface of the terminal, coupon information related to the store based on the payment-related processing operation.

11. The information processing method according to claim 1, further comprising acquiring, by the processor of the terminal, an input related to the content displayed on the display device of the vehicle,
wherein the vehicle usage fee is discounted to the discounted vehicle usage fee based on the input related to the content, the travel-related processing operation and the content displayed on the display device of the vehicle based on the first setting set as the setting by the user of the terminal.

12. The information processing method according to claim 1, further comprising
acquiring, by the processor of the terminal, selection of a route that includes a waypoint at which the vehicle is to stop off and which is different from a destination of the vehicle, from among a plurality of routes that are available for the vehicle to arrive at the destination,
wherein the vehicle usage fee is discounted to the discounted vehicle usage fee based on the selection of the route, the travel-related processing operation and the content displayed on the display device of the vehicle based on the first setting being set as the setting by the user of the terminal.

13. The information processing method according to claim 12, further comprising performing, by the processor, a payment-related processing operation related to a second payment for a product or a service provided at a store related to the waypoint,
wherein the display area of the vehicle displays a payment amount of the second payment based on the selection of the route.

14. The information processing method according to claim 1, wherein the electronic device is provided in the vehicle.

15. The information processing method according to claim 14, wherein the electronic device includes the display device.

16. A non-transitory computer readable storage medium storing program instructions that are executable by a processor of a terminal, the terminal being configured to communicate with an electronic device, the electronic device being configured to manage information related to a vehicle, wherein the program instructions, when executed by the processor, are configured to control the terminal to:
display a first display in a display area of the terminal that comprises a first setting for controlling a content to be displayed on a display device of the vehicle, and a second setting for controlling the content to not be displayed on the display device of the vehicle;
control a setting related to whether the content is to be displayed on the display device of the vehicle based on selection among the first setting and the second setting;
transmit information indicating either the first setting or the second setting to the ironic device;
control a travel-related processing operation that is related to traveling, by the vehicle, to a location related to the content displayed on the display device of the vehicle based on the first setting being set as the setting by a user of the terminal, the travel-related processing operation comprising transmitting, through a communication interface of the terminal, a control signal for controlling the vehicle to move to the location related to the content displayed on the display device of the vehicle from the terminal;
receive information related to a discounted vehicle usage fee from the electronic device; and
display a second display in the display area of the terminal that comprises the discounted vehicle usage fee based on the information related to the discounted vehicle usage fee, a vehicle usage fee being discounted to the discounted vehicle usage fee based on the travel-related processing operation and the content displayed on the display device of the vehicle based on the first setting being set as the setting by the user of the terminal.

17. A terminal configured to communicate with an electronic device that is configured to manage information related to a vehicle, the terminal comprising:
a communication interface configured to communicate with the electronic device;
a memory configured to store one or more computer-readable instructions; and
one or more processors configured to execute the one or more computer-readable instructions to:
display a first display in a display area of the terminal that comprises a first setting for controlling a content to be displayed on a display device of the vehicle, and a second setting for controlling the content to not be displayed on the display device of the vehicle;
control a setting related to whether the content is to be displayed on the display device of the vehicle based on selection among the first setting and the second setting;
transmit information indicating either the first setting or the second setting to the electronic device;
control a travel-related processing operation that is related to traveling, by the vehicle, to a location related to the content displayed on the display device of the vehicle based on the first setting being set as the setting by a user of the terminal, the travel-related processing operation comprising transmitting, through the communication interface, a control signal for controlling the vehicle to move to the location related to the content displayed on the display device of the vehicle from the terminal;
receive information related to a discounted vehicle usage fee from the electronic device; and
display a second display in the display area of the terminal that comprises the discounted vehicle usage fee based on the information related to the discounted vehicle usage fee, a vehicle usage fee being discounted to the discounted vehicle usage fee based on the travel-related processing operation and the content displayed on the display device of the vehicle based on the first setting being set as the setting by the user of the terminal.

18. The information processing method according to claim 1, further comprising identifying, based on positioning signals acquired using a satellite positioning sensor that includes a radio frequency receiving circuit, a position of the terminal, wherein the first display comprises a map image including the position of the terminal, the first setting and the second setting.

* * * * *